(12) United States Patent
Jeong et al.

(10) Patent No.: US 9,094,709 B2
(45) Date of Patent: Jul. 28, 2015

(54) IMAGE DISPLAY APPARATUS AND METHOD FOR OPERATING THE SAME

(75) Inventors: Youngho Jeong, Seoul (KR); Myongwon Suh, Seoul (KR); Jaeuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 211 days.

(21) Appl. No.: 12/972,294

(22) Filed: Dec. 17, 2010

(65) Prior Publication Data

US 2011/0252446 A1 Oct. 13, 2011

Related U.S. Application Data

(60) Provisional application No. 61/322,751, filed on Apr. 9, 2010, provisional application No. 61/367,675, filed on Jul. 26, 2010.

(30) Foreign Application Priority Data

Apr. 9, 2010 (KR) .................. 10-2010-0032889
Jul. 26, 2010 (KR) .................. 10-2010-0071968

(51) Int. Cl.
| | |
|---|---|
| *G06F 3/00* | (2006.01) |
| *H04N 21/431* | (2011.01) |
| *H04N 21/482* | (2011.01) |
| *H04N 21/472* | (2011.01) |
| *H04N 21/478* | (2011.01) |

(52) U.S. Cl.
CPC ......... *H04N 21/4312* (2013.01); *H04N 21/482* (2013.01); *H04N 21/472* (2013.01); *H04N 21/478* (2013.01)

(58) Field of Classification Search
None
See application file for complete search history.

(56) References Cited

U.S. PATENT DOCUMENTS

| | | | |
|---|---|---|---|
| 6,025,843 A * | 2/2000 | Sklar ............................. 715/841 |
| 6,526,577 B1 * | 2/2003 | Knudson et al. ................ 725/40 |
| 2002/0078467 A1 * | 6/2002 | Rosin et al. .................... 725/110 |
| 2003/0149982 A1 | 8/2003 | Nakashima et al. |
| 2003/0196199 A1 * | 10/2003 | Chiu et al. ...................... 725/25 |
| 2005/0283800 A1 * | 12/2005 | Ellis et al. ....................... 725/40 |
| 2005/0283804 A1 * | 12/2005 | Sakata et al. ................... 725/52 |
| 2006/0005222 A1 | 1/2006 | Sato |
| 2007/0039023 A1 * | 2/2007 | Kataoka ......................... 725/46 |
| 2007/0118813 A1 * | 5/2007 | Forstall et al. ................ 715/805 |
| 2007/0252912 A1 | 11/2007 | Valente et al. |
| 2008/0065507 A1 | 3/2008 | Morrison et al. |
| 2008/0178218 A1 * | 7/2008 | Pickelsimer .................... 725/40 |
| 2009/0099919 A1 | 4/2009 | Schultheiss et al. |
| 2009/0138922 A1 * | 5/2009 | Thomas et al. ................. 725/87 |
| 2009/0235309 A1 * | 9/2009 | Roe ................................ 725/39 |
| 2010/0011394 A1 * | 1/2010 | Lee et al. ........................ 725/40 |
| 2010/0031162 A1 * | 2/2010 | Wiser et al. ................... 715/747 |
| 2010/0175086 A1 * | 7/2010 | Gaydou et al. ................. 725/39 |

* cited by examiner

*Primary Examiner* — Jason K Lin
(74) *Attorney, Agent, or Firm* — Birch, Stewart, Kolasch & Birch, LLP

(57) ABSTRACT

A method for operating an image display apparatus is discussed. The method according to an embodiment includes displaying a plurality of card objects on a display, displaying an application menu including at least one application item on the display, and displaying a broadcast image or broadcast image-associated information on the display. Accordingly, it is possible to increase user convenience.

14 Claims, 65 Drawing Sheets

FIG.18
(a)
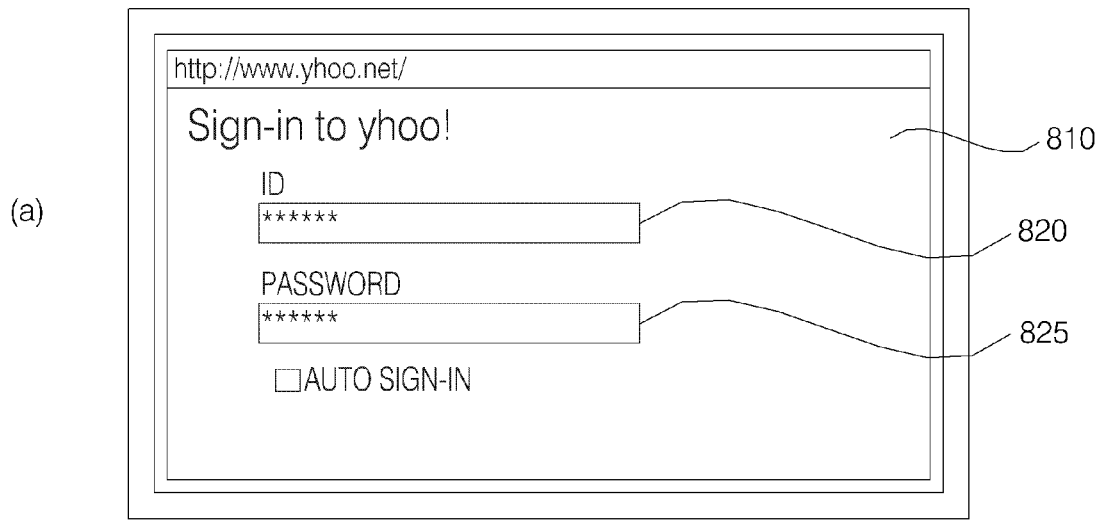
(b)
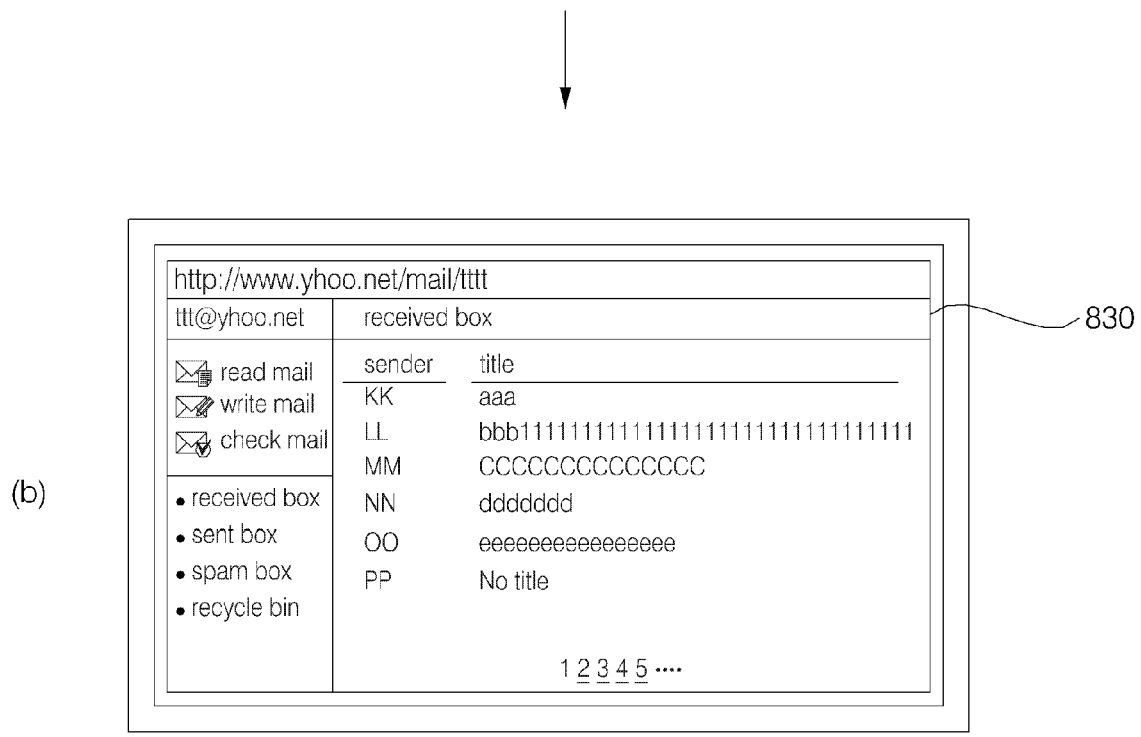

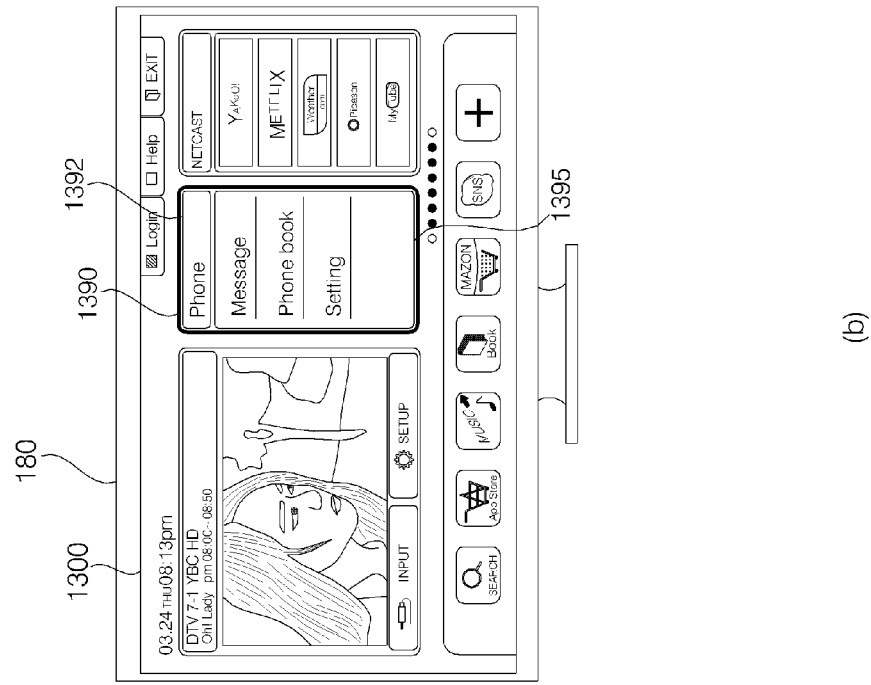
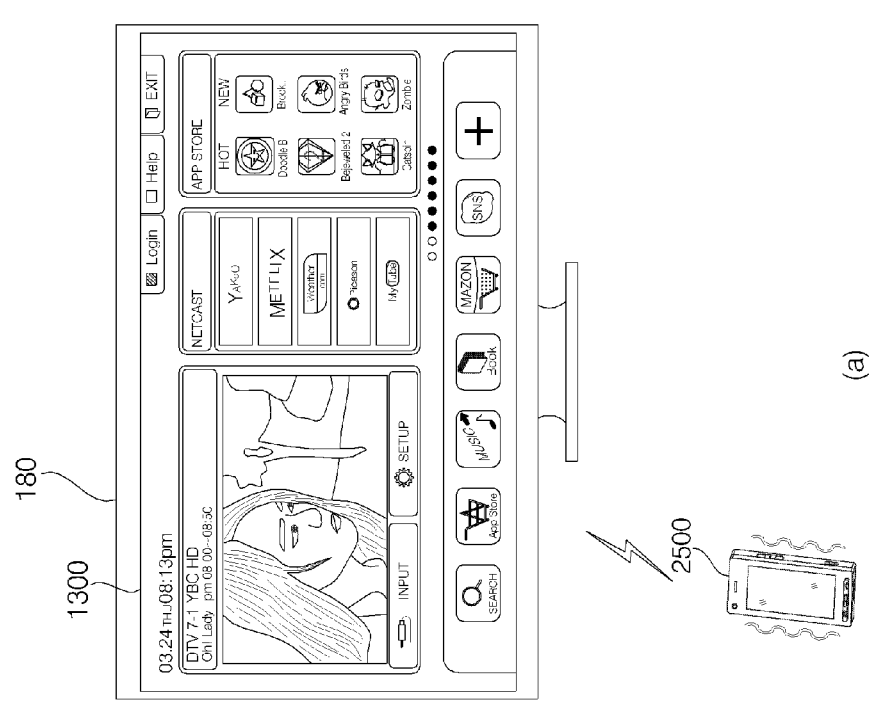
FIG.39

IMAGE DISPLAY APPARATUS AND METHOD FOR OPERATING THE SAME

CROSS-REFERENCE TO RELATED APPLICATION

This application claims the benefit of Korean Patent Application Nos. 10-2010-0032889, filed on Apr. 9, 2010 and 10-2010-0071968, filed on Jul. 26, 2010 in the Korean Intellectual Property Office and the benefit of U.S. Provisional Application Nos. 61/322,751 filed on Apr. 9, 2010 and 61/367,675 filed on Jul. 26, 2010 in the USPTO, the disclosure of which is incorporated herein by reference.

BACKGROUND OF THE INVENTION

1. Field of the Invention

The present invention relates to an image display apparatus and a method for operating the same, and more particularly, to an image display apparatus and a method for operating the same, which increase user convenience. More particularly, the present invention relates to an image display apparatus and a method for operating the same in which an application is downloaded and installed through a network server and the installed application execution image is displayed.

2. Description of the Related Art

An image display apparatus has a function of displaying images to a user. A user can view a broadcast through the image display apparatus. The image display apparatus can display a broadcast program selected by the user on a display from among broadcast programs transmitted from broadcasting stations. The recent trend in broadcasting is a worldwide transition from analog broadcasting to digital broadcasting.

Digital broadcasting offers many advantages over analog broadcasting, such as robustness against noise, less data loss, ease of error correction, and the ability to provide clear high-definition images. Digital broadcasting also allows interactive viewer services, compared to analog broadcasting.

SUMMARY OF THE INVENTION

An object of the present invention is to provide an image display apparatus and a method for operating the same, which can increase user convenience.

Another object of the present invention is to provide an image display apparatus and a method for operating the same, which provide various user interfaces.

In accordance with an aspect of the present invention, the above and other objects can be accomplished by the provision of a method for operating an image display apparatus including displaying a plurality of card objects on a display; displaying an application menu including at least one application item on the display; and displaying a broadcast image or broadcast image-associated information on the display.

In accordance with another aspect of the present invention, there is provided a method of operating an image display apparatus including displaying an application menu including at least one application item in a first display area; displaying a plurality of card objects in a second display area; receiving a command for changing the size of the first display area; and changing the size of the first display area or the second display area according to the received changing command.

In accordance with another aspect of the present invention, there is provided a method of operating an image display apparatus including displaying an application menu including at least one application item and a plurality of card objects; locking at least one of the plurality of card objects; receiving a movement command for at least one of the plurality of objects; and moving the objects other than the locked card object according to the received movement command.

In accordance with another aspect of the present invention, there is provided an image display apparatus including: a display; a network interface; and a controller configured to control the display and the network interface such that an image based on a signal received through the network interface is displayed on the display, wherein the controller controls a plurality of card objects, an application menu including at least one application item, and a broadcast image to be displayed on the display.

According to the embodiments of the present invention, by displaying a plurality of card objects classified according to content kinds and an application menu on a home screen, a user may readily use a desired service. In particular, when a desired card object is selected, the content of the card object is executed.

In particular, if a movement input is present in a state in which a plurality of card objects is displayed on a display, the card object is moved and displayed or another object which was not displayed is moved to and displayed on the display, such that the user can readily use a desired card object.

The size of a card object representing a broadcast image can be fixed by a lock function such that the user continuously views a broadcast image.

In accordance with another aspect of the invention, there is a method, computer program product and device for operating an image display apparatus configured to receive a television broadcast from one of a landline, a satellite and another connection. The method includes: simultaneously displaying, on a display of the image display apparatus, three of a plurality of card objects, each card object being displayed in a corresponding predefined area of the display; and changing information displayed on the display of the image display apparatus in response to a user input to one of the three simultaneously displayed card objects or in response to another user input.

In addition, various user interfaces can be provided within the image display apparatus such that user convenience is increased.

BRIEF DESCRIPTION OF THE DRAWINGS

The above and other objects, features and other advantages of the present invention will be more clearly understood from the following detailed description taken in conjunction with the accompanying drawings, in which:

FIG. 18 illustrates a UI in either of the image display apparatuses according to a further embodiment of the present invention;

FIGS. 20 to 39 are views referred to for describing various examples of a method for operating an image display apparatus according to an embodiment of the present invention.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

An image display apparatus as set forth herein is an intelligent image display apparatus equipped with a computer support function in addition to a broadcast reception function, for example. Thus, the image display apparatus may have user-friendly interfaces such as a handwriting input device, a touch screen, or a pointing device. Further, because the image display apparatus supports wired or wireless Internet, the image display apparatus is capable of e-mail transmission/reception, Web browsing, banking, gaming, etc. by connecting to the Internet or a computer. To implement these functions, the image display apparatus may operate based on a standard general-purpose Operating System (OS).

Various applications can be freely added to or deleted from, for example, a general-purpose OS kernel in the image display apparatus according to the present invention. Therefore, the image display apparatus may perform a number of user-friendly functions. The image display apparatus may be a network TV, a Hybrid broadcast broadband TV (HbbTV), a smart TV, etc. for example. The image display apparatus is applicable to a smart phone, as needed.

Embodiments of the present invention will be described in detail with reference to the attached drawings, but it should be understood that they are merely illustrative of the present invention and should not be interpreted as limiting the scope of the present invention.

In addition, although the terms used in the present invention are selected from generally known and used terms, some of the terms mentioned in the description of the present invention, the detailed meanings of which are described in relevant parts of the description herein, have been selected by the applicant at his or her discretion. Furthermore, the present invention must be understood, not simply by the actual terms used but by the meanings of each term lying within.

Figure 1:
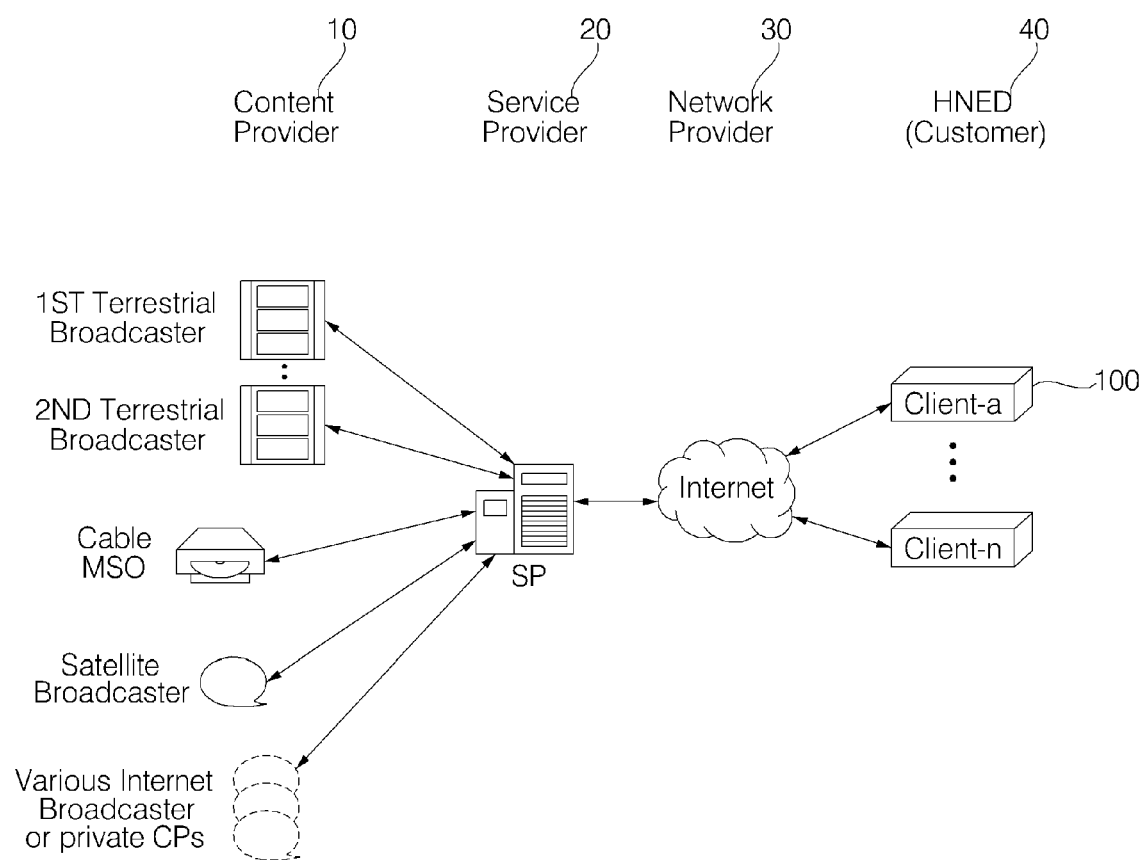
FIG. 1 illustrates the overall configuration of a broadcasting system including an image display apparatus according to an embodiment of the present invention.

FIG. 1 illustrates the overall configuration of a broadcasting system including an image display apparatus according to an embodiment of the present invention.

Referring to FIG. 1, the broadcasting system may include a Content Provider (CP) 10, a Service Provider (SP) 20, a Network Provider (NP) 30, and a Home Network End Device (HNED) 40. The FINED 40 corresponds to, for example, a client 100 which is an image display apparatus according to an embodiment of the present invention. As stated before, the image display apparatus may be a network TV, a smart TV, an Internet Protocol TV (IPTV), etc.

The CP 10 creates and provides content. The CP 10 may be, for example, a terrestrial broadcaster, a cable System Operator (SO) or Multiple System Operator (MSO), a satellite broadcaster, or an Internet broadcaster, as illustrated in FIG. 1.

Besides broadcast content, the CP 10 may provide various applications, which will be described later in detail.

The SP 20 may provide content received from the CP 10 in a service package. For instance, the SP 20 may package first terrestrial broadcasting, second terrestrial broadcasting, cable broadcasting, satellite broadcasting, Internet broadcasting, and applications and provide the package to users.

The SP 20 may unicast or multicast a service to the client 100. Unicast is a form of transmission in which information is sent from only one transmitter to only one receiver. In other words, unicast transmission is point-to-point, involving two nodes only. In an example of unicast transmission, upon receipt of a request for data from a receiver, a server transmits the data to only one receiver. Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service is provided to the client 100. The client 100 may construct a home network and receive a service over the home network.

Content transmitted in the above-described broadcasting system may be protected through conditional access or content protection. CableCard and Downloadable Conditional Access System (DCAS) are examples of conditional access or content protection.

The client 100 may also transmit content over a network. In this case, the client 100 serves as a CP and thus the CP 10 may receive content from the client 100. Therefore, an interactive content service or data service can be provided.

Figure 2:
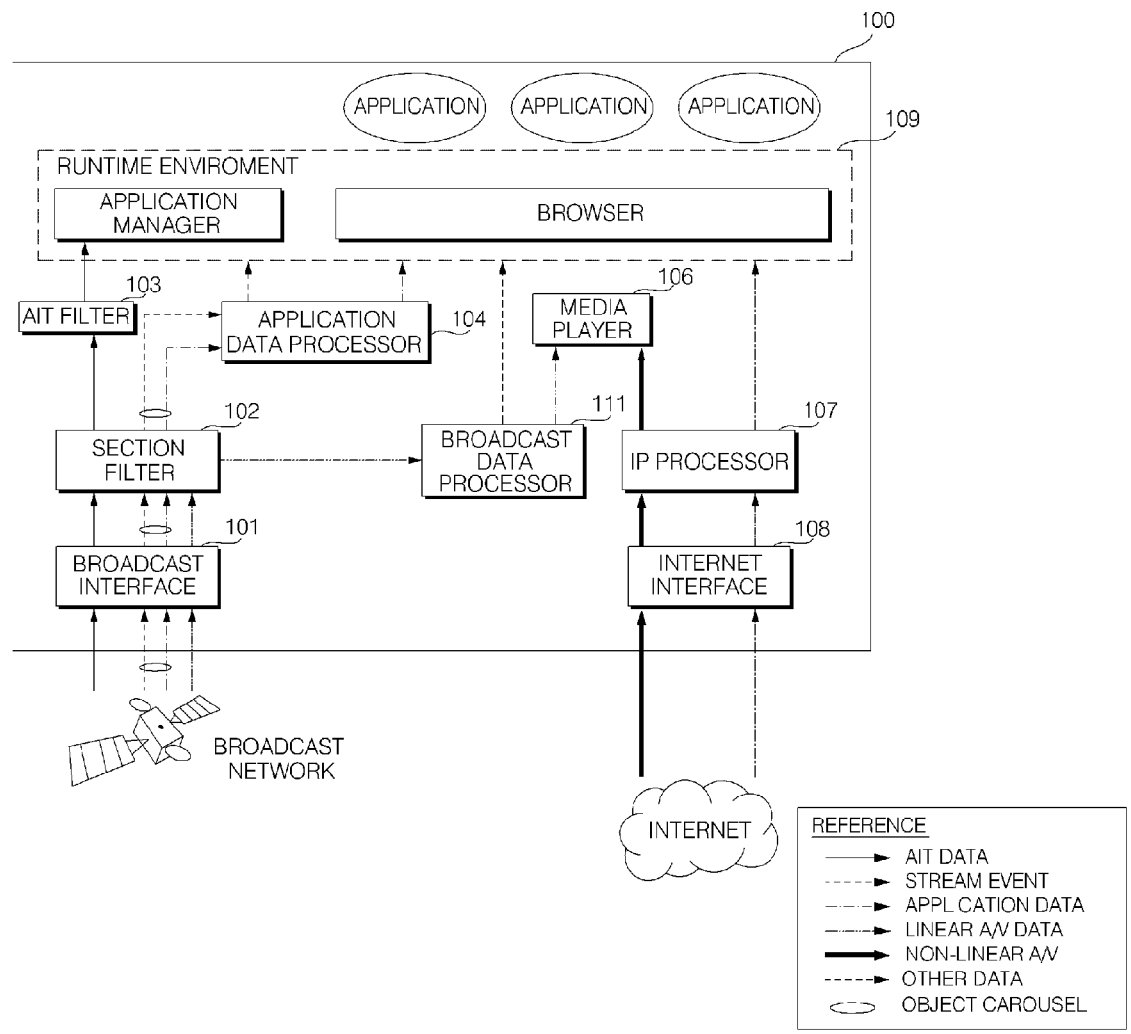
FIG. 2 illustrates the overall configuration of a broadcasting system including an image display apparatus according to another embodiment of the present invention.

FIG. 2 illustrates the overall configuration of a broadcasting system including an image display apparatus according to another embodiment of the present invention.

Referring to FIG. 2, the image display apparatus 100 according to another embodiment of the present invention is connected to a broadcast network and the Internet. The image display apparatus 100 is, for example, a network TV, a smart TV, an HbbTV, etc.

The image display apparatus 100 includes, for example, a broadcast interface 101, a section filter 102, an Application Information Table (AIT) filter 103, an application data processor 104, a broadcast data processor 111, a media player 106, an IP processor 107, an Internet interface 108, and a runtime module 109.

The image display apparatus 100 receives AIT data, real-time broadcast content, application data, and stream events through the broadcast interface 101. The real-time broadcast content may be referred to as linear Audio/Video (A/V) content.

The section filter 102 performs section filtering on the four types of data received through the broadcast interface 101, and outputs the AIT data to the AIT filter 103, the linear A/V content to the broadcast data processor 111, and the stream events and application data to the application data processor 104.

Meanwhile, the image display apparatus 100 receives non-linear A/V content and application data through the Internet interface 108. The non-linear A/V content may be, for example, a Content On Demand (CoD) application.

The non-linear A/V content and the application data are transmitted to the media player 106 and the runtime module 109, respectively.

The runtime module 109 includes, for example, an application manager and a browser as illustrated in FIG. 2. The application manager controls the life cycle of an interactive application using the AIT data, for example. The browser displays and processes the interactive application.

Figure 3:
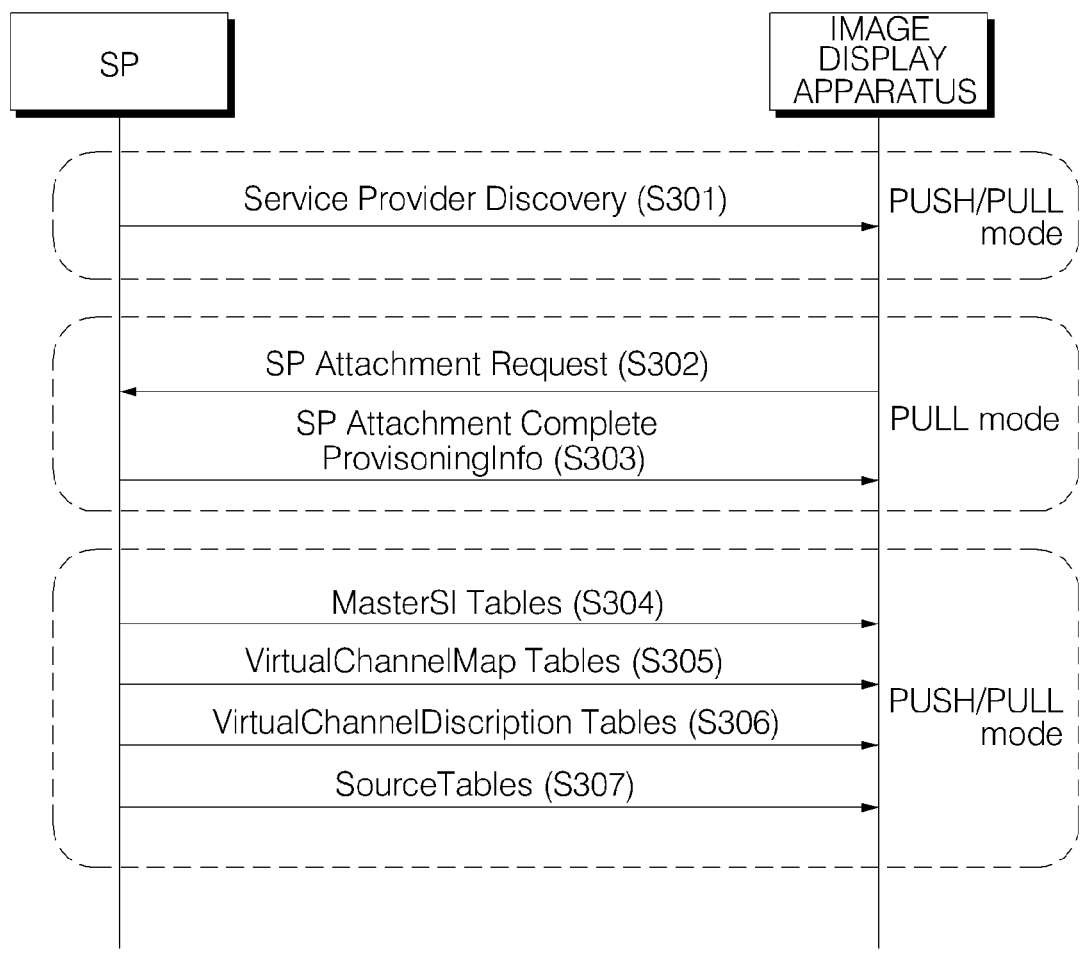
FIG. 3 is a diagram illustrating a signal flow for an operation for attaching to a Service Provider (SP) and receiving channel information from the SP in the image display apparatus illustrated in FIG. 1 or 2 according to an embodiment of the present invention.

FIG. 3 is a diagram illustrating a signal flow for an operation for attaching to an SP and receiving channel information from the SP in the image display apparatus illustrated in FIG. 1 or 2. Needless to say, the operation illustrated in FIG. 3 is an embodiment, which should not be interpreted as limiting the scope of the present invention.

Referring to FIG. 3, an SP performs an SP Discovery operation (S301) and the image display apparatus transmits a Service Provider Attachment Request signal to the SP (S302). Upon completion of attachment to the SP, the image display apparatus receives provisioning information from the SP (S303). Further, the image display apparatus receives Master System Information (SI) Tables, Virtual Channel Map Tables, Virtual Channel Description Tables, and Source Tables from the SP (S304 to S307).

More specifically, SP Discovery is a process by which SPs that provide IPTV services search for Service Discovery (SD) servers having information about the offerings of the SPs.

In order to receive information about the SD servers, an SD server address list can be detected, for example, using three methods, specifically use of an address preset in the image display apparatus or an address manually set by a user, Dynamic Host Configuration Protocol (DHCP)-based SP Discovery, and Domain Name System Service (DNS SRV)-based SP Discovery. The image display apparatus accesses a specific SD server using the SD server address list obtained through one of the above three methods and receives a SP Discovery record from the specific SD server. The Service Provider Discovery record includes information needed to perform Service Discovery on an SP basis. The image display apparatus then starts a Service Discovery operation using the SP Discovery record. These operations can be performed in a push mode or a pull mode.

The image display apparatus accesses an SP attachment server specified by an SP attachment locator included in the SP Discovery record and performs a registration procedure (or a service attachment procedure).

Further, after accessing an authentication service server of an SP specified by an SP authentication locator and performing an authentication procedure, the image display apparatus may perform a service authentication procedure.

After service attachment is successfully performed, a server may transmit data in the form of a provision information table to the image display apparatus.

During service attachment, the image display apparatus may include an Identifier (ID) and location information thereof in data and transmit the data to the service attachment server. Thus, the service attachment server may specify a service that the image display apparatus has subscribed to based on the ID and location information. In addition, the service attachment server provides, in the form of a provisioning information table, address information from which the image display apparatus can obtain Service Information (SI). The address information corresponds to access information about a Master SI Table. This method facilitates provision of a customized service to each subscriber.

The SI is divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

Figure 4:
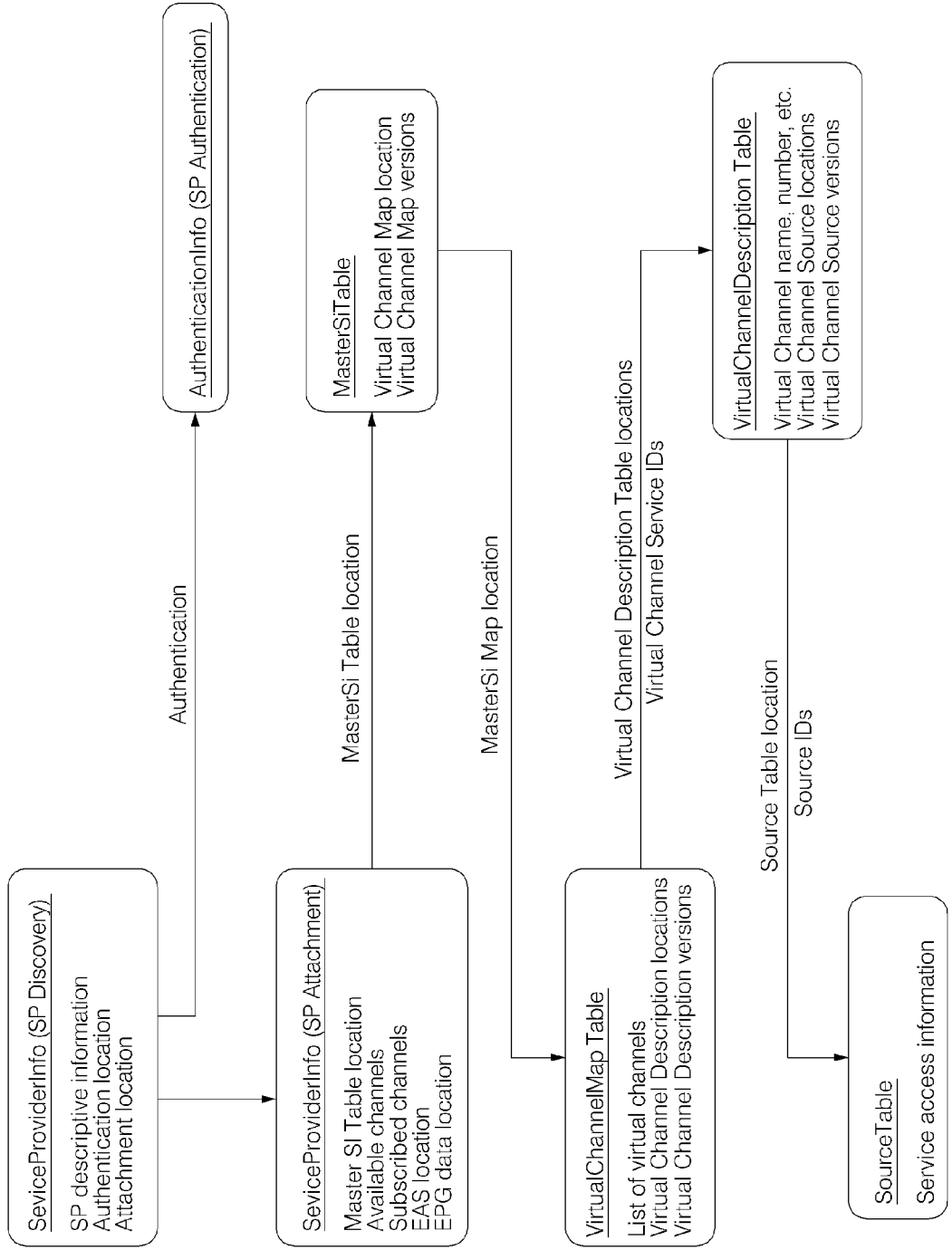
FIG. 4 illustrates an example of data used in the operation illustrated in FIG. 3.

FIG. 4 is a detailed diagram of FIG. 3, illustrating a relationship among data in the SI.

Referring to FIG. 4, a Master SI Table contains information about the location and version of each Virtual Channel MAP.

Each Virtual Channel MAP is identified by its Virtual Channel MAP identifier. VirtualChannelMAPVersion specifies the version number of the Virtual Channel MAP. If any of the tables connected to the Master SI Table in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. In conclusion, a change in any lower table leads to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a region, subscriber or subscriber group basis. Thus, it is possible to provide a customized service to a subscriber according to a region in which the subscriber is located and subscriber information regarding the subscriber.

A Virtual Channel Map Table may contain a list of one or more virtual channels. A Virtual Channel Map includes not details of the channels but information about the locations of the details of the channels. In the Virtual Channel Map Table, VirtualChannelDescriptionLocation specifies the location of a Virtual Channel Description Table that provides virtual channel descriptions.

The Virtual Channel Description Table contains the details of the virtual channels. The Virtual Channel Description Table can be accessed using VirtualChannelDescriptionLocation of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table are delivered in four logically separate flows, in a push mode or a pull mode. For version management, the Master SI Table may be multicast and thus a version change can be monitored by receiving a multicast stream of the Master SI Table.

Figure 5:
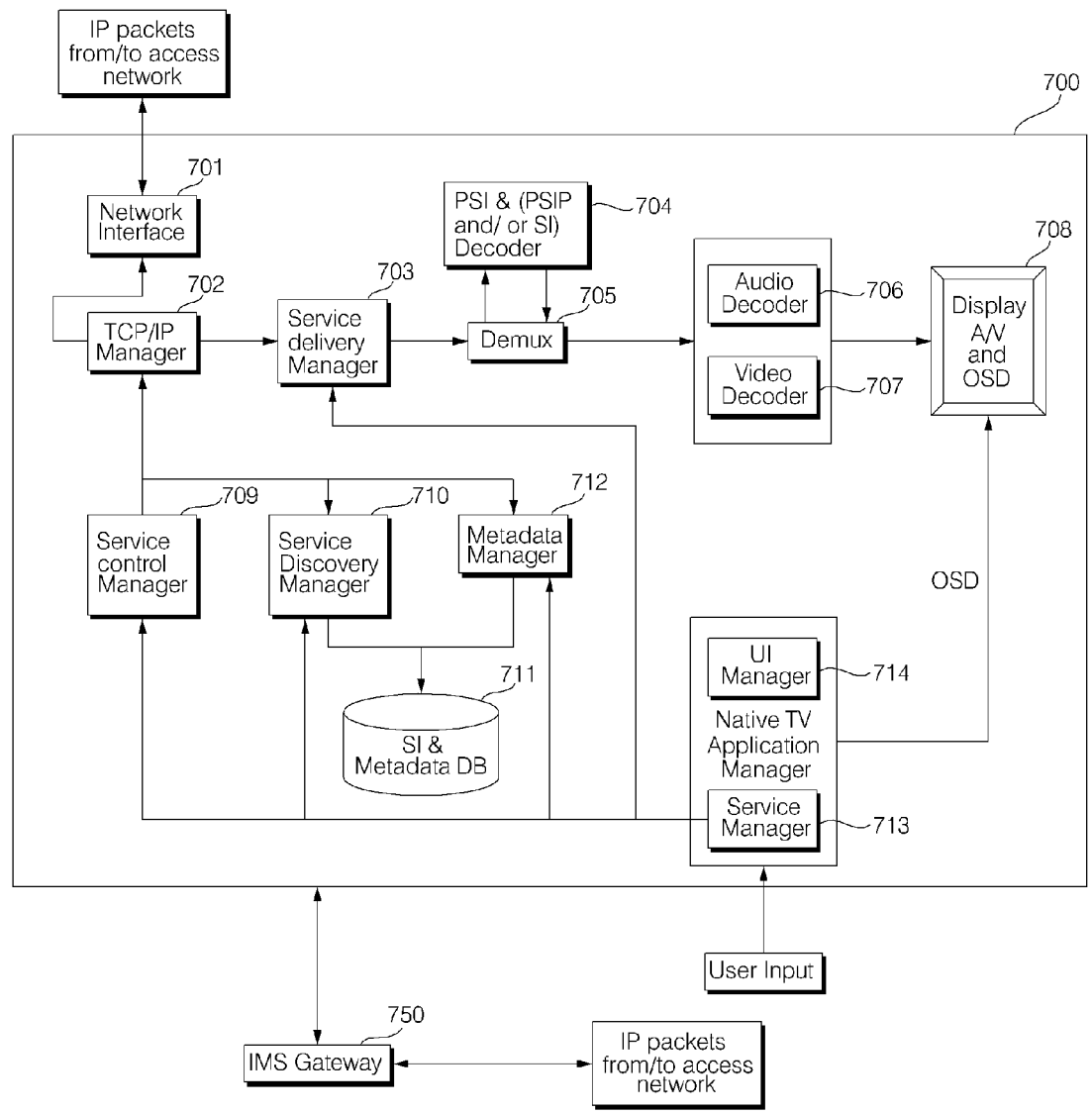
FIG. 5 is a detailed block diagram of the image display apparatus illustrated in FIG. 1 or 2 according to an embodiment of the present invention.

FIG. 5 is a detailed block diagram of the image display apparatus illustrated in FIG. 1 or 2 according to an embodiment of the present invention. The structure of the image display apparatus in FIG. 5 is purely exemplary and should not be interpreted as limiting the scope of the present invention.

Referring to FIG. 5, an image display apparatus 700 includes a network interface 701, a Transmission Control Protocol/Internet Protocol (TCP/IP) manager 702, a service delivery manager 703, a Demultiplexer (DEMUX) 705, a Program Specific Information (PSI) & (Program and System Information Protocol (PSIP) and/or SI) decoder 704, a display A/V and On Screen Display (OSD) module 708, a service control manager 709, a service discovery manager 710, a metadata manager 712, an SI & metadata DataBase (DB) 711, a User Interface (UI) manager 714, and a service manager 713.

The network interface 701 transmits packets to and receives packets from a network. Specifically, the network interface 701 receives services and content from an SP over the network.

The TCP/IP manager 702 is involved in packet reception and transmission of the image display apparatus 700, that is, packet delivery from a source to a destination. The TCP/IP manager 702 classifies received packets according to appropriate protocols and outputs the classified packets to the service delivery manager 705, the service discovery manager 710, the service control manager 709, and the metadata manager 712.

The service delivery manager 703 controls received service data. For example, when controlling real-time streaming data, the service delivery manager 703 may use the Real-time Transport Protocol/Real-time Transport Control Protocol (RTP/RTCP). If real-time streaming data is transmitted over RTP/RTCP, the service delivery manager 703 parses the received real-time streaming data using RTP and outputs the parsed real-time streaming data to the DEMUX 705 or stores the parsed real-time streaming data in the SI & metadata DB 711 under the control of the service manager 713. In addition, the service delivery manager 703 feeds back network reception information to a server that provides the real-time streaming data service using RTCP.

The DEMUX 705 demultiplexes a received packet into audio data, video data and PSI data and outputs the audio data, video data and PSI data to the audio decoder 706, the video decoder 707, and the PSI & (PSIP and/or SI) decoder 704, respectively.

The PSI & (PSIP and/or SI) decoder 704 decodes SI such as PSI. More specifically, the PSI & (PSIP and/or SI) decoder 704 decodes PSI sections, PSIP sections or SI sections received from the DEMUX 705.

The PSI & (PSIP and/or SI) decoder 704 constructs an SI DB by decoding the received sections and stores the SI DB in the SI & metadata DB 711.

The audio decoder 706 and the video decoder 707 decode the audio data and the video data received from the DEMUX 705 and output the decoded audio and video data to a user through the display A/V and OSD module 708.

The UI manager 714 and the service manager 713 manage the overall state of the image display apparatus 700, provide UIs, and manage other managers.

The UI manager 714 provides a Graphical User Interface (GUI) in the form of an OSD and performs a reception operation corresponding to a key input received from the user. For example, upon receipt of a key input signal regarding channel selection from the user, the UI manager 714 transmits the key input signal to the service manager 713.

The service manager 713 controls managers associated with services, such as the service delivery manager 703, the service discovery manager 710, the service control manager 709, and the metadata manager 712.

The service manager 713 also makes a channel map and selects a channel using the channel map according to the key input signal received from the UI manager 714. The service manager 713 sets the audio/video Packet ID (PID) of the selected channel based on SI about the channel received from the PSI & (PSIP and/or SI) decoder 704.

The service discovery manager 710 provides information necessary to select an SP that provides a service. Upon receipt of a channel selection signal from the service manager 713, the service discovery manager 710 detects a service based on the channel selection signal.

The service control manager 709 takes charge of selecting and control services. For example, if a user selects live broadcasting, like a conventional broadcasting service, the service control manager selects and controls the service using Internet Group Management Protocol (IGMP) or Real-Time Streaming Protocol (RTSP). If the user selects Video on Demand (VoD), the service control manager 709 selects and controls the service. RTSP supports trick mode for real-time streaming. Further, the service control manager 709 may initialize and manage a session through an IP Multimedia Control (IMC) gateway using IP Multimedia Subsystem (IMS) and Session Initiation Protocol (SIP). The protocols are given by way of example and thus other protocols are also applicable according to other embodiments.

The metadata manager 712 manages metadata related to services and stores the metadata in the SI & metadata DB 711.

The SI & metadata DB 711 stores the SI decoded by the PSI & (PSIP and/or SI) decoder 704, the metadata managed by the metadata manager 712, and the information required to select an SP, received from the service discovery manager 710. The SI & metadata DB 711 may store setup data for the system.

The SI & metadata DB 711 may be constructed in a Non-Volatile RAM (NVRAM) or a flash memory.

An IMS gateway 705 is a gateway equipped with functions needed to access IMS-based IPTV services.

Figure 6:
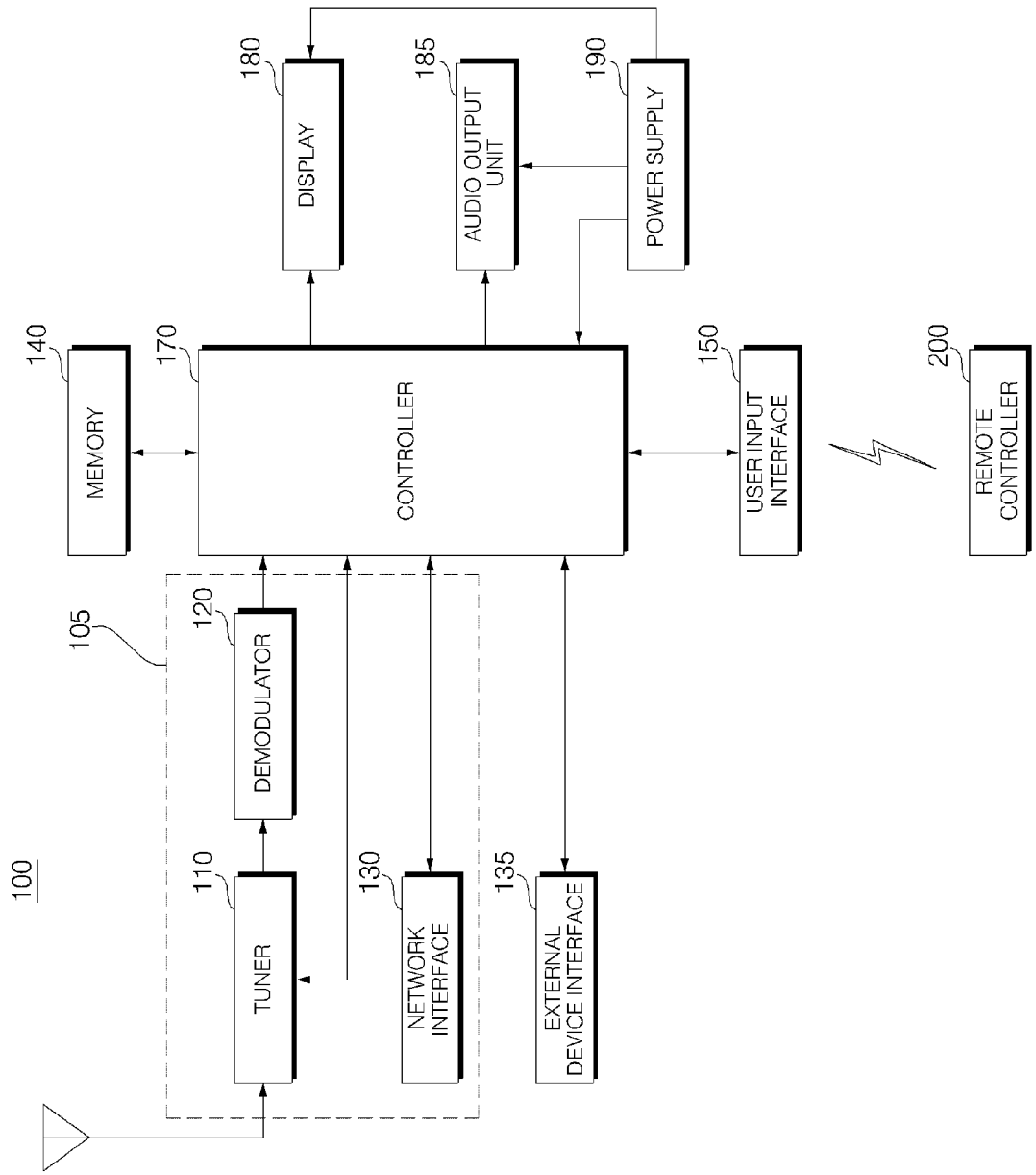
FIG. 6 is a detailed block diagram of the image display apparatus illustrated in FIG. 1 or 2 according to another embodiment of the present invention.

FIG. 6 is a detailed block diagram of the image display apparatus illustrated in FIG. 1 or 2 according to another embodiment of the present invention.

Referring to FIG. 6, an image display apparatus 100 according to another embodiment of the present invention includes a broadcasting receiver 105, an external device interface 135, a memory 140, a user input interface 150, a controller 170, a display 180, an audio output unit 185, a power supply 190, and a camera module (not shown). The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 selects a Radio Frequency (RF) broadcast signal corresponding to a channel selected by a user from among a plurality of RF broadcast signals received through an antenna and downconverts the selected RF broadcast signal into a digital Intermediate Frequency (IF) signal or an analog baseband A/V signal.

More specifically, if the selected RF broadcast signal is a digital broadcast signal, the tuner 110 downconverts the selected RF broadcast signal into a digital IF signal DIF. On the other hand, if the selected RF broadcast signal is an analog broadcast signal, the tuner 110 downconverts the selected RF broadcast signal into an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a stream signal TS. The stream signal TS may be a signal in which a video signal, an audio signal and a data signal are multiplexed. For example, the stream signal TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output unit 185, respectively.

The external device interface 135 may serve as an interface between an external device and the image display apparatus 100. For interfacing, the external device interface 135 may include an A/V Input/Output (I/O) unit (not shown) and/or a wireless communication module (not shown).

The external device interface 135 may be connected to an external device such as a Digital Versatile Disk (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit (not shown) and/or the wireless communication module (not shown).

The A/V I/O unit of the external device interface 135 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA).

The external device interface 135 may be connected to various set-top boxes through at least one of the above-described ports and may thus receive data from or transmit data to the various set-top boxes.

The external device interface 135 may receive applications or an application list from an adjacent external device and provide the applications or the application list to the controller 170 or the memory 140.

The network interface 130 serves as an interface between the image display apparatus 100 and a wired/wireless network such as the Internet. The network interface 130 may include an Ethernet port for connection to a wired network. The wireless communication module of the external signal I/O unit 128 may wirelessly access the Internet. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display apparatus 100 to a user or electronic device selected from among users or electronic devices pre-registered with the image display apparatus 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD files, and broadcast signals, and information related to the content from a CP or an NP. Also, the network interface 130 may receive update information about firmware and update files of the firmware from the NP. The network interface 130 may transmit data over the Internet or to the CP or the NP.

The network interface 130 may selectively receive a desired application among open applications over a network.

In an embodiment of the present invention, when a game application is executed in the image display apparatus 100, the network interface 130 may transmit data to or receive data from a user terminal connected to the image display apparatus 100 through a network. In addition, the network interface 130 may transmit specific data to or receive specific data from a server that records game scores.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel-add function.

The memory 140 may store applications or a list of applications received from the external device interface 135 or the network interface 130.

The memory 140 may store a variety of platforms which will be described later.

In an embodiment of the present invention, when the image display apparatus 100 executes a game application, the memory 140 may store user-specific information and game play information about a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory. The image display apparatus 100 may reproduce content stored in the memory 140 (e.g. video files, still image files, music files, text files, and application files) to the user.

While the memory 140 is shown in FIG. 6 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys (not shown), such as inputs of a power key, a channel key, and a volume key, and setting values.

Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 6, the controller 170 may include a DEMUX and a video processor, which will be described later with reference to FIG. 10.

In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. Especially the controller 170 may access a network and download an application or application list selected by the user to the image display apparatus 100 over the network.

For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display apparatus 100, received broadcast content, and external input content. The content includes at least one of a broadcast image, an external input image, an audio file, a still image, a Web page, or a text file.

Upon receipt of a go-to-home input, the controller 170 may control display of the home screen on the display 180 in an embodiment of the present invention.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display apparatus 100. The card objects may further include at least one of a card object representing a list of connected external devices or a card object representing a call-associated list.

The home screen may further include an application menu with at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The broadcast image may be fixed in size through lock setting.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may fullscreen the selected card object to cover the entirety of the display 180.

Upon receipt of an incoming call at a connected external device or the image display apparatus 100, the controller 170 may control focusing-on or shift of a call-related card object among the plurality of card objects.

If an application view menu item is selected, the controller 170 may control display of applications or a list of applications that are available in the image display apparatus or downloadable from an external network.

The controller 170 may control installation and execution of an application downloaded from the external network along with various UIs. Also, the controller 170 may control display of an image related to the executed application on the display 180, upon user selection.

In an embodiment of the present invention, when the image display apparatus 100 provides a game application, the controller 170 may control assignment of player IDs to specific user terminals, creation of game play information by executing the game application, transmission of the game play information to the user terminals through the network interface 130, and reception of the game play information at the user terminals.

The controller 170 may control detection of user terminals connected to the image display apparatus 100 over a network through the network interface 130, display of a list of the detected user terminals on the display 180 and reception of a selection signal indicating a user terminal selected for use as a user controller from among the listed user terminals through the user input interface 150.

The controller 170 may control output of a game play screen of the game application, inclusive of player information about each user terminal and game play information, through the display 180.

The controller 170 may determine the specific signal received from a user terminal through the network interface 130 as game play information and thus control the game play information to be reflected in the game application in progress.

The controller 170 may control transmission of the game play information about the game application to a specific server connected to the image display apparatus 100 over a network through the network interface 130.

As another embodiment, upon receipt of information about a change in the game play information from the server through the network interface 130, the controller 170 may control output of a notification message in a predetermined area of the display 180.

The image display apparatus 100 may further include a channel browsing processor (not shown) for generating thumbnail images corresponding to channel signals or external input signals.

The channel browsing processor may extract some of the video frames of each of stream signals TS received from the demodulator 120 or stream signals received from the external device interface 135 and display the extracted video frames on the display 180 as thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touch screen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

To sense a user gesture, the image display apparatus 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The image display apparatus 100 may further include the camera unit (not shown) for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the image display apparatus 100. Particularly, the power supply 190 may supply power to the controller 170, the display 180, and the audio output unit 185, which may be implemented as a System On Chip (SOC).

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, UWB and ZigBee.

In addition, the remote controller 200 may receive a video signal, an audio signal or a data signal from the user input interface 150 and output the received signals visually, audibly or as vibrations.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display apparatus 100 illustrated in FIG. 6 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed. In addition, the function of each block is described for the purpose of describing the embodiment of the present invention and thus specific operations or devices should not be construed as limiting the scope and spirit of the present invention.

Unlike the configuration illustrated in FIG. 6, the image display apparatus 100 may be configured so as to receive and playback video content through the network interface 130 or the external device interface 135, without the tuner 100 and the demodulator 120.

The image display apparatus 100 is an example of image signal processing apparatus that processes a stored image or an input image. Other examples of the image signal processing apparatus include a set-top box without the display 180 and the audio output unit 185, a DVD player, a Blu-ray player, a game console, and a computer. The set-top box will be described later with reference to FIGS. 7 and 8.

Figure 7:
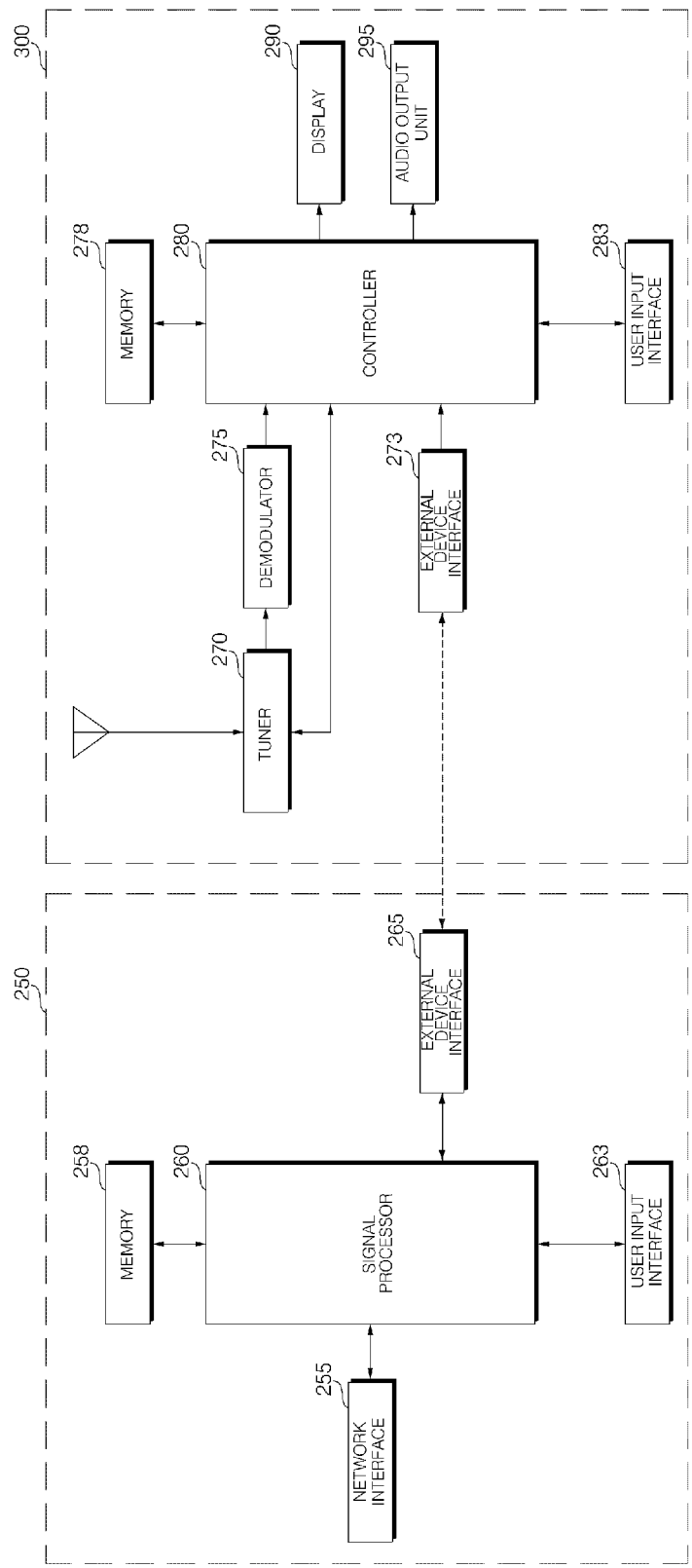
FIGS. 7 and 8 are block diagrams illustrating either of the image display apparatuses separately as a set-top box and a display device according to embodiments of the present invention.
Figure 8:
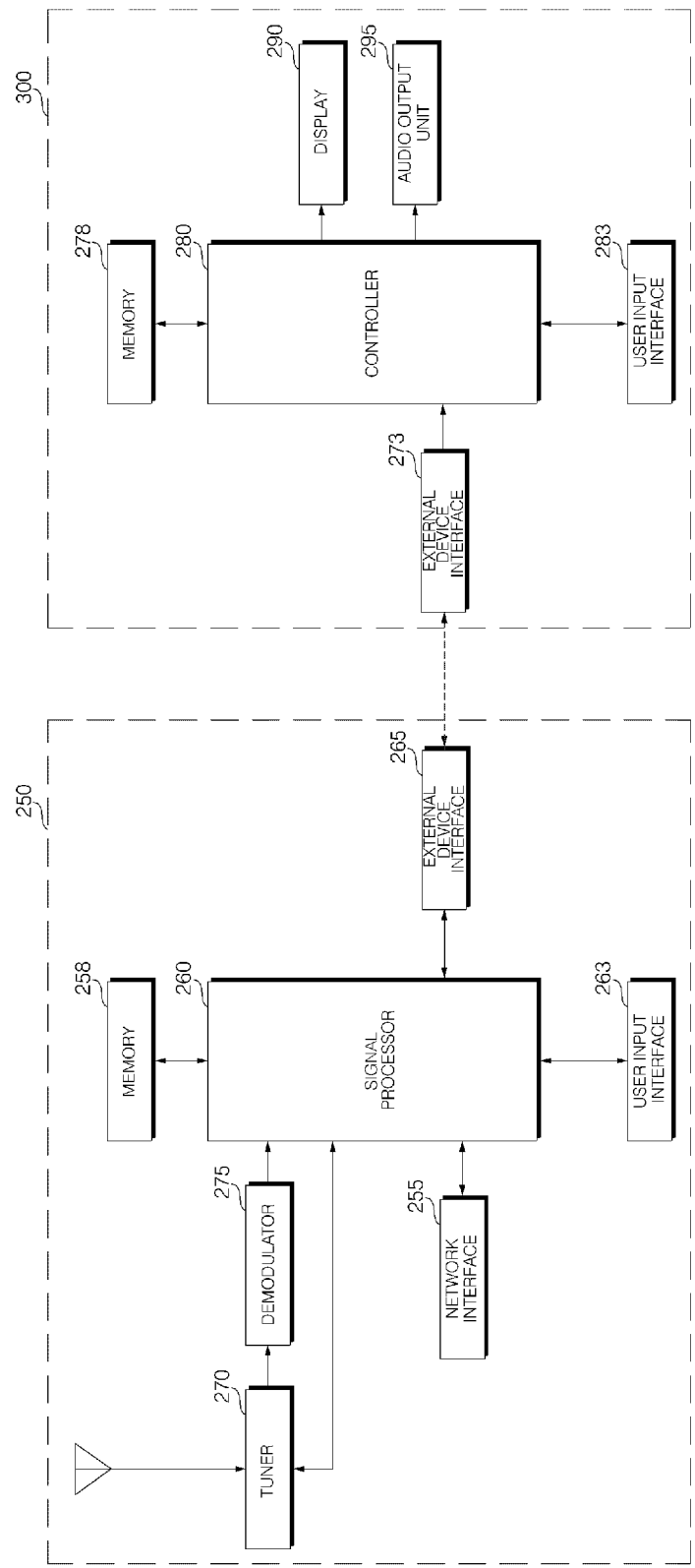

FIGS. 7 and 8 are block diagrams illustrating either of the image display apparatuses separately as a set-top box and a display device according to embodiments of the present invention.

Referring to FIG. 7, a set-top box 250 and a display device 300 may transmit or receive data wirelessly or by wire.

The set-top box 250 may include a network interface 255, a memory 258, a signal processor 260, a user input interface 263, and an external device interface 265.

The network interface 255 serves as an interface between the set-top box 250 and a wired/wireless network such as the Internet. The network interface 255 may transmit data to or receive data from another user or another electronic device over a connected network or over another network linked to the connected network.

The memory 258 may store programs necessary for the signal processor 260 to process and control signals and temporarily store a video, audio and/or data signal received from the external device interface 265 or the network interface 255. The memory 258 may also store platforms illustrated in FIGS. 11 and 12, as described later.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the display device 300 through the external device interface 265.

The user input interface 263 transmits a signal received from the user to the signal processor 260 or a signal received from the signal processor 260 to the user. For example, the user input interface 263 may receive various control signals such as a power on/off signal, an operation input signal, and a setting input signal through a local key (not shown) or the remote controller 200 and output the control signals to the signal processor 260.

The external device interface 265 serves as an interface between the set-top box 250 and an external device that is connected wirelessly or by wire, particularly the display device 300, for signal transmission or reception. The external device interface 265 may also interface with an external device such as a game console, a camera, a camcorder, and a computer (e.g. a laptop computer), for data transmission or reception.

The set-top box 250 may further include a media input unit for media playback. The media input unit may be a Blu-ray input unit, for example. That is, the set-top box 250 may include a Blu-ray player. After signal processing such as demultiplexing or decoding in the signal processor 260, a media signal from a Blu-ray disk may be transmitted to the display device 300 through the external device interface 265 so as to be displayed on the display device 300.

The display device 300 may include a tuner 270, an external device interface 273, a demodulator 275, a memory 278, a controller 280, a user input interface 283, a display 290, and an audio output unit 295.

The tuner 270, the demodulator 275, the memory 278, the controller 280, the user input interface 283, the display 290, and the audio output unit 295 are identical respectively to the tuner 110, the demodulator 120, the memory 140, the controller 170, the user input interface 150, the display 180, and the audio output unit 185 illustrated in FIG. 6 and thus a description thereof is not provided herein.

The external device interface 273 serves as an interface between the display device 300 and a wireless or wired external device, particularly the set-top box 250, for data transmission or reception.

Hence, a video signal or an audio signal received through the set-top box 250 is output through the display 290 or the audio output unit 295 through the controller 280.

Referring to FIG. 8, the configuration of the set-top box 250 and the display device 300 illustrated in FIG. 8 is similar to that of the set-top box 250 and the display device 300 illustrated in FIG. 7, except that the tuner 270 and the demodulator 275 reside in the set-top box 250, not in the display device 300. Thus, the following description is given focusing on such difference.

The signal processor 260 may process a broadcast signal received through the tuner 270 and the demodulator 275. The user input interface 263 may receive a channel selection input, a channel store input, etc.

Figure 9:
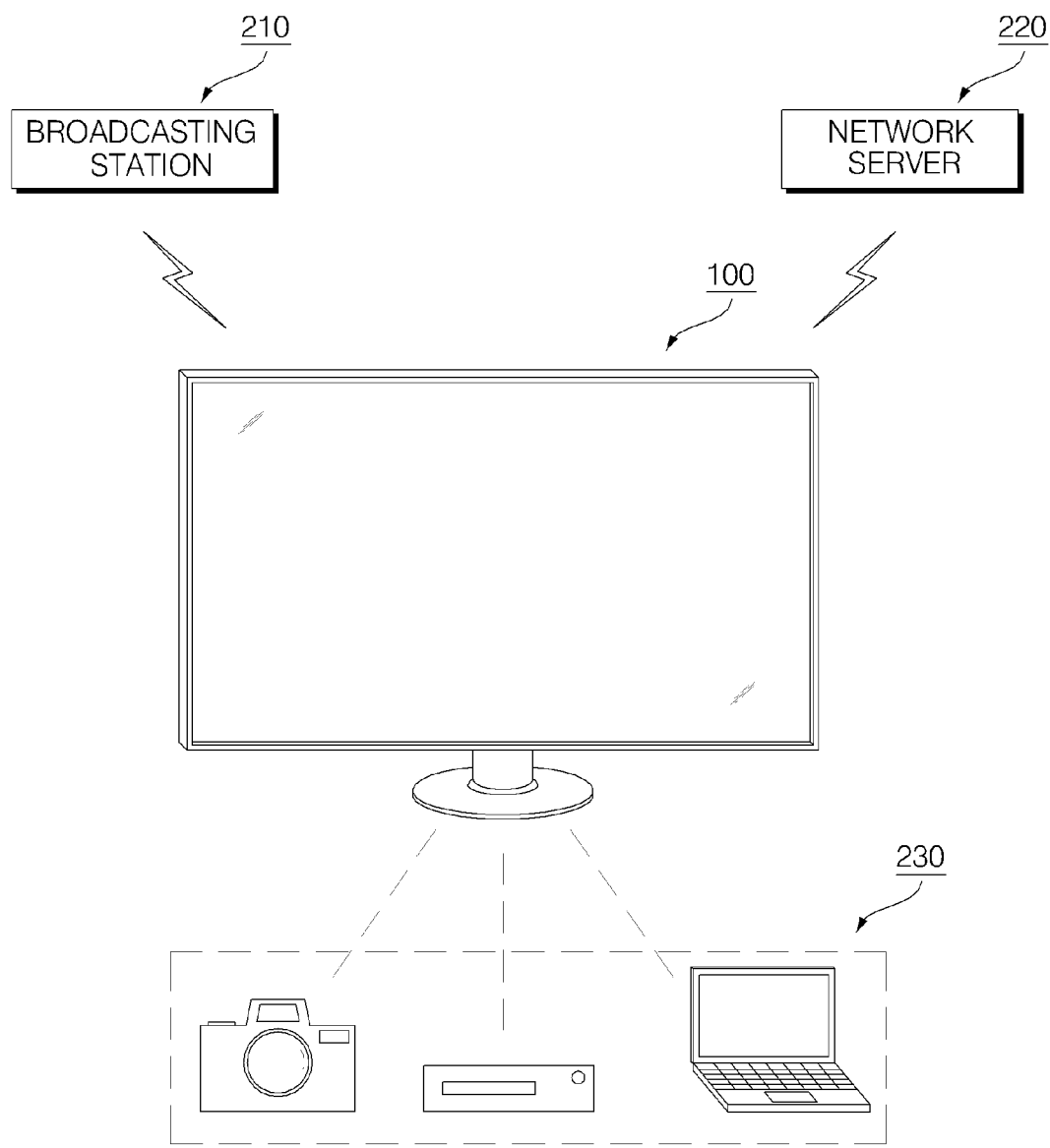
FIG. 9 illustrates an operation for communicating with third devices in either of the image display apparatuses according to an embodiment of the present invention.

FIG. 9 illustrates an operation for communicating with third devices in either of the image display apparatuses according to an embodiment of the present invention. The image display apparatus illustrated in FIG. 9 may be one of the afore-described image display apparatuses according to the embodiments of the present invention.

Referring to FIG. 9, the image display apparatus 100 may communicate with a broadcasting station 210, a network server 220, or an external device 230.

The image display apparatus 100 may receive a broadcast signal including a video signal from the broadcasting station 210. The image display apparatus 100 may process the audio and video signals of the broadcast signal or the data signal of the broadcast signal, suitably for transmission from the image display apparatus 100. The image display apparatus 100 may output images or sound based on the processed video or audio signal.

Meanwhile, the image display apparatus 100 may communicate with the network server 220. The network server 200 is capable of transmitting signals to and receiving signals from the image display apparatus 100 over a network. For example, the network server 220 may be a portable terminal that can be connected to the image display apparatus 100 through a wired or wireless base station. In addition, the network server 200 may provide content to the image display apparatus 100 over the Internet. A CP may provide content to the image display apparatus 100 through the network server 220.

The image display apparatus 100 may communicate with the external device 230. The external device 230 can transmit and receive signals directly to and from the image display apparatus 100 wirelessly or by wire. For instance, the external device 230 may be a media memory device or a player. That is, the external device 230 may be any of a camera, a DVD player, a Blu-ray player, a PC, etc.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230 and may transmit a signal received from the external device 230 to the broadcasting station 210 or the network server 220. That is, the image display apparatus 100 may transmit content included in signals received from the broadcasting station 210, the network server 220, and the external device 230, as well as playback the content immediately.

Figure 10:
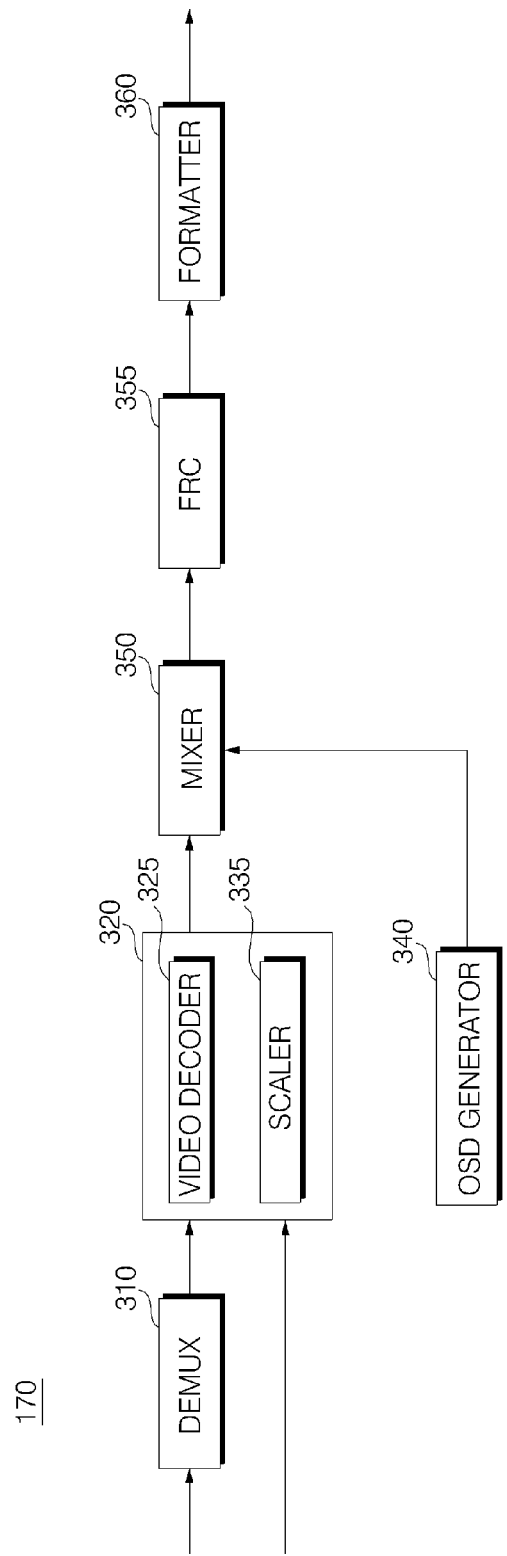
FIG. 10 is a block diagram of a controller illustrated in FIG. 6.

FIG. 10 is a block diagram of the controller illustrated in FIG. 6.

Referring to FIG. 10, the controller 170 may include a DEMUX 310, a video processor 320, an OSD generator 340, a mixer 350, a Frame Rate Converter (FRC) 355, and a formatter 360 according to an embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

If the demultiplexed video signal is, for example, an MPEC-2 encoded video signal, the video signal may be decoded by an MPEC-2 decoder.

On the other hand, if the video signal is an H.264-encoded DMB or DVB-handheld (DVB-H) signal, the video signal may be decoded by an H.264 decoder.

The video signal decoded by the video processor 320 is provided to the mixer 350.

The OSD generator 340 generates an OSD signal autonomously or according to user input. For example, the OSD generator 340 may generate signals by which a variety of information is displayed as images or text on the display 180, according to control signals received from the user input interface 150. The OSD signal may include various data such as a UI, a variety of menu screens, widgets, icons, etc.

For example, the OSD generator 340 may generate a signal by which subtitles are displayed for a broadcast image or Electronic Program Guide (EPG)-based broadcasting information.

The mixer 350 may mix the decoded video signal with the OSD signal and output the mixed signal to the formatter 360. As the decoded broadcast video signal or the external input signal is mixed with the OSD signal, an OSD may be overlaid on the broadcast image or the external input image.

The FRC 355 may change the frame rate of an input image. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 360 changes the format of the signal received from the FRC 355 to be suitable for the display 180. For example, the formatter 360 may convert a received signal into an RGB data signal. The RGB signal may be output in the form of a Low Voltage Differential Signal (LVDS) or mini-LVDS.

The audio processor (not shown) of the controller 170 may process the demultiplexed audio signal. For audio signal processing, the audio processor may have a plurality of decoders.

If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor of the controller 170 may also adjust the bass, treble or volume of the audio signal.

The data processor (not shown) of the controller 170 may process the data signal obtained by demultiplexing the input stream signal. For example, if the data signal is an encoded signal such as an EPG which includes broadcasting information specifying the start time, end time, etc. of scheduled broadcast TV or radio programs, the controller 170 may decode the data signal. Examples of an EPG include ATSC-Program and System Information Protocol (PSIP) information and DVB-Service Information (SI).

ATSC-PSIP information or DVB-SI may be included in the header of a TS, i.e., a 4-byte header of an MPEG-2 TS.

The block diagram of the controller 170 illustrated in FIG. 10 is an embodiment of the present invention. Depending upon the specifications of the controller 170, the components of the controller 170 may be combined, or omitted. Or new components are added to the controller 170.

Figure 11:
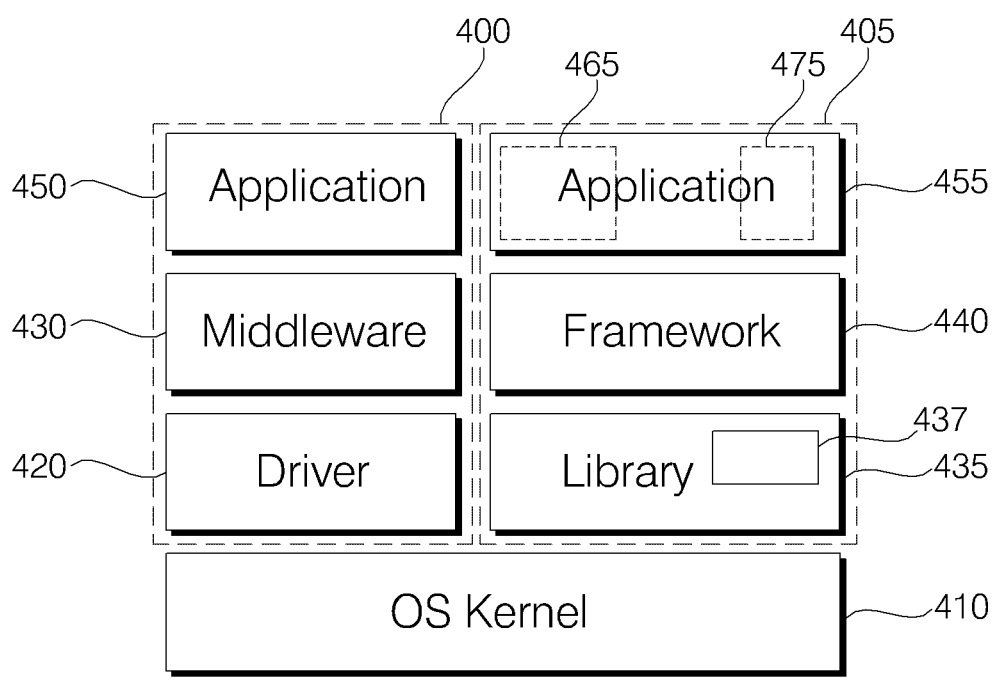
FIG. 11 illustrates a platform architecture for either of the image display apparatuses according to an embodiment of the present invention.
Figure 12:
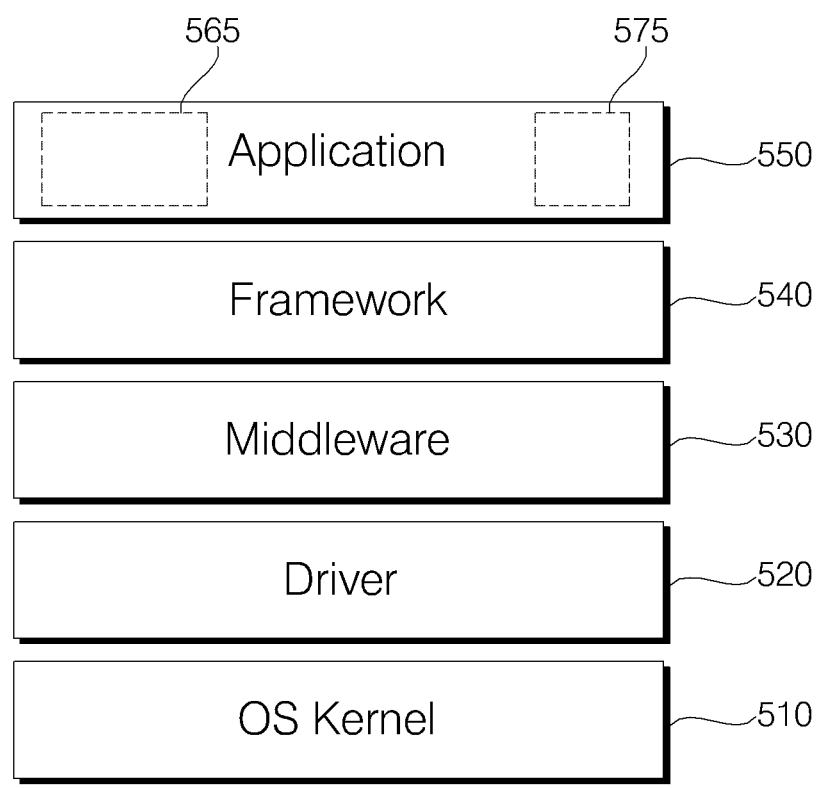
FIG. 12 illustrates a platform architecture for either of the image display apparatuses according to another embodiment of the present invention.

FIG. 11 illustrates a platform architecture for either of the image display apparatuses according to an embodiment of the present invention and FIG. 12 illustrates a platform architecture for either of the image display apparatuses according to another embodiment of the present invention.

A platform for either of the image display apparatuses may have OS-based software to implement the above-described various operations according to an embodiment of the present invention.

Referring to FIG. 11, a platform for either of the image display apparatuses is a separate type according to an embodiment of the present invention. The platform may be designed separately as a legacy system platform 400 and a smart system platform 405. An OS kernel 410 may be shared between the legacy system platform 400 and the smart system platform 405.

The legacy system platform 400 may include a stack of a driver 420, middleware 430, and an application layer 450 on the OS kernel 410.

On the other hand, the smart system platform 405 may include a stack of a library 435, a framework 440, and an application layer 455 on the OS kernel 410.

The OS kernel 410 is the core of an operating system. When the image display apparatus is driven, the OS kernel 410 may be responsible for operation of at least one of hardware drivers, security protection for hardware and processors in the image display apparatus, efficient management of system resources, memory management, hardware interfacing by hardware abstraction, multi-processing, or scheduling associated with the multi-processing. Meanwhile, the OS kernel 410 may further perform power management.

The hardware drivers of the OS kernel 410 may include, for example, at least one of a display driver, a Wi-Fi driver, a Bluetooth driver, a USB driver, an audio driver, a power manager, a binder driver, or a memory driver.

Alternatively or additionally, the hardware drivers of the OS kernel 410 may be drivers for hardware devices within the OS kernel 410. The hardware drivers may include a character device driver, a block device driver, and a network device driver. The block device driver may need a buffer for buffering data on a block basis, because data is transmitted on a block basis. The character device driver may not need a buffer since data is transmitted on a basic data unit basis, that is, on a character basis.

The OS kernel 410 may be implemented based on any of various OSs such as Unix (Linux), Windows, etc. The OS kernel 410 may be a general-purpose open OS kernel which can be implemented in other electronic devices.

The driver 420 is interposed between the OS kernel 410 and the middleware 430. Along with the middleware 430, the driver 420 drives devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 410.

In addition, the driver 420 may further include a driver for the remote controller 200, especially a pointing device to be described below. The remote controller driver may reside in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 450 that runs atop the middleware 430 in the legacy system platform 400 may include, for example, UI applications associated with various menus in the image display apparatus. The application layer 450 may allow editing and updating over a network by user selection. With use of the application layer 450, the user may enter a desired menu among various UIs by manipulating the remote controller 210 while viewing a broadcast program.

The application layer 450 may further include at least one of a TV guide application, a Bluetooth application, a reservation application, a Digital Video Recorder (DVR) application, and a hotkey application.

In the smart system platform 405, the library 435 is positioned between the OS kernel 410 and the framework 440, forming the basis of the framework 440. For example, the library 435 may include Secure Socket Layer (SSL) being a security-related library, WebKit being a Web engine-related library, c library (libc), and Media Framework being a media-related library specifying, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver (not shown) of the OS kernel 410 may operate.

The binder driver and the runtime 437 may connect Java applications to C-based libraries.

The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include supporting programs and programs for interconnecting different software components. For example, the framework 440 may include an activity manager related to activities of applications, a notification manager, and a CP for abstracting common information between applications. This framework 440 may be written in Java.

The application layer 455 on top of the framework 440 includes a variety of programs that are executed and displayed in the image display apparatus. The application layer 455 may include, for example, a core application that is a suit having at least one solution of e-mail, Short Message Service (SMS), calendar, map, or browser. The application layer 455 may be written in Java.

In the application layer 455, applications may be categorized into user-undeletable applications 465 stored in the image display apparatus 100 that cannot be modified and user-installable or user-deletable applications 475 that are downloaded from an external device or a network and stored in the image display apparatus. In other embodiments, the user-undeletable applications 465 may actually be editable upon entry of a code or confirmation or other override.

With the applications of the application layer 455, a variety of functions such as Internet telephony, VoD, Web album, Social Networking Service (SNS), Location-Based Service (LBS), map service, Web browsing, and application search may be performed through network access. In addition, other functions such as gaming and schedule management may be performed by the applications.

Referring to FIG. 12, a platform for the image display apparatus according to another embodiment of the present invention is an integrated type. The integrated platform may include an OS kernel 510, a driver 520, middleware 530, a framework 540, and an application layer 550.

Compared to the separate-type platform illustrated in FIG. 11, the integrated-type platform is characterized by the absence of the library 435 and the application layer 550 being an integrated layer. The driver 520 and the framework 540 correspond to the driver 420 and the framework 440 of FIG. 5, respectively.

The library 435 of FIG. 11 may be incorporated into the middleware 530. That is, the middleware 530 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, whereas the image display system middleware includes SSL as a security-related library, WebKit as a Web engine-related library, libc, and Media Framework as a media-related library. The middleware 530 may further include the afore-described runtime.

The application layer 550 may include a menu-related application, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus and user-installable or user-deletable applications 575 that are downloaded from an external device or a network and stored in the image display apparatus.

Based on the afore-described platforms illustrated in FIGS. 11 and 12, a variety of Application Programming Interfaces (APIs) and Software Development Kits (SDKs) necessary to develop applications may be opened. APIs may be implemented functions that provide connectivity to specific subroutines, for execution of the functions within a program. Or APIs may be implemented programs.

For example, sources related to hardware drivers of the OS kernel 410, such as a display driver, a WiFi driver, a Bluetooth driver, a USB driver or an audio driver, may be opened. Related sources within the driver 420 such as a driver for a microcomputer, a display module, a GPU, an FRC, an SDEC, a VDEC, an ADEC or a pointing device may be opened. In addition, sources related to PSIP or SI middleware as broadcasting information-related middleware or sources related to DLNA middleware may be opened.

Such various open APIs allow developers to create applications executable in the image display apparatus 100 or applications required to control operations of the image display apparatus 100 based on the platforms illustrated in FIGS. 11 and 12.

The platforms illustrated in FIGS. 11 and 12 may be general-purpose ones that can be implemented in many other electronic devices as well as in image display apparatuses. The platforms may be stored or loaded in the memory 140, the controller 170, or any other processor (not shown). To execute applications, an additional application processor (not shown) may be further provided.

Figure 13:
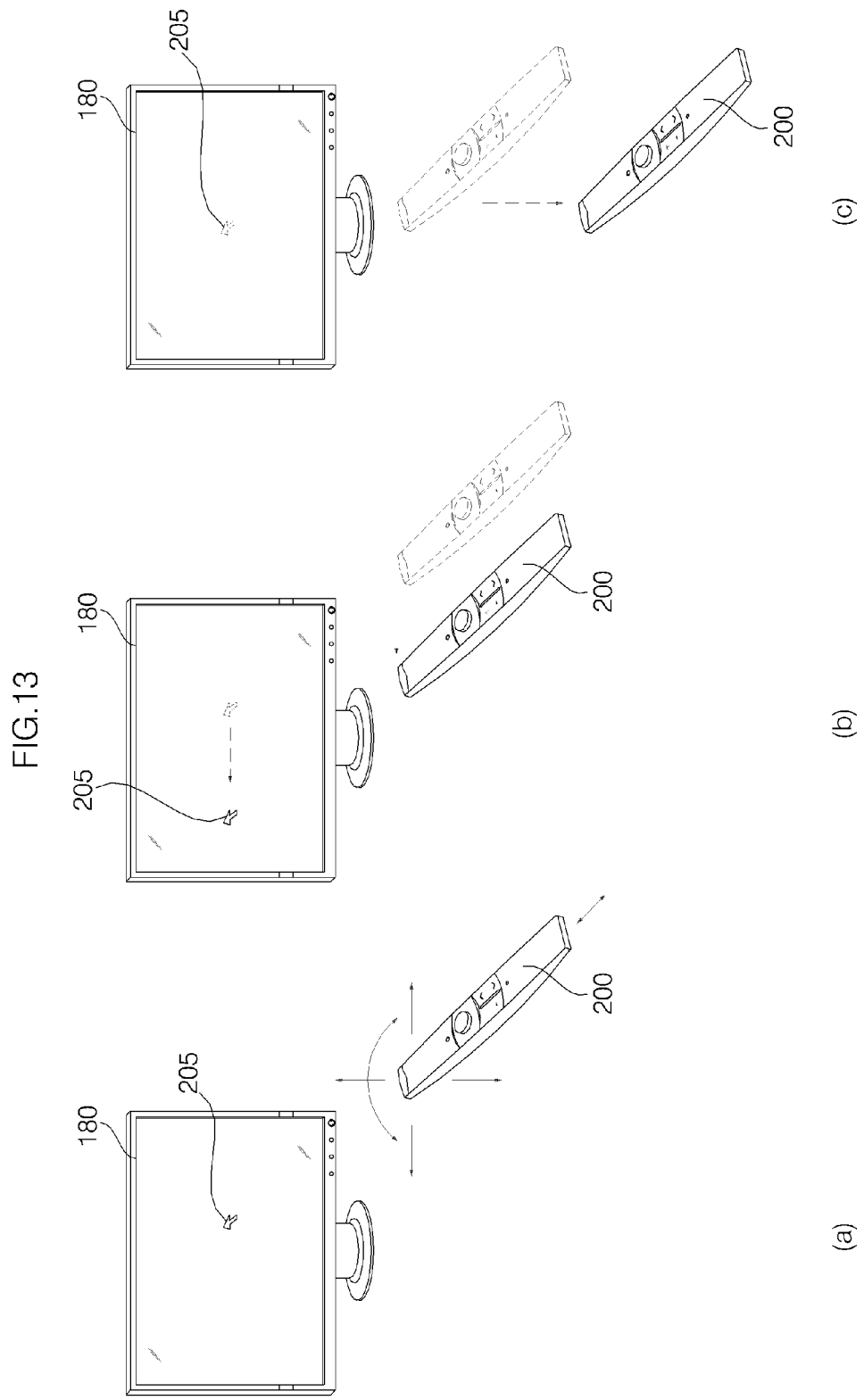
FIG. 13 illustrates a method for controlling either of the image display apparatuses in a remote controller according to an embodiment of the present invention.

FIG. 13 illustrates a method for controlling either of the image display apparatuses using a remote controller according to an embodiment of the present invention.

FIG. 13(*a*) illustrates a pointer 205 representing movement of the remote controller 200 displayed on the display 180.

The user may move or rotate the remote controller 200 up and down, side to side (FIG. 13(*b*)), and back and forth (FIG. 13(*c*)). Since the pointer 205 moves in accordance with the movement of the remote controller 200, the remote controller 200 may be referred to as a pointing device.

Referring to FIG. 13(*b*), if the user moves the remote controller 200 to the left, the pointer 205 moves to the left on the display 180. A sensor of the remote controller 200 detects the movement of the remote controller 200 and transmits motion information corresponding to the result of the detection to the image display apparatus. Then, the image display apparatus determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus then displays the pointer 205 at the calculated coordinates.

Referring to FIG. 13(*c*), while pressing a predetermined button of the remote controller 200, the user moves the remote controller 200 away from the display 180. Then, a selected area corresponding to the pointer 205 may be zoomed in on and enlarged on the display 180. On the contrary, if the user moves the remote controller 200 toward the display 180, the selection area corresponding to the pointer 205 is zoomed out and thus contracted on the display 180. The opposite case is possible. That is, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

The pointer 205 is an object displayed on the display 180 in correspondence with the movement of the remote controller 200. Therefore, the pointer 205 may have various shapes other than the arrow illustrated in FIG. 13. For example, the pointer 205 may be a dot, a cursor, a prompt, a thick outline, etc. The pointer 205 may be displayed across a plurality of points, such as a line and a surface, as well as at a single point on horizontal and vertical axes.

Figure 14:
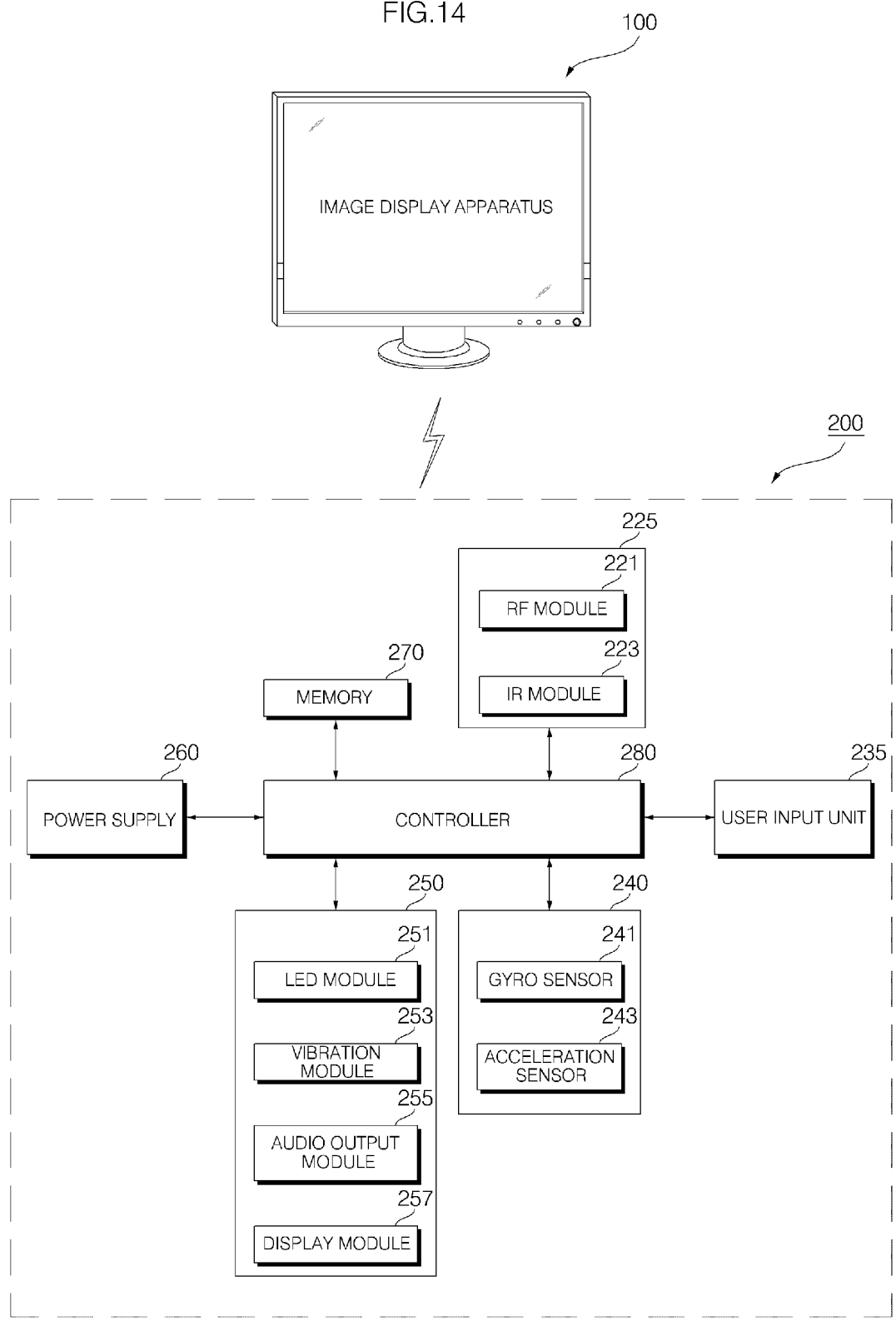
FIG. 14 is a detailed block diagram of the remote controller in either of the image display apparatuses according to an embodiment of the present invention.

FIG. 14 is a detailed block diagram of the remote controller in either of the image display apparatuses according to an embodiment of the present invention.

Referring to FIG. 14, the remote controller 200 may include a wireless communication module 225, a user input unit 235, a sensor unit 240, an output unit 250, a power supply 260, a memory 270, and a controller 280.

The wireless communication module 225 transmits signals to and/or receives signals from either of the afore-described image display apparatuses according to the embodiments of the present invention, herein, the image display apparatus 100.

The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

The remote controller 200 transmits motion information representing the movement of the remote controller 200 to the image display apparatus 100 through the RF module 221 in this embodiment. The remote controller 200 may also receive signals from the image display apparatus 100 through the RF module 221. As needed, the remote controller 200 may transmit commands such as a power on/off command, a channel switch command, or a volume change command to the image display apparatus 100 through the IR module 223.

The user input unit 235 may include a keypad, a plurality of buttons, a touchpad and/or a touch screen. The user may enter commands to the image display apparatus 100 by manipulating the user input unit 235. If the user input unit 235 includes a plurality of hard buttons, the user may input various commands to the image display apparatus 100 by pressing the hard buttons. Alternatively or additionally, if the user input unit 235 includes a touch screen displaying a plurality of soft keys, the user may input various commands to the image display apparatus 100 by touching the soft keys. The user input unit 235 may also include various input tools other than those set forth herein, such as a scroll key and/or a jog wheel, which should not be construed as limiting the present invention.

The sensor unit 240 may include a gyro sensor 241 and/or an acceleration sensor 243. The gyro sensor 241 may sense the movement of the remote controller 200, for example, in X-, Y-, and Z-axis directions, and the acceleration sensor 243 may sense the speed of the remote controller 200. The sensor unit 240 may further include a distance sensor for sensing the distance between the remote controller 200 and the display 180.

The output unit 250 may output a video and/or audio signal corresponding to manipulation of the user input unit 235 or corresponding to a signal received from the image display apparatus 100. The user may easily identify whether the user input unit 235 has been manipulated or whether the image display apparatus 100 has been controlled, based on the video and/or audio signal output by the output unit 250.

The output unit 250 may include a Light Emitting Diode (LED) module 351 which is turned on or off whenever the user input unit 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 is kept stationary for a predetermined time or longer, the power supply 260 may, for example, reduce or shut off supply of power to the spatial remote controller 200 in order to save power. The power supply 260 may resume power supply if a predetermined key on the spatial remote controller 200 is manipulated.

The memory 270 may store various types of programs and application data necessary to control or drive the remote controller 200. The spatial remote controller 200 may wirelessly transmit signals to and/or receive signals from the image display apparatus 100 over a predetermined frequency band with the aid of the RF module 221. The controller 280 of the remote controller 200 may store information regarding the frequency band used for the remote controller 200 to wirelessly transmit signals to and/or wirelessly receive signals from the paired image display apparatus 100 in the memory 270, for later use.

The controller 280 provides overall control to the remote controller 200. The controller 280 may transmit a signal corresponding to a key manipulation detected from the user input unit 235 or a signal corresponding to motion of the spatial remote controller 200, as sensed by the sensor unit 240, to the image display apparatus 100.

FIGS. 15 to 18 illustrate UIs in either of the image display apparatuses according to embodiments of the present invention.

Figure 15:
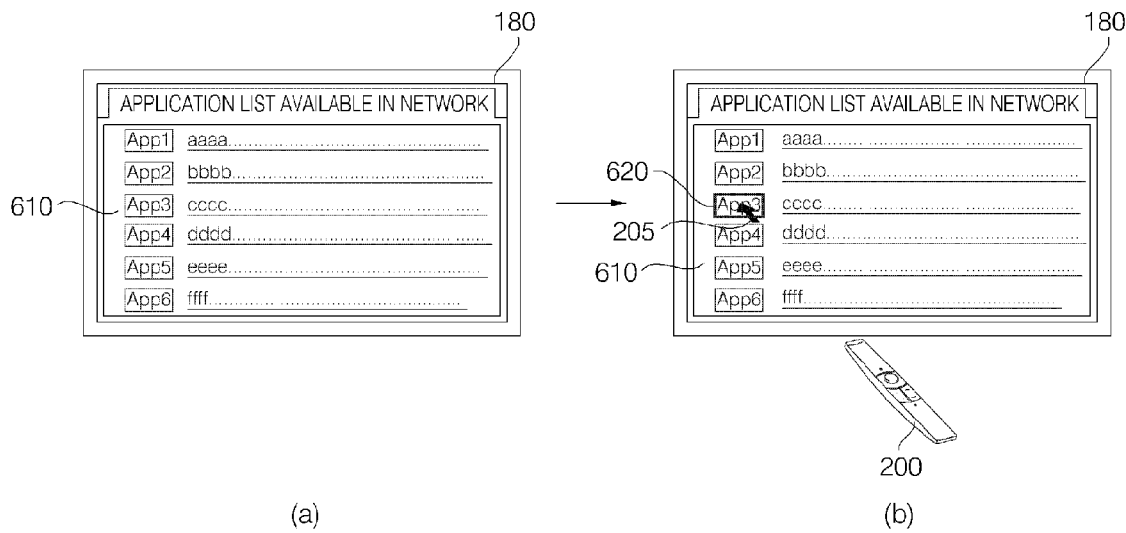
FIG. 15 illustrates a UI in either of the image display apparatuses according to an embodiment of the present invention.

Referring to FIG. 15, an application list available from a network is displayed on the display 180. A user may access a CP or an NP directly, search for various applications, and download the applications from the CP or the NP.

Specifically, FIG. 15(a) illustrates an application list 610 available in a connected server, displayed on the display 180. The application list 610 may include an icon representing each application and a brief description of the application. Because each of the image display apparatuses according to the embodiments of the present invention is capable of full browsing, the present invention may enlarge the icons or descriptions of applications received from the connected server on the display 180. Accordingly, the user can readily identify applications, which will be described later.

FIG. 15(b) illustrates selection of one application 620 from the application list 610 using the pointer 205 of the remote controller 200. Thus, the selected application 620 may be easily downloaded.

Figure 16:
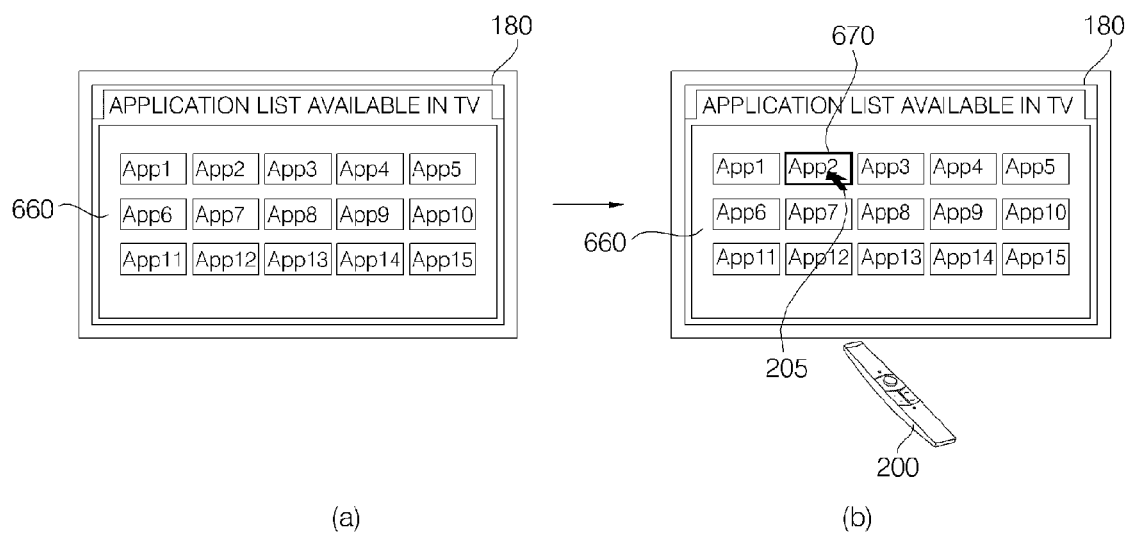
FIG. 16 illustrates a UI in either of the image display apparatuses according to another embodiment of the present invention.

FIG. 16 illustrates an application list available in the image display apparatus, displayed on the display 180. Referring to FIG. 16(a), when the user selects an application list view menu by manipulating the remote controller 200, a list of applications 660 stored in the image display apparatus is displayed on the display 180. While only icons representing the applications are shown in FIG. 16, the application list 660 may further include brief descriptions of the applications, like the application list 610 illustrated in FIG. 15. Therefore, the user can readily identify the applications.

FIG. 16(b) illustrates selection of one application 670 from the application list 660 using the pointer 205 of the remote controller 200. Thus, the selected application 670 may be easily executed.

While FIGS. 15 and 16 show that the user selects a desired application by moving the pointer 205 using the remote controller 200, the application may be selected in many other ways. For example, the user may select a specific application using a cursor displayed on the display 180 by a combined input of a local key and an OK key in the remote controller 200.

In another example, if the remote controller 200 has a touch pad, the pointer 205 moves on the display 180 according to touch input of the touch pad. Thus, the user may select a specific menu using the touch-based pointer 205.

Figure 17:
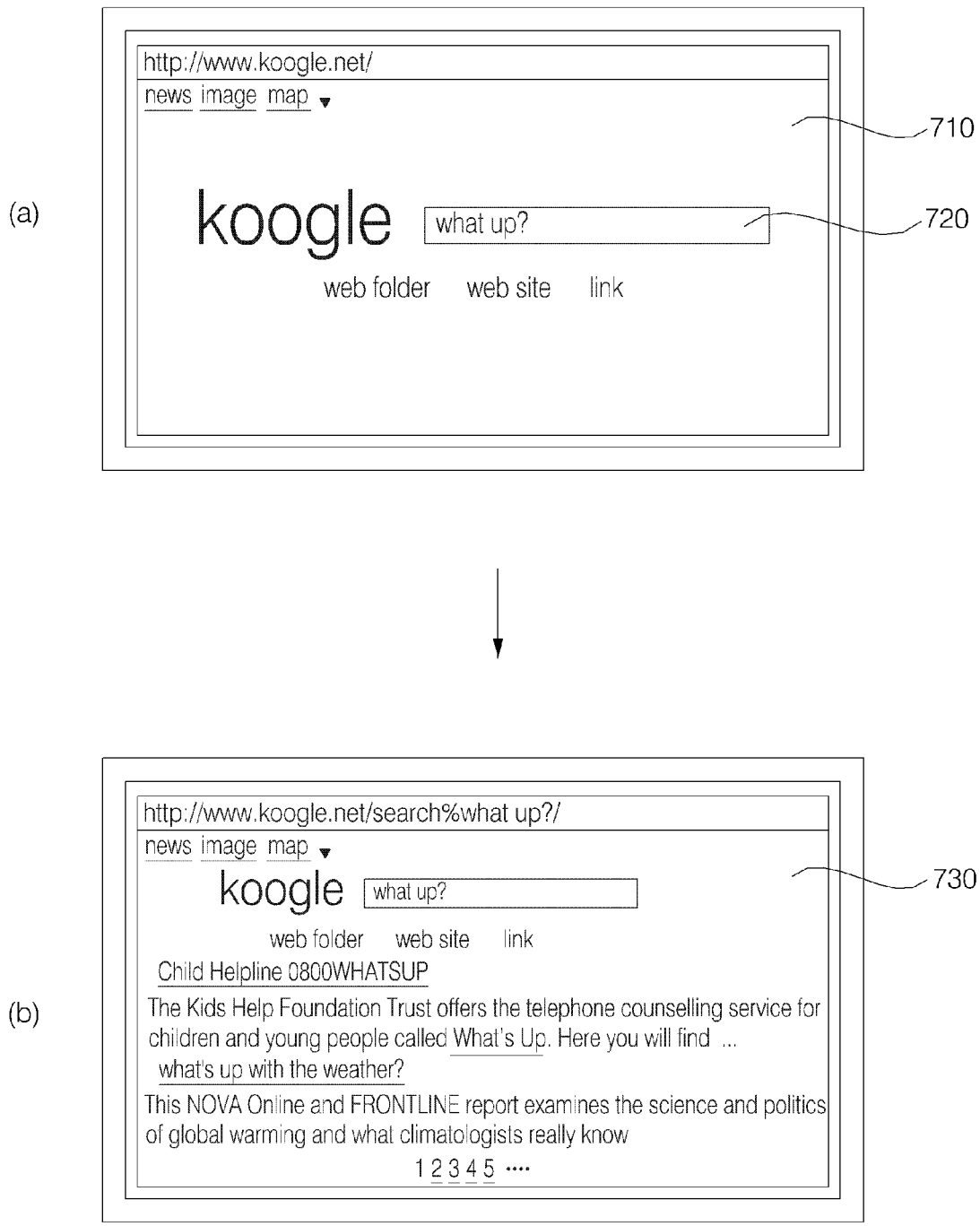
FIG. 17 illustrates a UI in either of the image display apparatuses according to another embodiment of the present invention.

FIG. 17 illustrates a Web page displayed on the display 180. Specifically, FIG. 17(a) illustrates a Web page 710 with a search window 720, displayed on the display 180. The user may enter a character into the search window 720 by use of character keys (not shown) of a keypad displayed on a screen, character keys (not shown) provided as local keys or character keys (not shown) of the remote controller 200.

FIG. 17(*b*) illustrates a search result page 730 having search results matching a keyword entered into the search window 720. Since the image display apparatuses according to the embodiments of the present invention are capable of fully browsing a Web page, the user can easily read the Web page.

FIG. 18 illustrates another Web page displayed on the display 180. Specifically, FIG. 18(*a*) illustrates a mail service page 810 including an ID input window 820 and a password input window 825, displayed on the display 180. The user may enter a specific numeral and/or text into the ID input window 820 and the password input window 825 using a keypad (not shown) displayed on the mail service page 810, character keys (not shown) provided as local keys, or character keys (not shown) of the remote controller 200. Hence, the user can log in to a mail service.

FIG. 18(*b*) illustrates a mail page 830 displayed on the display 180, after log-in to the mail service. For example, the mail page 830 may contains items "read mail", "write mail", "sent box", "received box", "recycle bin", etc. In the "received box" item, mail may be ordered by sender or by title.

The image display apparatuses according to the embodiments of the present invention are capable of full browsing when displaying a mail service page. Therefore, the user can use the mail service conveniently.

Figure 19:
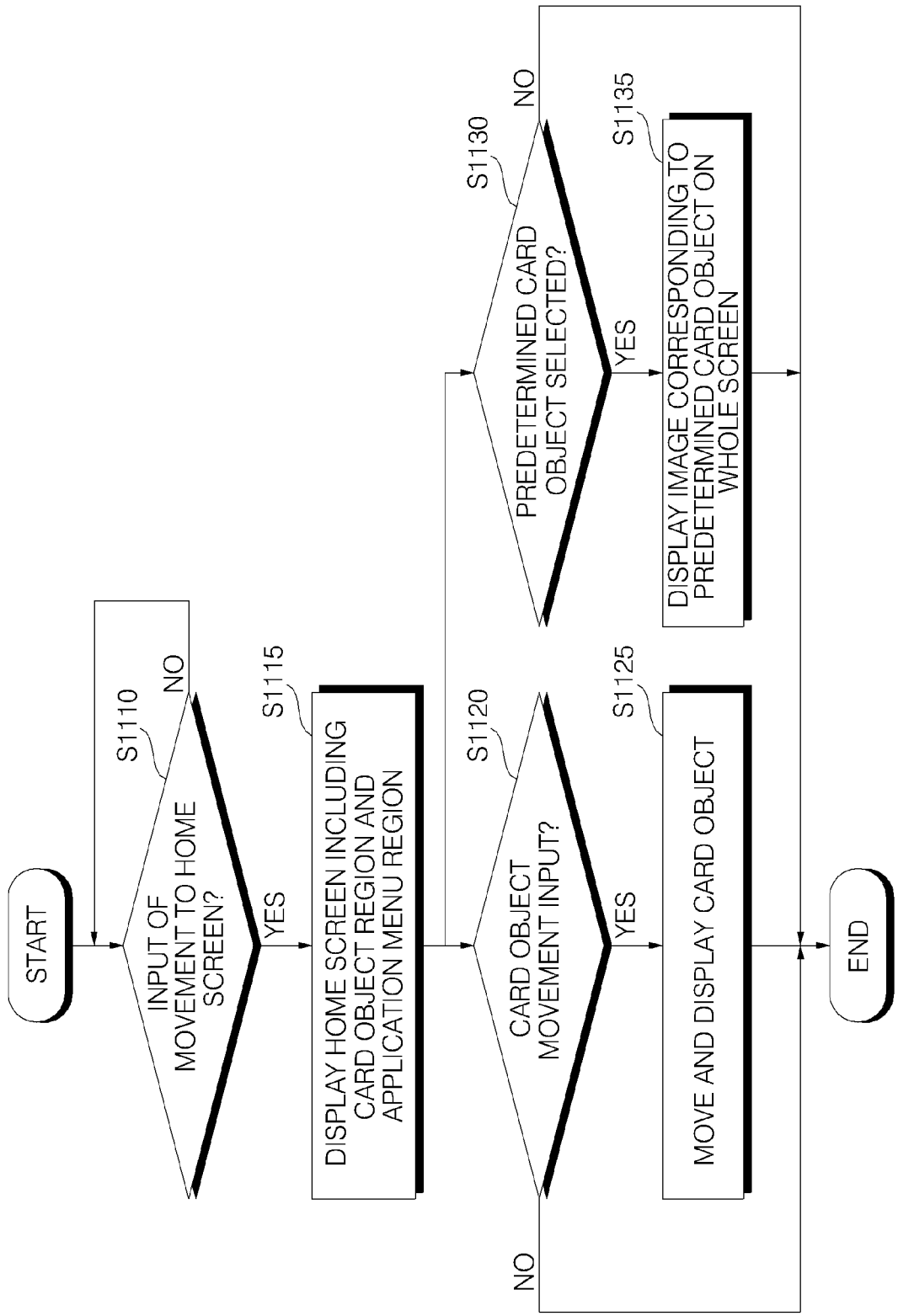
FIG. 19 is a flowchart illustrating a method of operating an image display apparatus according to an embodiment of the present invention.

FIG. 19 is a flowchart illustrating a method of operating an image display apparatus according to an embodiment of the present invention, and FIGS. 20 to 39 are views referred to for describing various examples of a method for operating the image display apparatus shown in FIG. 19.

Referring to FIG. 19, first, a determination as to whether or not there is a go-to-home input (S1110) is made. If Yes, a home screen including a card object area and an application menu area is displayed (S1115).

The controller 170 determines whether or not there is a go-to-home input by an input of a local key (not shown) or the remote controller 200. The input for the movement to the home screen may correspond to power on, standby mode on, or an operation of the local key (not shown) and a home key or a menu key included in the remote controller 200.

If there is a go-to-home input, the controller 170 may control the home screen including the card object area and the application menu area to be displayed on the display 180.

The card object area in the home screen may include a plurality of card objects classified according to content sources. For example, the plurality of card objects may include a card object for displaying a broadcast image, a card object representing a content provider (CP) list, a card object representing an application provision list, etc. The card objects will be described later with respect to FIG. 20 or 21.

The application menu area in the home screen includes a plurality of application items, and, more particular, includes a preferred application or an application set by a user, etc. Such an application menu is a brief view menu of application items and may further include a full view application. The application menu will be described later with reference to FIG. 21.

Such a home screen may be displayed on the display 180 upon power on or by an input of the home key. By this screen configuration, the user can readily select a desired service. Thus, user convenience is increased.

Next, a determination is made as to whether or not there is a card object move input (1120). If yes, a card object is moved and displayed (S1125).

The controller 170 determines whether or not there is a card object move input from the local key (not shown) or the remote controller 200, in a state in which the home screen is displayed. If there is an input, the card object is controlled to be moved and displayed.

For example, if there is a flicking input for moving the card object displayed on the home screen to the left or the right using the pointer 205 representing the motion of the remote controller 200, the card object may be moved to the left or the right so as to be displayed. At this time, in addition to the card objects displayed on the home screen, if a predetermined card object is further included in a hidden area although not displayed, such a card object is replaced and is newly displayed in the card object area. Thus, the user can identify various card objects. This will be described in detail with reference to FIGS. 24 to 27.

Meanwhile, as another example, in the card object area, if there is a directional key input of the local key (not shown) or the remote controller 200 or a combination of the directional key input and an OK key input in a state in which a movement object (for example, left movement or right movement) for the movement of the card object area is displayed, the card objects may be moved to the left or the right so as to be displayed. This will be described in detail with reference to FIGS. 28 to 31.

By the movement and display of the card objects, the user can readily identify the card object content.

Next, after step S1115, a determination is made as to whether or not a predetermined card object is selected (S1130). If yes, an image corresponding to the predetermined card object is displayed in full-screen (S1135).

The controller 170 determines whether or not there is an input for selecting a predetermined card object from the local key (not shown) or the remote controller 200 in a state in which the home screen is displayed. If yes, an image corresponding to the selected card object is controlled to be displayed on the full-screen.

For example, if a broadcast image card object is selected from among the card objects displayed on the home screen using the pointer 205 representing the motion of the remote controller 200, the broadcast image is controlled to be displayed in full-screen. This will be described in detail with reference to FIGS. 28 and 29.

Meanwhile, as another example, if a broadcast image card object is selected from among the card objects displayed on the home screen by the directional key input or the combination of the directional key input and the OK key input of the local key (not shown) or the remote controller 200, the broadcast image is controlled to be displayed in full-screen.

By the selection of the card object, the user can readily use a desired service.

Meanwhile, as described above, the operating method of FIG. 19 may correspond to the output of the data for displaying the image or the screen on the display 180, if the image display apparatus 100 is implemented as a set-top box without the display 180.

For example, the controller 170 may determine whether or not there is a go-to-home input in step S1110 and, if yes, output data for displaying the home screen including the card object area and the application menu area. Such data is input to the separate display 180 so as to be used for the home screen display.

The output of the data for displaying the image or the screen may be equally applied to steps S1125 and S1135.

Figure 20:
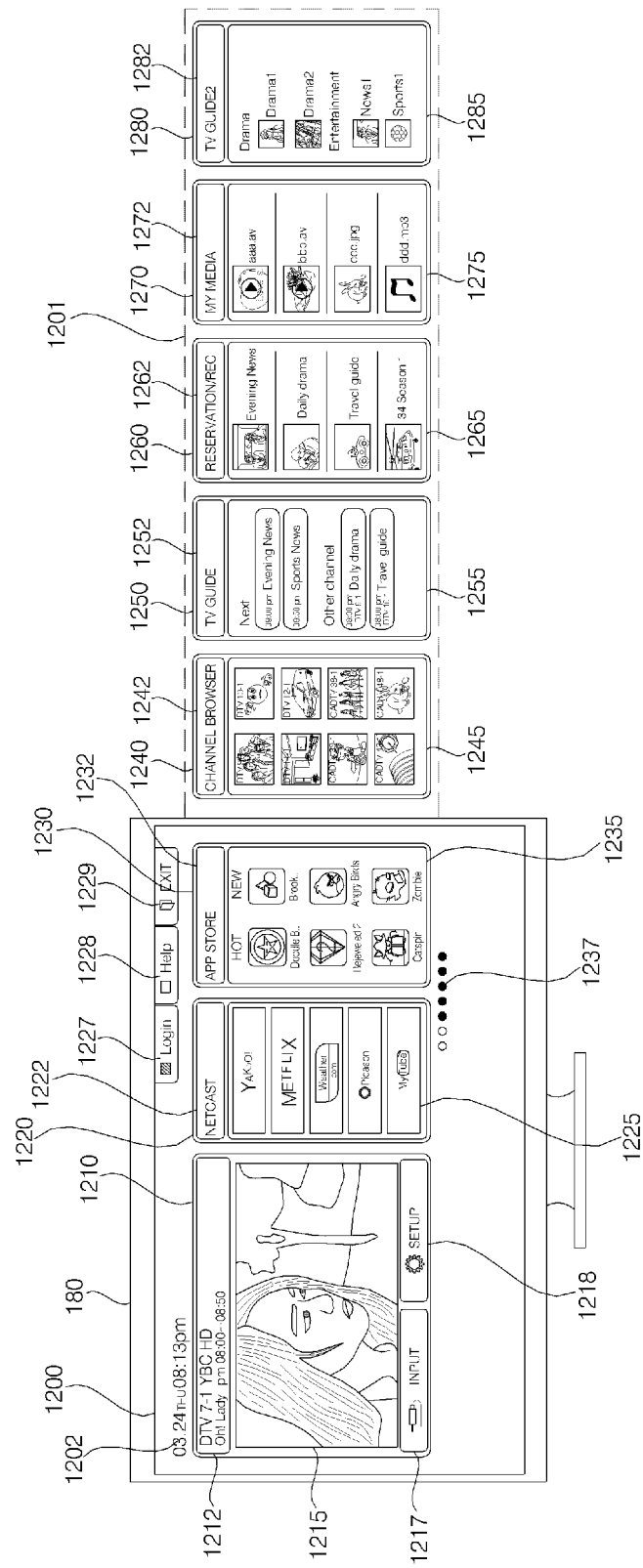

FIG. 20 shows an example of a home screen displayed on a display.

The home screen configuration shown in FIG. 20 is an example of a basic screen configuration of the above-described smart TV, and such a screen may be set to an initial screen upon power on or standby mode on or a basic screen by the operation of the local key (not shown) or the home key included in the remote controller 200.

The home screen 1200 of FIG. 20 may include a card object area. The card object area may include a plurality of card objects 1210, 1220 and 1230, etc. classified according to content sources.

In the figure, the card object (BROADCAST) 1210 for displaying a broadcast image, a card object representing a content provider (CP) list (NETCAST) 1220 and a card object representing an application provision list (APP STORE) 1230, all of which are displayed on the display 180, etc.

In addition, in the figure, although not displayed on the display 180, as card objects which are arranged in a hidden area 1201 so as to be replaced and displayed upon the movement of the card objects, a card object (CHANNEL BROWSER) 1240 representing a thumbnail list of broadcast channels, a card object (TV GUIDE) 1250 representing a broadcast guide list, a card object (RESERVATION/REC) 1260 representing a program reservation list or a program recording list, a card object (MY MEDIA) 1270 representing a media list in the image display apparatus or in a device connected to the image display apparatus, a card object (TV GUIDE2) 1280 representing a broadcast guide list, etc.

The card object (BROADCAST) 210 for displaying the broadcast image may include a broadcast image 1215 received through the tuner 110 or the network interface 130, an object 1212 representing broadcast image-associated information, an object 1217 representing an external device, and a set-up object 1218.

The broadcast image 1215 is displayed as the card object and the size thereof may be fixed by a lock function such that a user can continuously view the broadcast image.

The size of the broadcast image 1215 may vary according to user manipulation. For example, the size of the broadcast image 1215 may be enlarged or reduced by a dragging operation using the pointer 205 of the remote controller 200. According to such enlargement or reduction, the number of card objects displayed on the display 180 may be changed from 3 to 2 or 4 as shown in the figure.

If the broadcast image 1215 in the card object is selected, the broadcast image may be displayed in full-screen on the display 180. This will be described in detail with reference to FIG. 32.

The object 1212 representing the broadcast image-associated information may include a channel number (DTV7-1), a channel name (YBC HD), a broadcast program name (Oh! Lady), a broadcast time (08:00 PM to 08:50 PM), etc. To this end, the user can intuitively identify the information about the displayed broadcast image 1215.

Upon the selection of the object 1212 representing the broadcast image-associated information, associated EPG information may be displayed on the display 180. This will be described later with reference to FIG. 32.

On the card object 1210 for displaying the broadcast image, an object 1202 representing the date (03.24), the day of the week (THU), and the current time (pm 08:13) may be displayed. To this end, the user can institutively identify time information.

The object 1217 representing the external device may represent the external device connected to the image display apparatus 100. For example, upon selection of the object 1217, a list of external devices connected to the image display apparatuses 100 may be displayed. This will be described later with reference to FIG. 33.

The set-up object 1218 may be used to input various settings of the image display apparatus 100. For example, various settings such as image settings, audio settings, screen settings, reservation settings, settings of the pointer 205 of the remote controller 200, or network setting may be set.

The card object 1220 representing the content provider (CP) list may include a card object name (NETCAST) 1222 and a content provider list 1225. Although Yakoo, Metflix, weather.com, Picason, My tube, etc. are shown as the content providers in the content provider list 1225 in the figure, various settings are possible.

If the card object name 1222 is selected, the card object 1220 corresponding thereto may be displayed in full-screen on the display 180. This will be described later with reference to FIG. 35.

If a predetermined content provider in the content provider list 1225 is selected, a screen including a content list provided by the content provider may be displayed on the display 180. This will be described later with reference to FIG. 36.

The card object 1230 representing the application provision list may include a card object (APP STORE) 1232 and an application list 1235. The application list 1235 may be a list in which applications are classified and aligned according to items in the application store. Although the applications are aligned and displayed as HOT, NEW, etc. in the figure, the present invention is not limited thereto and various examples are possible.

If the card object name 1232 is selected, the card object 1230 corresponding thereto may be displayed in full-screen on the display 180. This will be described later with reference to FIG. 37.

If a predetermined application item in the application list 1235 is selected, a screen for providing information about the application may be displayed on the display 180. This will be described later with reference to FIG. 38.

A login item 1227, a help item 1228 and an exit item 1229 may be displayed above the card objects 1220 and 1230.

The login item 1227 may be used upon accessing the APP STORE or logging in to the network connected to the image display apparatus. The help item 1228 may be used to perform a help function upon the operation of the image display apparatus 100. The exit item 1229 may be used to exit the home screen. At this time, the received broadcast image may be displayed in full-screen.

An object 1237 representing the total number of card objects may be displayed below the card objects 1220 and 1230. This object may represent the total number of card objects and the number of card object displayed on the display 180 among a total of card objects.

The card object 1240 representing the thumbnail list of broadcast channels may include a card object name (CHANNEL BROWSER) 1242 and a thumbnail list 1245 of broadcast channels. Although the sequentially received broadcast channels are displayed as thumbnail images in the figure, the present invention is not limited thereto and moving images may be displayed. The thumbnail list may include thumbnail images and information about channels. To this end, the user can intuitively identify the content of the channel. The thumbnail images may be thumbnail images of preferred channels which are registered by the user in advance or thumbnail images of channels after or before the broadcast image 1215 in the card object 1210. Although eight thumbnail images are shown in the figure, various settings are possible. In addition, the thumbnail images in the thumbnail list may be updated.

If the card object name 1242 is selected, the card object 1240 corresponding thereto may be displayed in full-screen on the display 180. That is, the content of the thumbnail image may be displayed on the display 180.

If a predetermined thumbnail image in the thumbnail list 1245 of broadcasting channels is selected, the broadcast image corresponding to the selected thumbnail image may be displayed on the display 180.

The card object 1250 representing the broadcast guide list may include a card object name (TV GUIDE) 1252 and a broadcast guide list 1255. The broadcast guide list 1255 may be a list of broadcast images of the other channels or broadcast programs after the broadcast image 1215 in the card object 1210. However, the present invention is not limited thereto and various examples are possible.

If the card object name 1252 is selected, the card object 1250 corresponding thereto may be displayed in full-screen on the display 180.

If a predetermined broadcast item in the broadcast guide list 1255 is selected, a broadcast image corresponding to the selected broadcast item may be displayed on the display 180 or broadcast information corresponding to the selected broadcast item may be displayed on the display 180.

The card object 1260 representing a program reservation list or a program recording list may include a card object name (RESERVATION/REC) 1262 and a program reservation list or program recording list 1265. The program reservation list or the program recording list 1265 may be a list including a broadcast item reserved by the user in advance or a recorded broadcast item. Although the thumbnail images are included while being classified according to items in the figure, various examples are possible.

If the card object name 1262 is selected, the card object 1260 corresponding thereto may be displayed in full-screen on the display 180.

If a reserved broadcast item or a recorded broadcast item in the program reservation list or the program recording list 1265 is selected, broadcast information of the broadcast or a recorded broadcast image may be displayed on the display 180.

The card object 1270 representing the media list may include a card object name (MY MEDIA) 1272 and a media list 1275. The media list 1275 may be a media list in the image display apparatus 100 or a device connected to the image display apparatus 100. Although a moving image, a still image, audio, etc. are shown in the figure; various examples such as a text document or an e-book are possible.

If the card object 1272 is selected, the card object 1270 corresponding thereto may be displayed in the full-screen on the display 180.

If a predetermined media item in the media list 1275 is selected, the media corresponding thereto may be executed and a screen corresponding to the media may be displayed on the display 180.

The card object (TV GUIDE) 1280 representing a broadcast guide list may include a card object name TV (GUIDE2) 1282 and a broadcast guide list 1285. The broadcast guide list 1285 may be a broadcast kind-based guide list. Although the broadcast kind-based list classified according to entertainment type such as drama, news, and sports is shown in the figure, various settings are possible. That is, the list may be a broadcast kind-based guide list such as drama, movies, news, sports, or animations. Thus, the user can identify the guide list classified according to broadcast genres.

If the card object name 1282 is selected, the card object 1280 corresponding thereto may be displayed in full-screen on the display 180.

If a predetermined broadcast item in the broadcast guide list 1285 is selected, the broadcast image corresponding thereto may be displayed on the screen of the display 180.

The card objects 1220 and 1230 displayed on the display 180 and the card objects 1240, 1250, 1260, 1270 and 1280 located in the hidden area 1201 without being displayed on the display 180 may be replaced with each other by the card object move input. That is, at least one of the card objects 1220 and 1230 displayed on the display 180 may be moved to the hidden area 1201 and at least one of the card objects 1240, 1250, 1260, 1270 and 1280 located in the hidden area 1201 may be displayed on the display 180. This will be described in detail with reference to FIG. 24.

Figure 21:
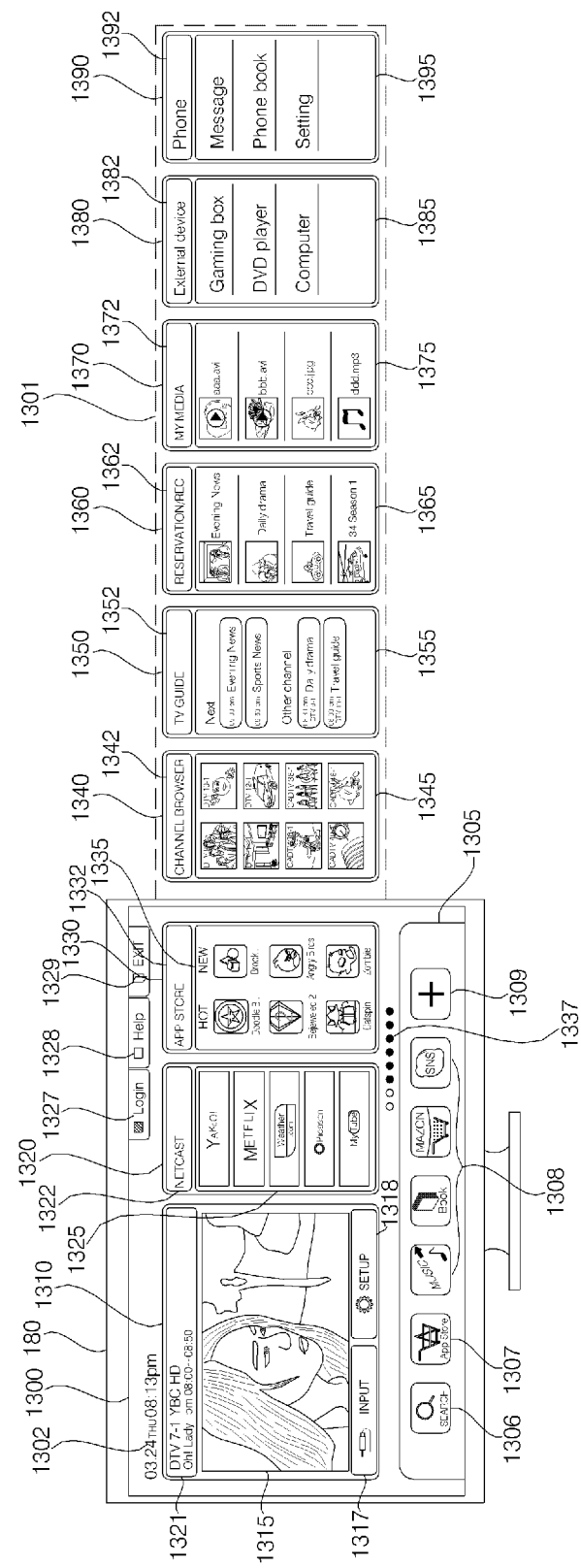
Figure 22:
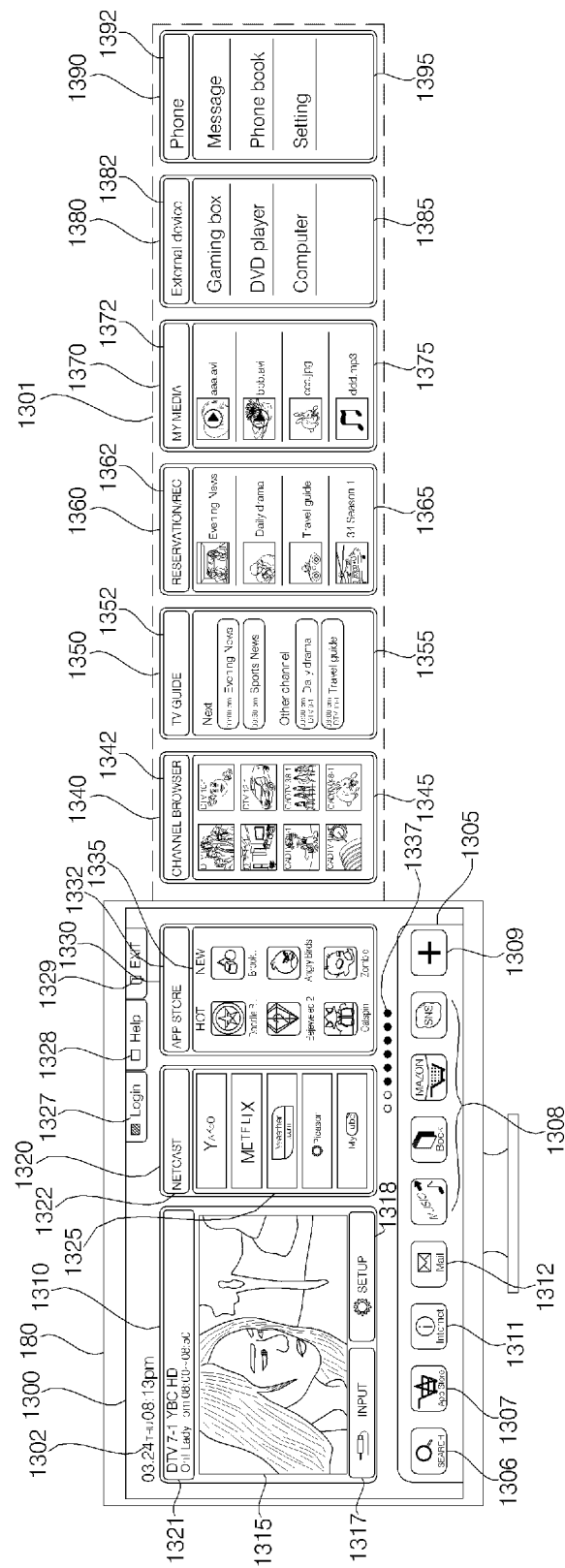
Figure 23:
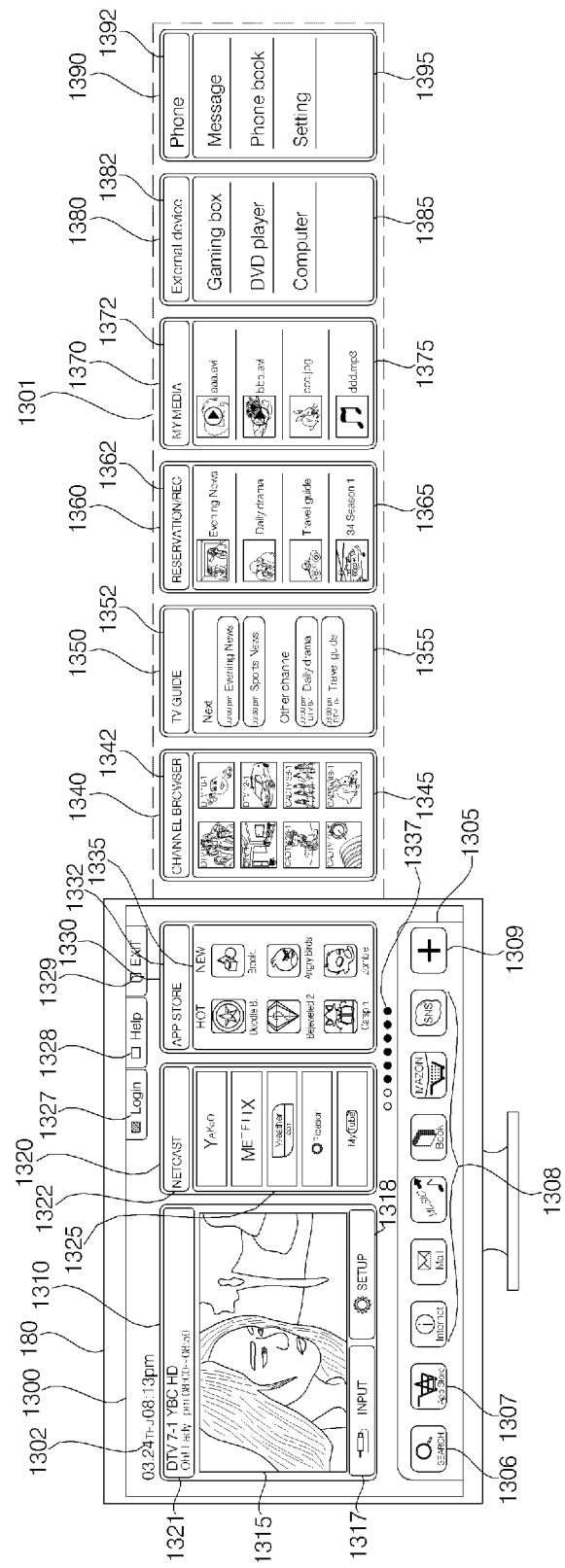

FIGS. 21 to 23 show the other examples of the home screen displayed on the display.

First, the home screen configuration shown in FIG. 21 is similar to the home screen configuration of FIG. 20, but is different from the home screen configuration of FIG. 20 in that the application menu area is further displayed on the display 180. In addition, two card objects are further shown as the card objects and the broadcast guide list 1285 is excluded. Hereinafter, differences with FIG. 20 will be focused upon.

The application menu 1305 includes a plurality of application items. In particular, predetermined application items among a total of application items are included and displayed on the display 180. The application menu 1305 may be called an application brief view menu.

Such an application menu 1305 may include preferred application items (search, app store, +) 1306, 1307 and 1309, application items (music, books, MAZON, SNS) 1308 set by the user, etc.

The preferred application items (search, app store, +) 1306, 1307 and 1309 may be default items which cannot be edited by the user. In other embodiments, the default items can be edited by the user. The search application item 1306 may provide a search function by a search word input, the app store application item 1307 may provide an app store shortcut function, and an additional view (+) application item 1309 may provide a full view function.

The application items (music, book, MAZON, SNS) 1308 set by the user may be edited as frequently used application items by the setting of the user.

In the figure, as the card objects displayed in the card object area, a card object 1310 for displaying a broadcast image, a card object 1320 representing a content provider (CP) list, and a card object 1330 representing an application provision list are shown.

In the figure, although not shown in the card object area of the display 180, as the card objects which are arranged in a hidden area 1301 so as to be replaced and displayed upon the movement of the card objects, a card object 1340 representing a thumbnail list of broadcast channels, a card object 1350 representing a broadcast guide list, a card object 1360 representing a program reservation list or a program recording list, a card object 1370 representing a media list, a card object 1380 representing a list of connected external devices, and a card object 1390 representing a call-associated list.

The card object 1380 representing the list of connected external devices may include a card object name (External device) 1382 and a connected external device list 1385. The connected external device list 1385 is a list of devices connected to the image display apparatus 100 and a gaming box, a DVD player, and a computer are shown in the figure.

If the card object name 1382 is selected, the card object 1380 corresponding thereto may be displayed in full-screen on the display 180.

If a predetermined external device item in the connected external device list 1385 is selected, a menu associated with the external device corresponding thereto may be executed. For example, content in the external device may be reproduced and a screen corresponding to the content reproduced on the display 180 may be displayed.

The card object 1390 representing the call-associated list may include a card object name (Phone) 1392 and a call-associated list 1395. The call-associated list 1395 may be a call-associated list in a mobile phone (not shown), a computer (not shown) or an image display apparatus 100 capable of performing a phone call function. For example, the call-associated list may be a list for a message, a phone book and setting. The call-associated card object 1390 may be automatically moved into the card object area of the display 180 so as to be displayed or the card object 1390 displayed in the display 180 may be focused (highlighted), when the mobile phone (not shown), the computer (not shown) or the image display apparatus 100 receives an incoming call. This will be described later with reference to FIG. 37.

Thus, the user can readily identify the call reception content of a neighboring mobile phone (not shown) or the computer (not shown) or the incoming call reception content of the image display apparatus 100. Such a function interlocks with the mobile phone, the computer and the image display apparatus and may be called a 3-screen function.

If the card object name 1392 is selected, the card object 1390 corresponding thereto may be displayed in full-screen on the display 180.

If a predetermined item in the call-associated list is selected, the item may be executed and a screen corresponding to the item may be displayed on the display 180.

A login item 1327, a help item 1328 and an exit item 1329 may be displayed above the card objects 1320 and 1330. These were described with reference to FIG. 12.

An object 1337 representing the total number of card objects may be displayed below the card objects 1320 and 1330. This object may represent the total number of card objects and the number of card object displayed on the display 180 among a total of card objects. This was described with reference to FIG. 12.

Next, the home screen configuration shown in FIG. 22 is similar to the home screen configuration of FIG. 21, but is different from the home screen configuration of FIG. 21 in that an Internet application item 1311 and a mail application item 1312 are further included in the application menu 1305 as the preferred application item.

The Internet application item 1311 and the mail application item 1312 are preferred application items, which cannot be edited, that is, cannot be deleted or reordered, by the user. That is, these items may be default items. In other embodiments, the preferred application items may be edited.

For example, if the Internet application item 1311 is selected, as shown in FIG. 11, a web screen may be displayed in full-screen on the display 180. In particular, if a start page is registered, the web screen (e.g., the web screen 710 of FIG. 11A) may be displayed when the Internet application begins.

For example, if the mail application item 1312 is selected, as shown in FIG. 12, a mail service screen may be displayed on the display 180. In particular, if an ID and a password may be stored in order to use the mail service, the screen of FIG. 12A may be when the mail application is launched and the screen of FIG. 12B may be immediately displayed on the display 180.

Next, the home screen configuration shown in FIG. 23 is similar to the home screen configuration of FIG. 22, but is different from the home screen configuration of FIG. 22 in that the Internet application item and the mail application item may be included not as the preferred application item, but as a user setting application item 1308. Thus, these items may be edited, that is, may be deleted or reordered, by the user.

Figure 24:
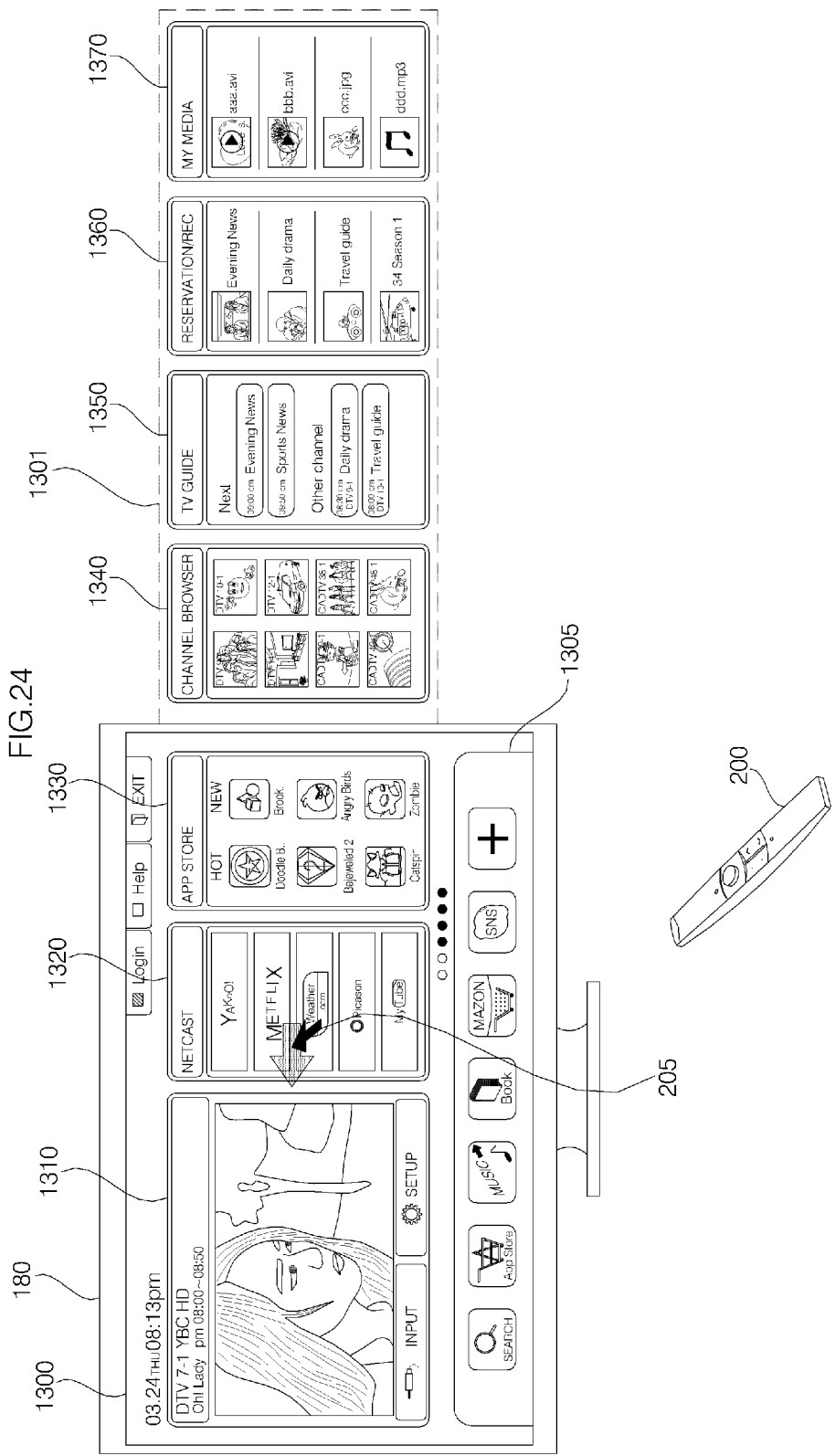

In FIG. 24, the card object area 1300 and the application menu area excluding the two card objects 1380 and 1390 in the screen configuration of FIG. 21 will be focused upon.

FIGS. 24 to 27 show a movement display of card objects using the pointer corresponding to the motion of a remote controller.

First, FIG. 24 shows the case where the card object and, more particularly, the card object 1320 representing the content provider list flicks to the left using the pointer 205 of the remote controller 200 in a state in which the card object 1300 area and the application menu 1305 area are displayed on the display 180.

Figure 25:
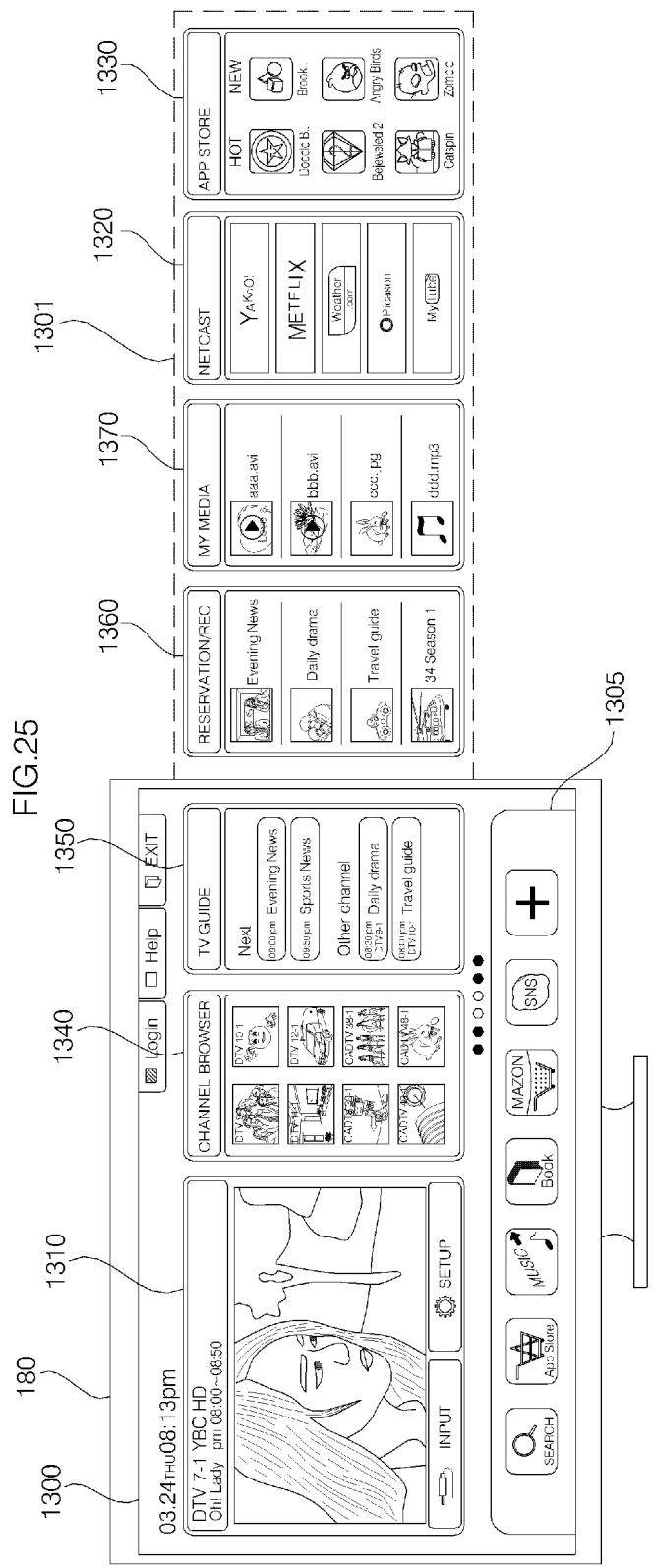

Next, FIG. 25 shows the case where the card objects displayed in the card object area, that is, the card object 1320 representing the content provider list and the card object 1330 representing the application provision list, are replaced with the card object 1340 representing the thumbnail list of broadcast channels and the card object 1350 representing the broadcast guide list, both of which are arranged in the hidden area 1301, according to a left movement input signal or a left movement flicking input signal.

Although the movement of two card objects is shown in the figure, one card object may be moved. The number of moved card objects may be varied according to the level of the left movement input signal or the left movement flicking input signal.

Figure 26:
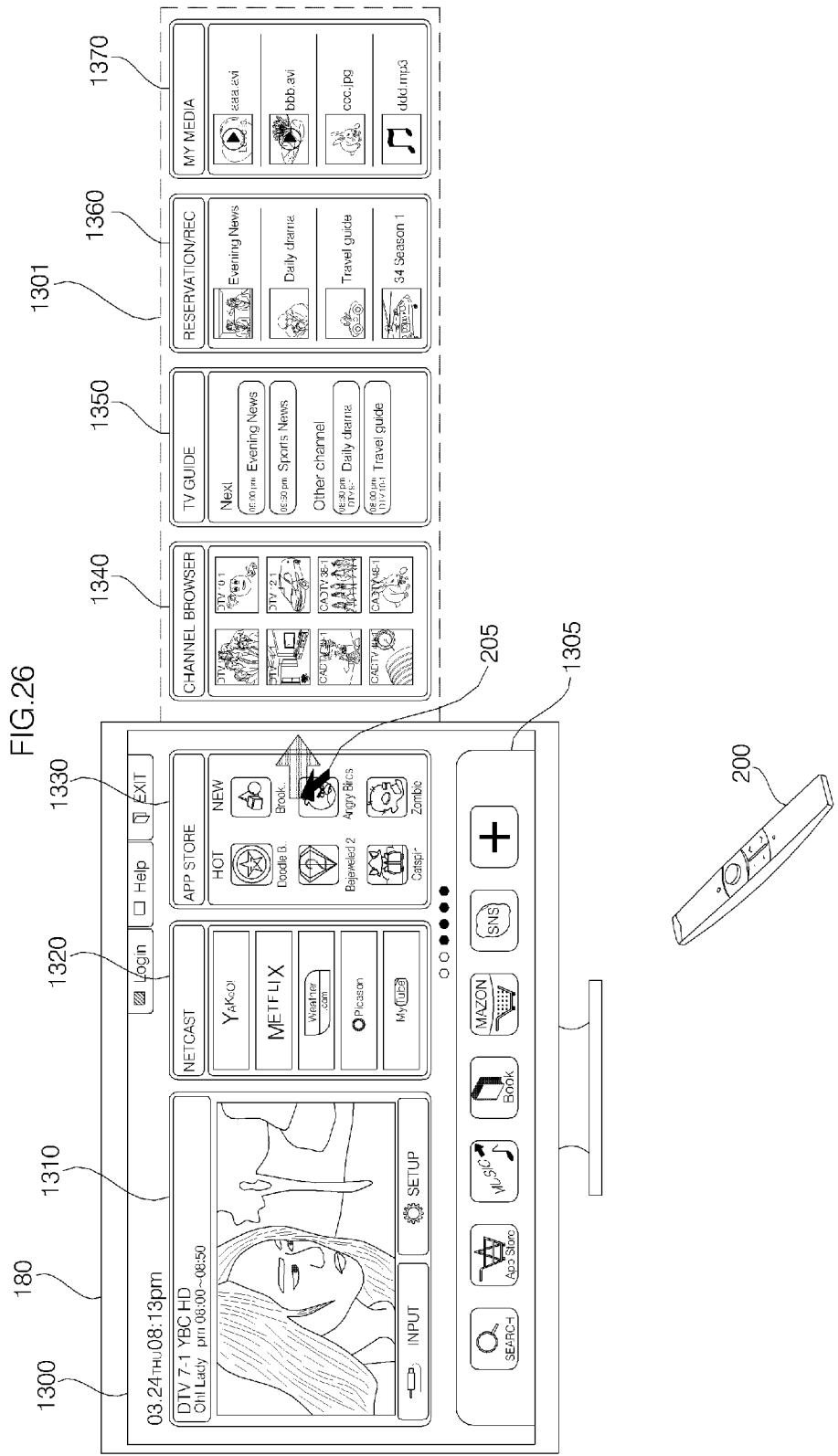

Next, FIG. 26 shows the case where the card object and, more particularly, the card object 1330 representing the application provision list flicks to the right using the pointer 205 of the remote controller 200 in a state in which the card object 1300 area and the application menu 1305 area are displayed on the display 180.

Figure 27:
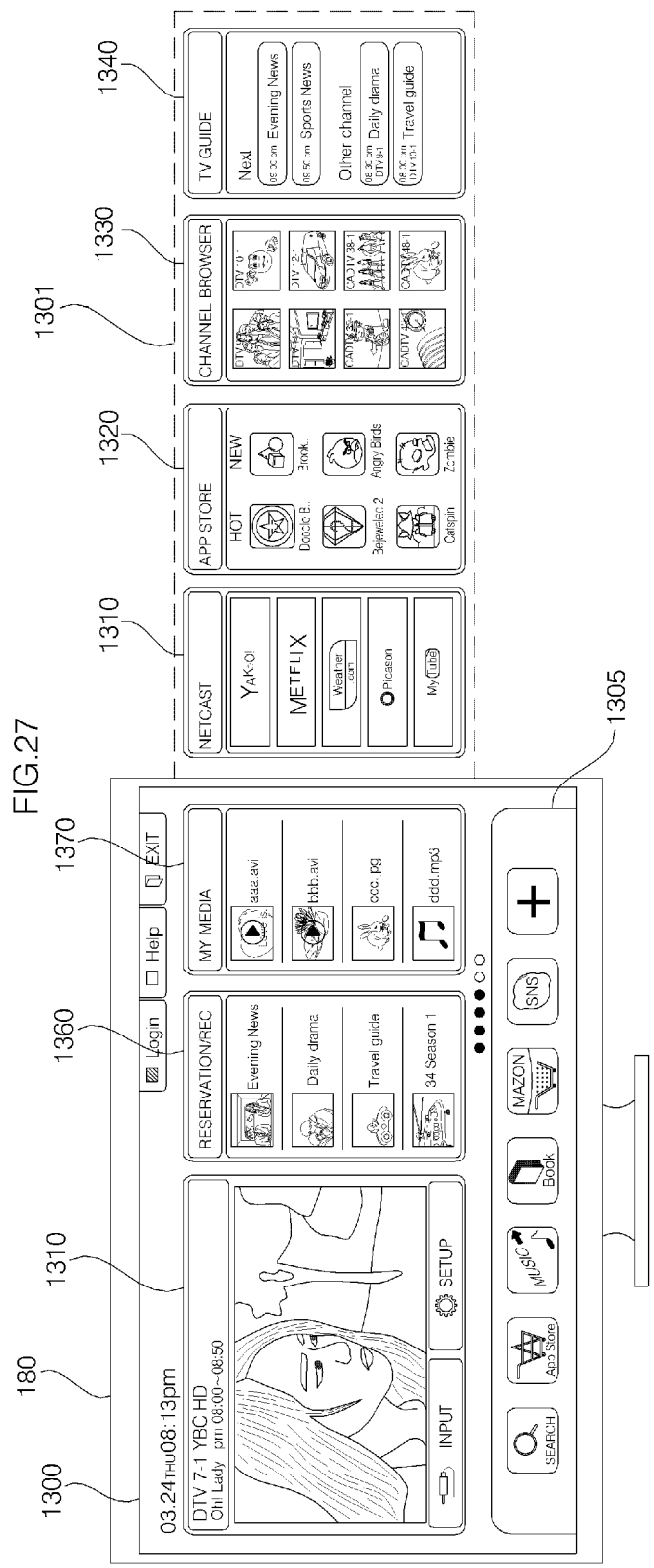

Next, FIG. 27 shows the case where the card objects displayed in the card object area, that is, the card object 1320 representing the content provider list and the card object 1330 representing the application provision list, are replaced with the card object 1360 representing the program reservation list or the program recording list and the card object 1370 representing the media list, both of which are arranged in the hidden area 1301, according to a right movement input signal or a right movement flicking input signal.

Next, FIGS. 28 to 31 show the movement display of card objects using an input of a directional key of the remote controller, similar to FIGS. 24 to 27.

In the home screen configuration, an object 1610 representing left movement may be further displayed on the left side of the card object 1320 representing the content provider list and an object 1620 representing right movement may be further displayed on the right side of the card object 1330 representing the application provision list.

Figure 28:
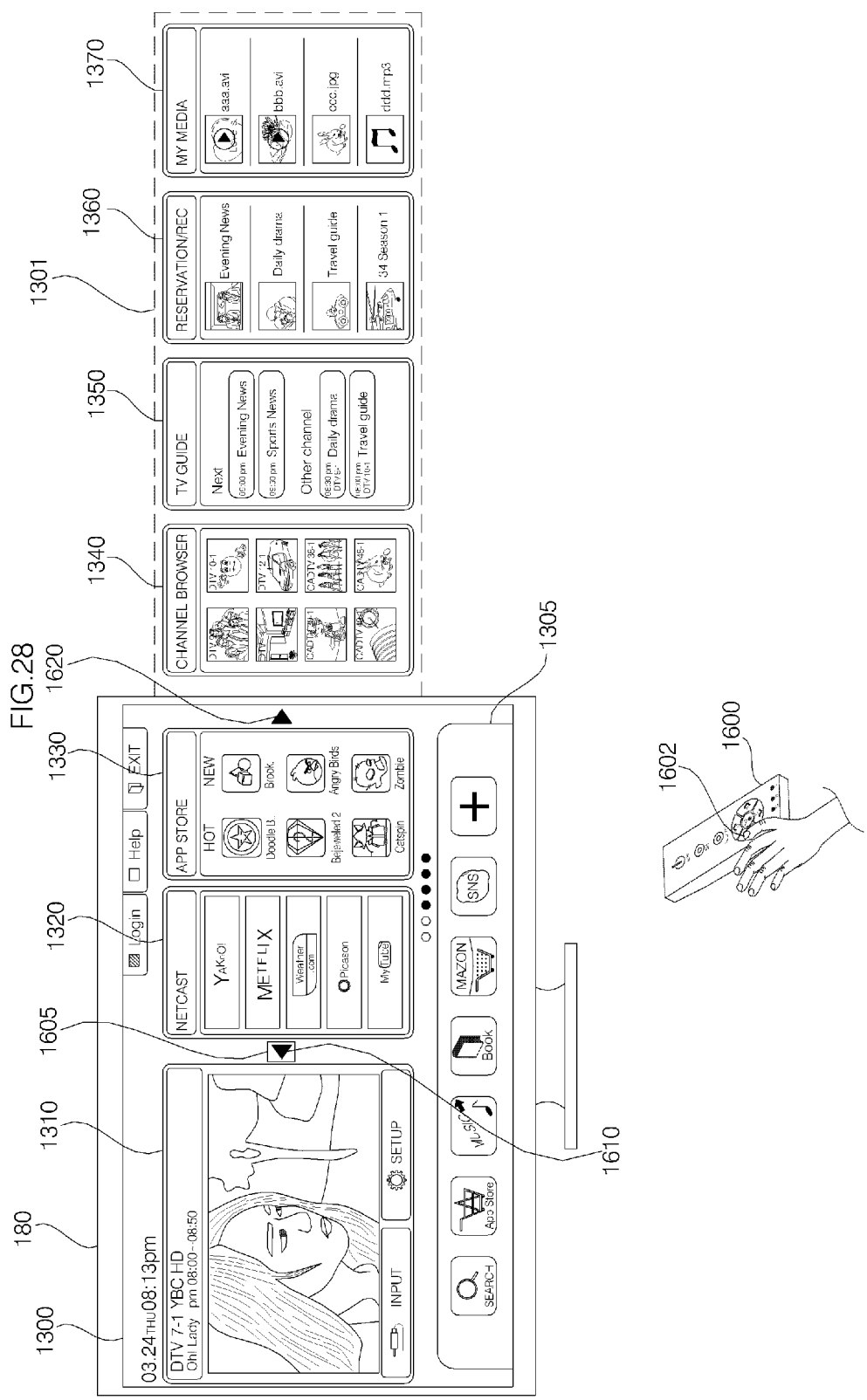

FIG. 28 shows the case where the object 1610 representing left movement is selected using the left directional key 1602 or the OK key of the remote controller 1600 in a state in which the card object 1300 area and the application menu 1305 area are displayed on the display 180. A cursor 1605 representing that the object 1610 is selected may be further displayed.

Figure 29:
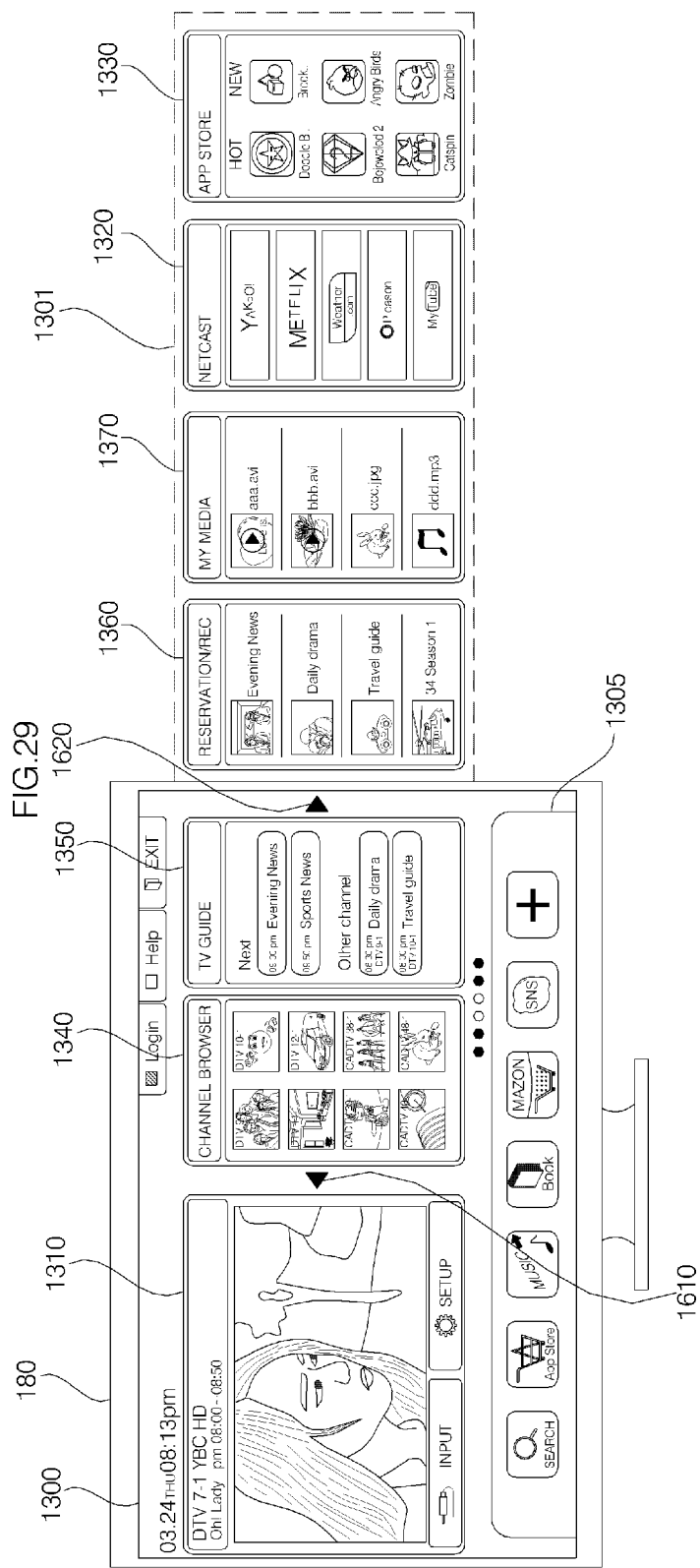

Next, FIG. 29 shows the case where the card objects displayed in the card object area, that is, the card object 1320 representing the content provider list and the card object 1330 representing the application provision list, are replaced with the card object 1340 representing the thumbnail list of broadcast channels and the card object 1350 representing the broadcast guide list, both of which are arranged in the hidden area 1301, according to the selection of the object 1610 representing left movement.

Although the movement of two card objects is shown in the figure, one card object may be moved. The number of moved card objects may vary according to the number of times of selection of the object 1610 representing the left movement.

Figure 30:
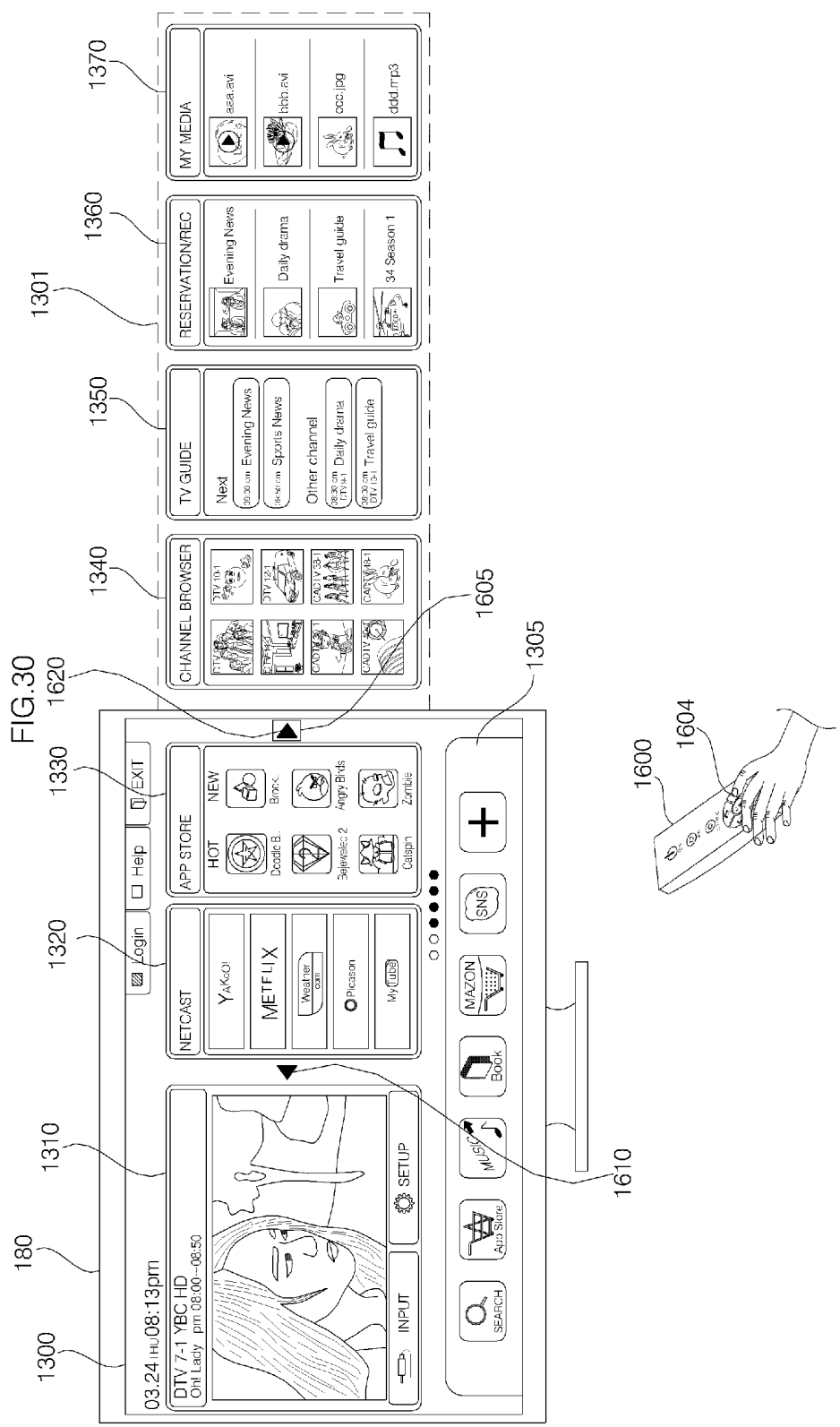

Next, FIG. 30 shows the case where the object 1620 representing right movement is selected using the right directional key 1604 or the OK key of the remote controller 1600 in a state in which the card object 1300 area and the application menu 1305 area are displayed on the display 180. A cursor 1605 representing that the object 1620 is selected may be further displayed.

Figure 31:
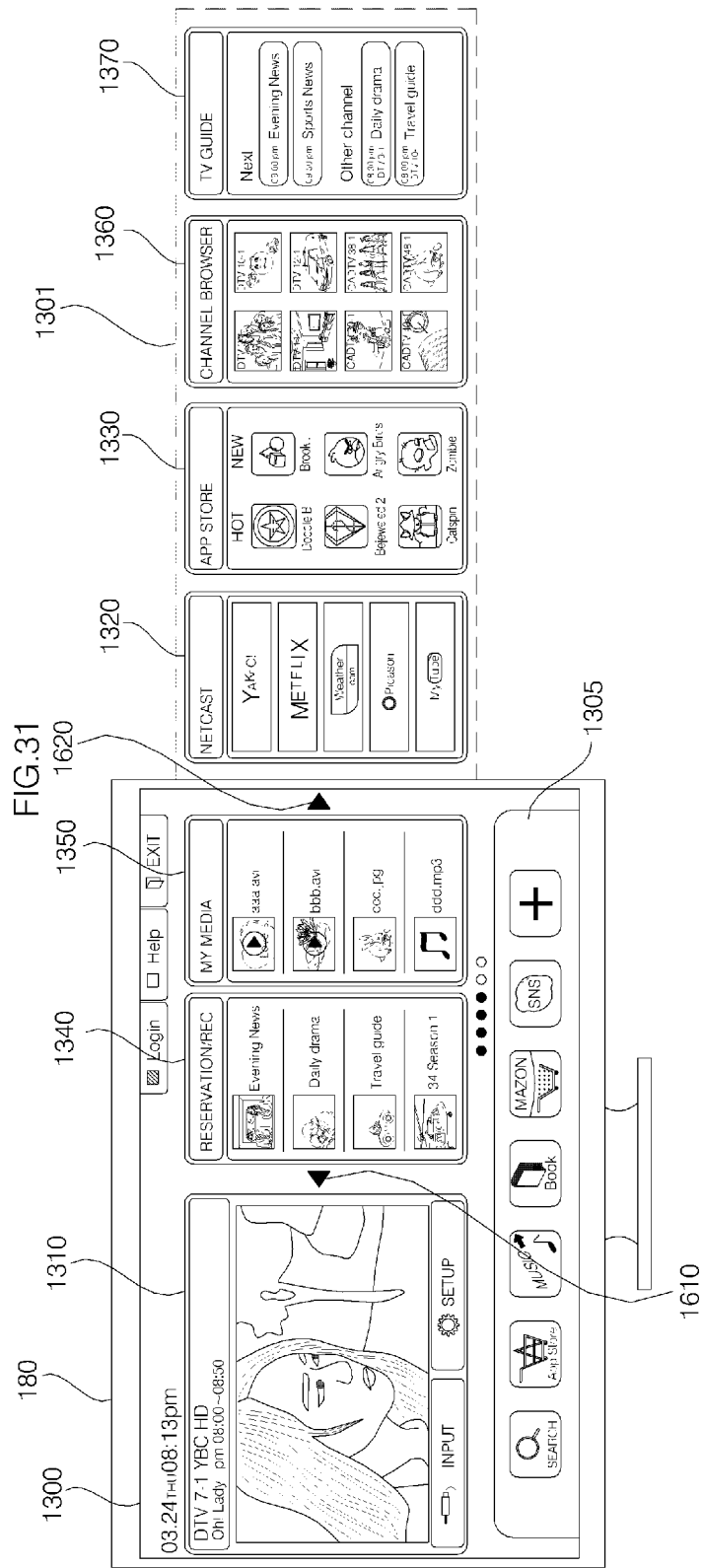

Next, FIG. 31 shows the case where the card objects displayed in the card object area, that is, the card object 1320 representing the content provider list and the card object 1330 representing the application provision list, are replaced with the card object 1360 representing the program reservation list or the program recording list and the card object 1370 representing the media list, both of which are arranged in the hidden area 1301, according to the selection of the object 1620 representing right movement.

Hereinafter, between the selection according to the pointer movement of the remote controller 200 and the selection according to the directional or OK key input of the remote controller 1600, the selection according to the pointer movement of the remote controller 200 will be focused upon. Hereinafter, the selection according to the directional key or OK key input of the remote controller 1600 may be implemented.

Figure 32:
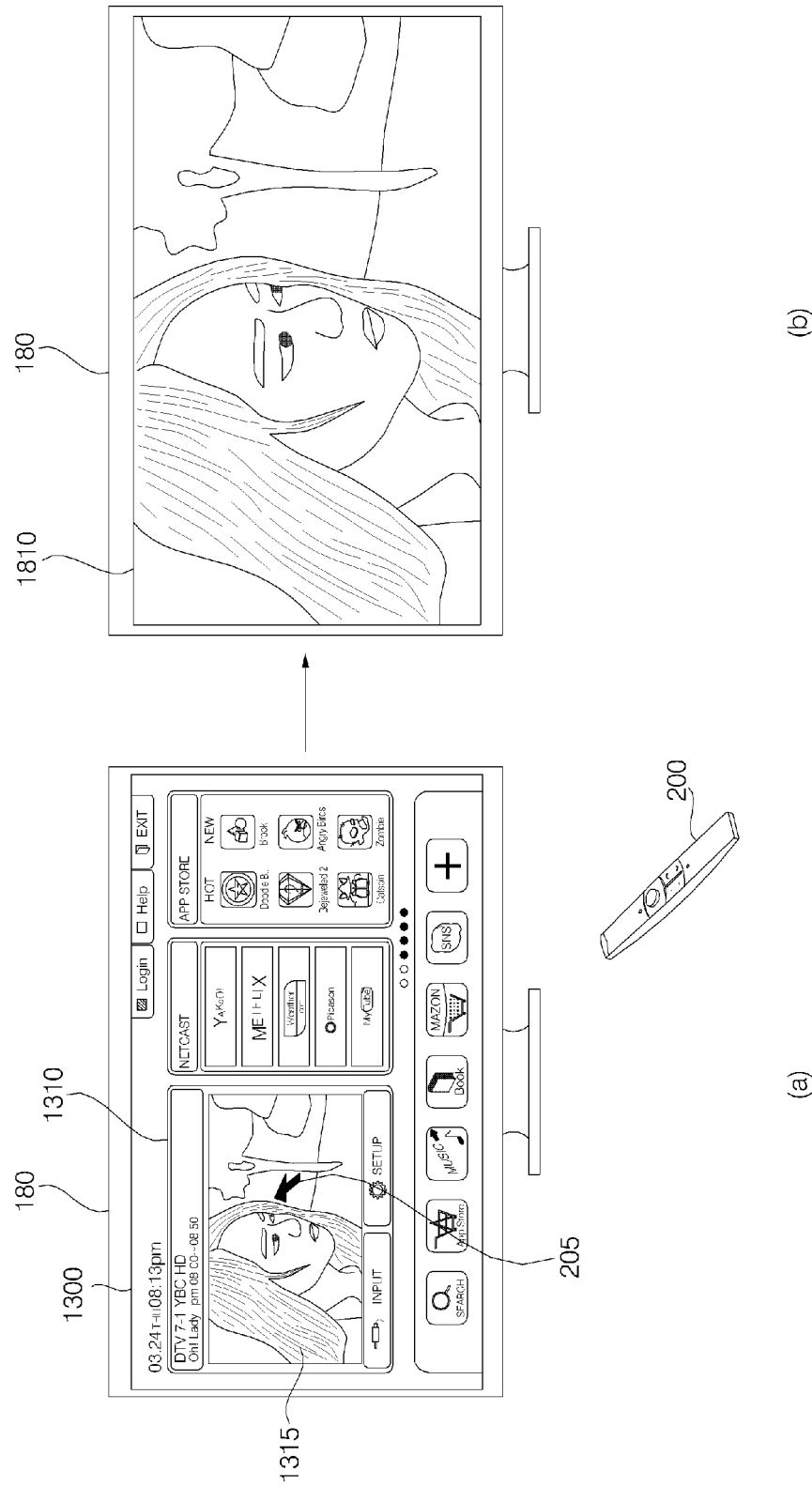

FIG. 32 shows the case where, if the broadcast image 1315 in the card object 1310 is selected using the pointer 205 corresponding to the motion of the remote controller 200 (see FIG. 32A), as shown in FIG. 32B, the broadcast image 1801 is displayed in full-screen on the display 180. To this end, the user can readily switch the home screen to the broadcast image 1810 in full-screen.

Figure 33:
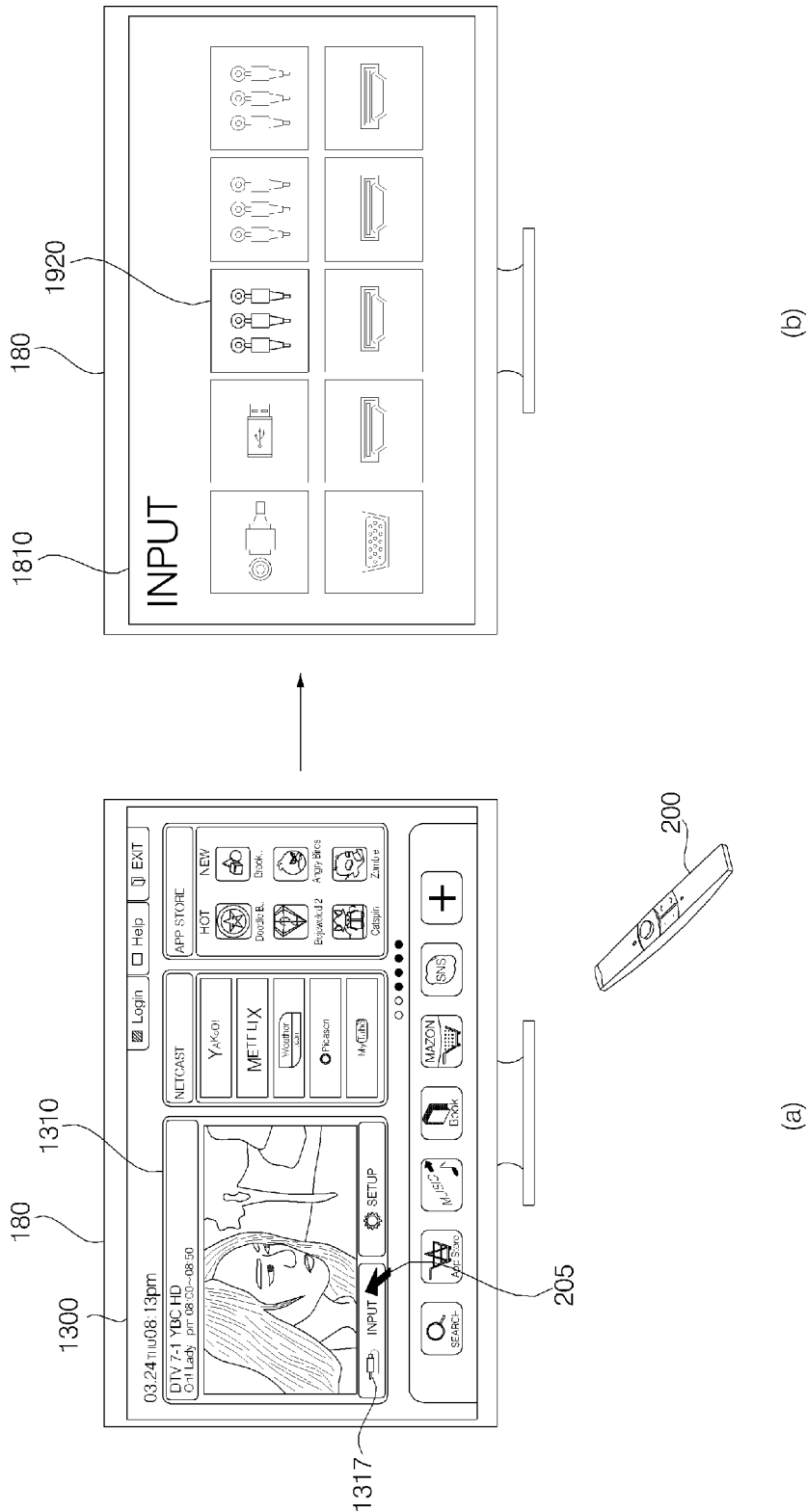

FIG. 33 shows the case where, if the object 1317 representing the external device in the card object 1310 is selected using the pointer 205 corresponding to the motion of the remote controller 200 (see FIG. 33A), as shown in FIG. 33B, a screen 1910 representing a connected external device among the external devices is displayed in full-screen on the display 180.

In the figure, an "external input terminal 1" among external device connection terminals (USB, components, RGB, HDMI, external inputs, etc.) is connected. The color, the luminance, etc. of the object 1920 representing the "external input terminal 1" may be different from those of the other connection terminals. To this end, the user can readily identify the connected external device or the external device connection terminal.

Figure 34:
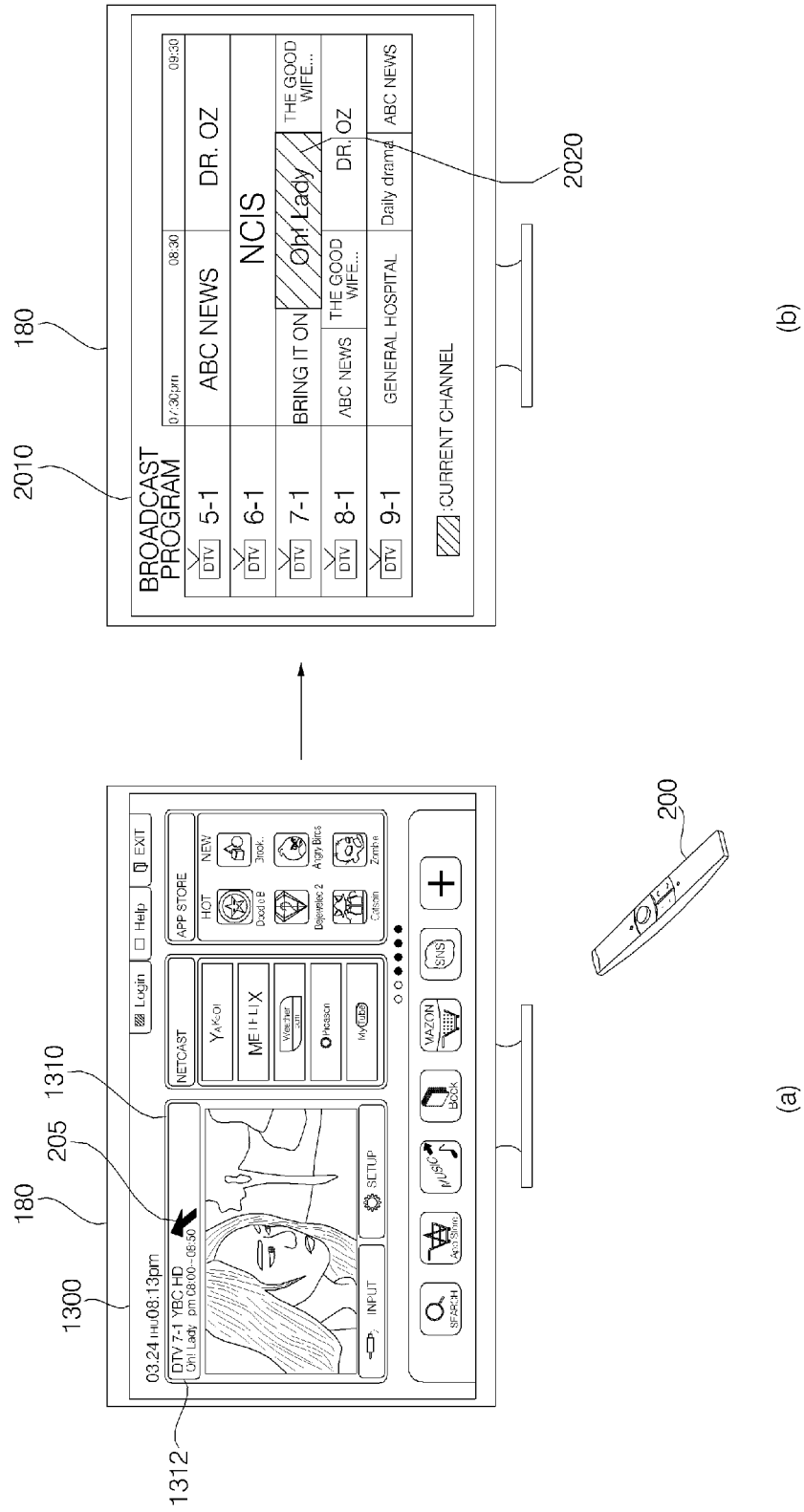

FIG. 34 shows the case where, if the object 1312 representing the broadcast image-associated information in the card object 1310 is selected using the pointer 205 corresponding to the motion of the remote controller 200 (see FIG. 34A), as shown in FIG. 34B, a screen 2010 representing EPG information is displayed in full-screen on the display 180.

In the figure, a broadcast program name (Oh! Lady) 2020 and a broadcast time of a channel "DTV 7-1" which is being viewed, program names before and after the broadcast program, and the program names and broadcast times of the other channels are shown. To this end, the user can readily identify broadcast program information.

Figure 35:
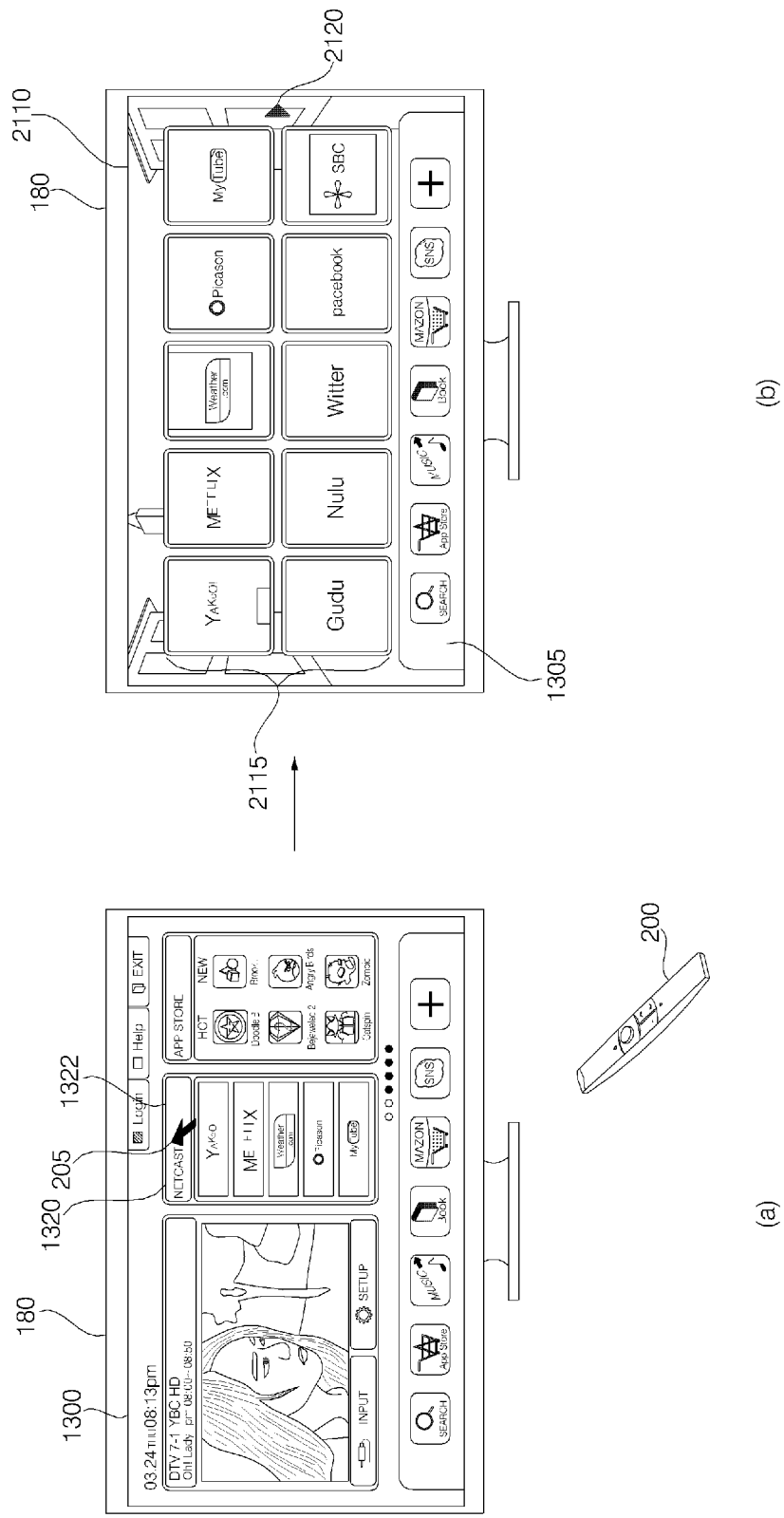

FIG. 35 shows the case where, if the card object name 1322 is selected from the card object name 1322 representing the name of the card object in the card object 1320 and the card object list 1325 (the content provider list in the figure) representing the content of the card object 1320 using the pointer 205 corresponding to the motion of the remote controller 200 (see FIG. 35A), as shown in FIG. 35B, the card object 1320 representing the content provider may be displayed on the display 180.

The number of content provider objects shown in FIG. 35B is greater than the number of content provider objects shown in FIG. 35A. That is, while five content providers (Yakoo, Metflix, wheather.com, Picason and My tube) are displayed in the card object list 1325 in FIG. 35A, five content providers (Gudu, Nulu, Witter, pacebook and SBC) are newly added to the content provider list 2115 in addition to the existing five content providers such that a total of ten content providers is displayed in FIG. 35B. To this end, the user can readily identify a plurality of content providers.

In order to identify a greater number of content providers, an object 2120 representing right movement is displayed on the right side of the content provider list 2115. In addition, although not shown in the figure, an object representing left movement may be further displayed.

The application menu 1305 including the plurality of application items may be displayed on the lower portion of the display 180. Unlike the figure, display of the application menu 1305 is optional.

Figure 36:
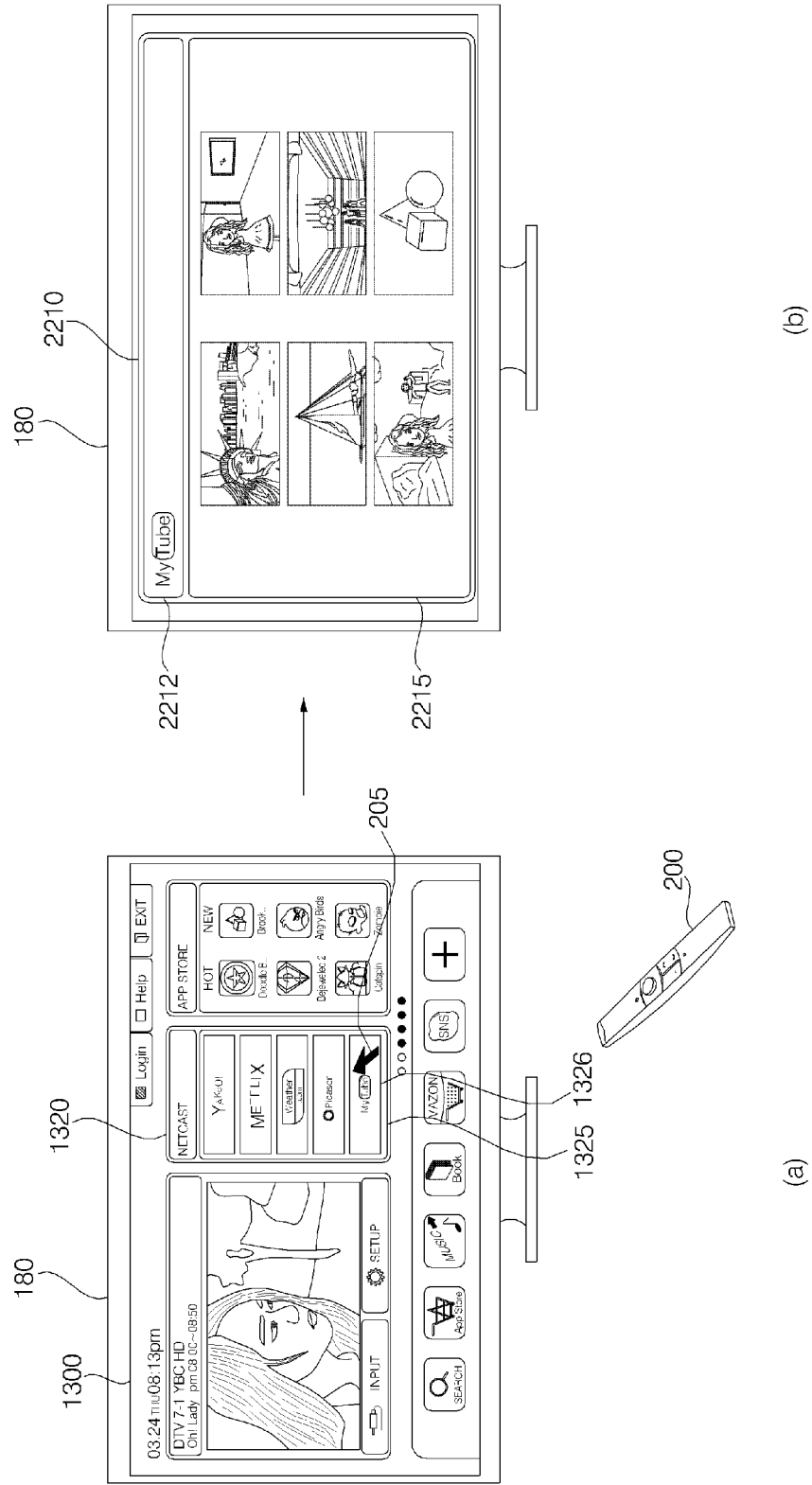

FIG. 36 shows the case where, if an object 1326 representing a predetermined content provider is selected from the content provider list 1325 in the card object 1320 using the pointer 205 corresponding to the motion of the remote controller 200 (see FIG. 36A), as shown in FIG. 36B, a screen 2210 provided by the content provider is displayed in full-screen on the display 180.

In the figure, an object 2212 representing the content provider and a content list 2215 provided by the content provider are divided and displayed.

Figure 37:
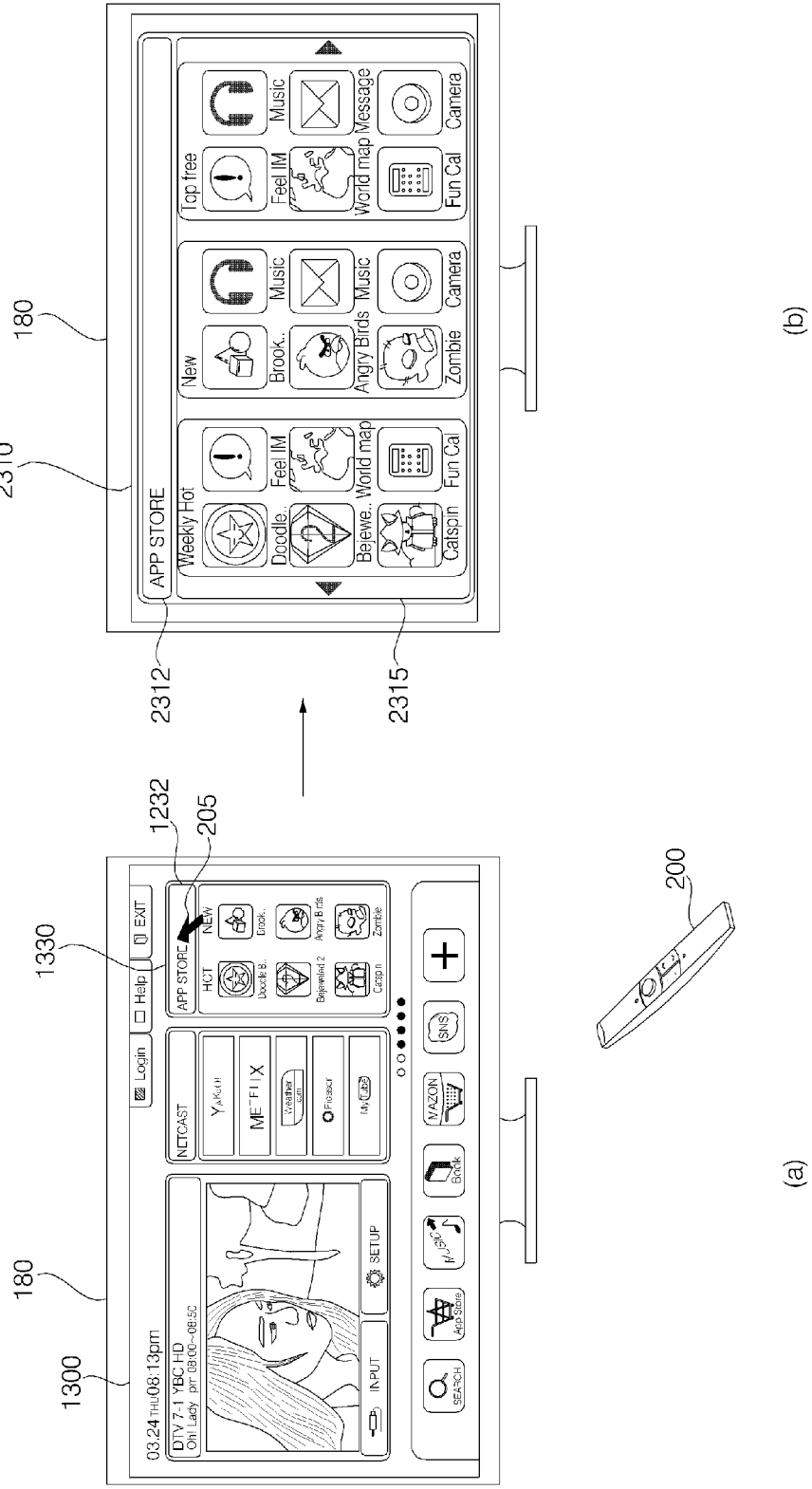

FIG. 37 shows the case where, if the card object name 1332 is selected from the card object name 1332 representing the name of the card object in the card object 1330 and the card object list (the application list in the figure) representing the content of the card object 1330 using the pointer 205 corresponding to the movement of the remote controller 200 (see FIG. 37A), as shown in FIG. 37B, the card object 1330 may be displayed in full-screen 2310 on the display 180. In the figure, the full-screen 2310 of the card object is divided into the object 2312 representing the app store and the application list 2315 including various application items in the app store.

Figure 38:
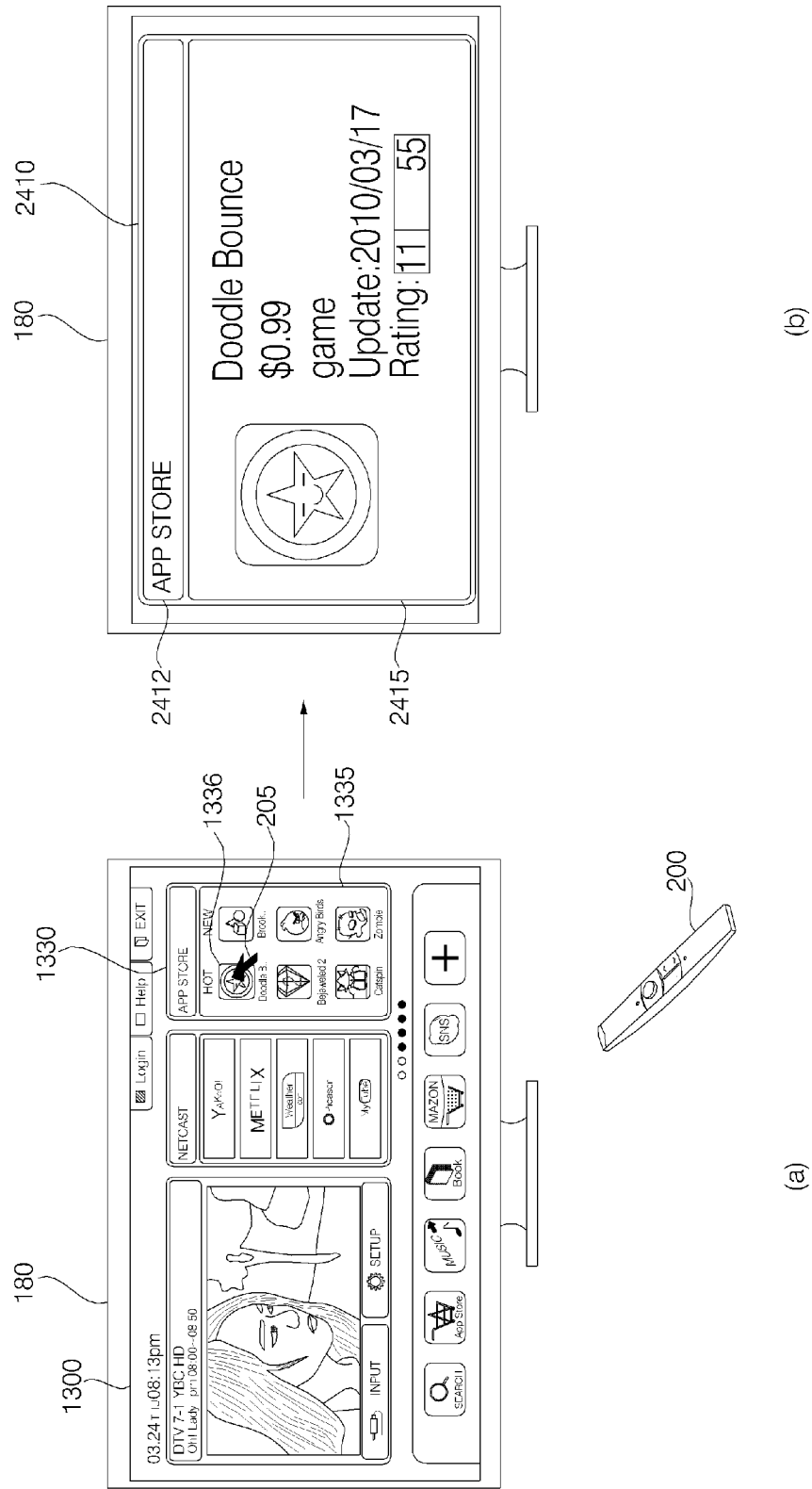

FIG. 38 shows the case where, if a predetermined application item 1336 is selected from the application list 1335 in the card object 1330 using the pointer 205 corresponding to the motion of the remote controller 200 (see FIG. 38A), as shown in FIG. 38B, a screen 2410 representing information about the application item is displayed in full-screen on the display 180.

In the figure, the screen is divided into an object 2412 representing the app store and an object 2415 representing information about the application. The object 2415 representing the information about the application may include an application title, a price, a category (game), an update date, rating, etc. To this end, the user can readily identify whether or not a desired application is present.

FIG. 39 shows the case where a mobile terminal 2500 which can perform a wireless call function is synchronized in a state in which the home screen is displayed on the display 180 of the image display apparatus 100.

For example, as shown in FIG. 39A, if the mobile terminal 2500 receives an incoming call, a card object 1390 representing a call-associated list among the card objects may be focused and displayed as shown in FIG. 39B. Alternatively, the card object arranged in the hidden area 1301 may be replaced with another card object and may be displayed in the card object area 1300 of the display 180.

The card object 1390 representing the call-associated list may include the card object name (Phone) 1392 and the call-associated list 1395. Although a list of a message, a phone book, and setting is shown as the call-associated list 1395 in the figure, the present invention is not limited thereto and various examples are possible.

The focusing display or the replacement display of the card object 1390 representing the call-associated list can be performed even when the image display device 100 capable of performing Voice over Internet Protocol (VoIP) receives an incoming call over a network, in addition to when the synchronized mobile terminal 2500 receives an incoming call. To this end, the user can intuitively identify the reception of the incoming call.

Even when the user sends a call by the input of the user, a card object 1390 representing the call-associated list may be displayed on the display 180.

Figure 40:
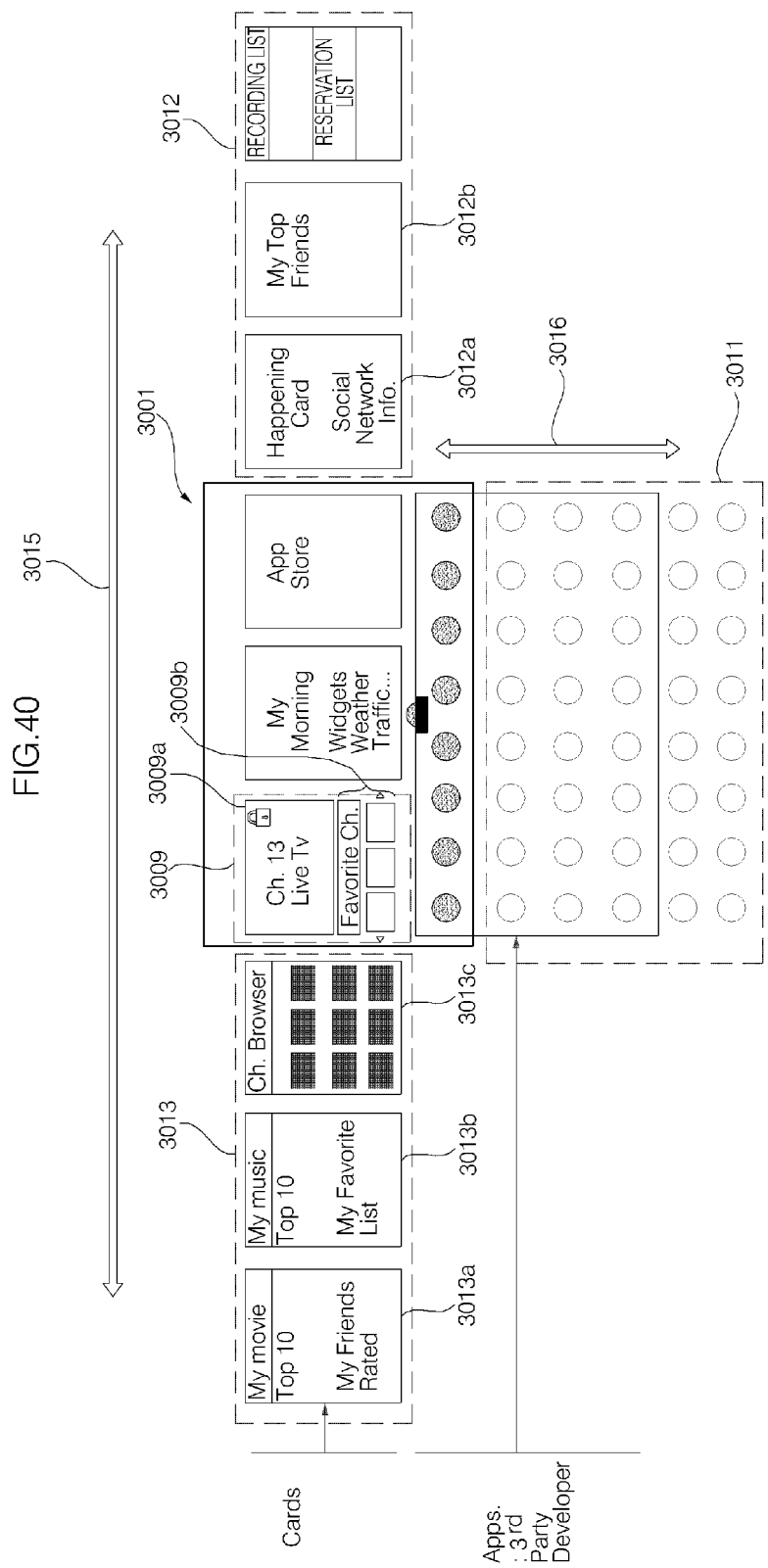
FIGS. 40 to 66 are views referred to for describing an image displayed on a screen of an image display apparatus according to an embodiment of the present invention.

FIG. 40 is a view referred to for describing a screen 3001 displayed on a display of an image display apparatus according to an embodiment of the present invention.

In the present invention, a graphic object in a card form, which includes predetermined information or a predetermined image, may be referred to as a card object. Examples of various kinds of card objects may be similarly applied to the following description.

The image display apparatus according to the present embodiment processes an image signal such that a screen displayed on the display includes a plurality of card objects and an application menu.

In addition, in at least one area of the display, a broadcast image or broadcast image-associated information may be displayed. In any embodiment, the broadcast image and the broadcast image-associated information may be displayed in at least one of the plurality of card objects.

The card objects including predetermined images may be collectively called a detail view object. For example, the detail view object may an object for displaying the image of the content reproduced by the image display apparatus or displaying the image of the application executed by the image display apparatus. The detail view may refer to a view for displaying a content reproduction image (for example, a news image, a movie image, a music video image, etc.) or an application execution image (a game application execution image, an internet phone application execution image, or an execution image of an application for providing predetermined information which can be identified through the image display apparatus, such as weather information or map information) such that the user can view such information through the image display apparatus.

The content reproduction image capable of being displayed through the image display apparatus according to an embodiment of the present invention may be a moving image based on a broadcast signal provided through a broadcast station. A card object for displaying a broadcast image may be referred to as a broadcast card object. In addition, an application execution image may be an execution image of an application installed in the image display apparatus. The detail view may further include information associated with an image.

In addition, the card object may include information capable of being identified through the image display apparatus, such as weather information, traffic information, map information, stock information, etc. The card objects including predetermined information may be collectively called a summary view object.

A summary view object is an object for displaying content reproduced or capable of being reproduced by the image display apparatus or associated information, an application executed or capable of being executed by the image display apparatus or associated information, and information capable of being provided by the image display apparatus as a summary view. The summary view may refer to a view for displaying content or application-associated images (for example, a content thumbnail, an application banner, an application state information notification icon, an application thumbnail, etc.) such that the user can identify the content or application. In addition, the summary view may refer to a view for summarizing and displaying information (for example, a content title, an application title, an application provision function, etc.) provided through the image display apparatus or extracting and displaying a portion (for example, a content plot, a content broadcast time, application state information, etc.).

The application menu may include an application item executed or capable of being executed by the image display apparatus.

In the present embodiment, the image display apparatus can output content displayed through the detail view, an application, or audio corresponding to information. Accordingly, the user of the image display apparatus can view the content provided through the detail view, the application and the information.

The plurality of card objects is classified into detail view object and the summary view object for convenience, and the present invention is not limited thereto. In addition, any card object may be composed of a combination of the detail view object and the summary view object.

A first card object 3009 included in the screen 3001 of the image display apparatus of the present embodiment includes a first detail view object 3009*a* and a first summary view object 3009*b*. The user may input a left/right movement command of the card object to the image display apparatus. The image display apparatus may move the card object displayed on the screen 3001 to the left or the right according to the input command.

FIG. 40 shows hidden areas 3011, 3012 and 3013 connected to an area displayed on the screen 3001 of the image display apparatus according to an embodiment of the present invention. In detail, the hidden areas 3011, 3012 and 3013 include the first hidden area 3011 including an application item which is not included in the area currently displayed on the screen 3001 of the image display apparatus, the second hidden area 3012 and third hidden area 3013 including a plurality of card objects. The image display apparatus can display objects included in the hidden areas 3011, 3012 and 3013 on the screen 3001 in correspondence with an object movement command input through the remote controller.

For example, when a command for moving a card object included in the current screen 3001 to the left is input to the image display apparatus, the image display apparatus displays a card object 3012*a* included in the second hidden area 3012 is displayed on the screen 3001. Accordingly, the user sees the card object 3012*a* located on the right side of the card object displayed on the screen 3001 that appears to be displayed on the screen 3001.

The user may input a card object left/right movement command to the image display apparatus of the present embodiment. The image display apparatus may display objects included in the second hidden area 3012 and the third hidden area 3013 on the screen 3001 in correspondence with the card object left/right movement command input to the image display apparatus. Accordingly, the user sees the objects included in the third hidden area 3013, the screen 3001 and the second hidden area 3012 that appears to be displayed on the screen 3001 while being moved to the left/right along a first arrow 3015.

The user may input the card object left/right movement command to the image display apparatus. The image display apparatus according to an embodiment of the present invention displays a card object 3009, which is a graphic combination of the detail view object or the summary view object, on the screen 3001. The image display apparatus may display the cards composed of the objects included in the second and third hidden areas on the screen 3001 in correspondence with the card object left/right movement command input by the user. That is, the user sees the cards included in the third hidden area 3013, the screen 3001 and the second hidden area 3012 that appear to be moved to the left/right along the first arrow 3015 in correspondence with the card left/right movement command.

In addition, the user may input an up/down movement command of the application menu to the image display apparatus of the present embodiment. The image display apparatus may display an object included in the first hidden area 3011 on the screen 3001 in correspondence with the up/down movement command of the application menu input to the image display apparatus. Accordingly, the user sees the object included in the first hidden area 3011 which appears to be displayed on the screen 3001 while being moved up and down along a second arrow 3016.

In the present embodiment, the content and the application displayed on the image display apparatus through the card object include the content and the application stored in the image display apparatus or input to the image display apparatus through a network server or an external device connected to the image display apparatus. In addition, information displayed on the image display apparatus through the card object includes information about the content or the application stored in the image display apparatus or input to the image display apparatus through a network server or an external device connected to the image display apparatus. In addition, information displayed on the image display apparatus through the card object includes data, such as weather information, traffic information or stock information, stored in the image display apparatus or input to the image display apparatus through a network server or an external device connected to the image display apparatus.

In any embodiment, detail view objects for displaying content (movie, music, etc.) reproduced through the image display apparatus as detail views or card objects 3013*a* and 3013*b* including detail view objects among a plurality of card objects may be arranged in the third hidden area 3013 located on the left side of the screen 3001. In addition, the image display apparatus may arrange a card 3013*c* for displaying broadcast channel information transmitted to the image display apparatus in the third hidden area 3013 located on the left side of the screen 3001.

In addition, the image display apparatus according to the present embodiment may arrange card objects 3012*a* and 3012*b* for displaying images associated with applications executed through the image display apparatus and associated information thereof or card objects for displaying an image of an application (a social network site access application, a network server provision information display application, etc.) executed through the image display apparatus in the second hidden area 3012 located on the right side of the screen 3001.

The present invention is not limited to the arrangement order of the card objects and the hidden areas shown in FIG. 40.

The image display apparatus according to the present embodiment arranges card objects in a predetermined arrangement order. The image display apparatus can set the arrangement order based on installation order of applications corresponding to objects or the number of times or frequency of execution of applications. The image display apparatus moves the card objects displayed on the screen 3001 in correspondence with an object movement command or a card object movement command input to the image display apparatus. In the image display apparatus of the present embodiment, the arrangement order of the card objects displayed on the screen 3001 may be maintained after a predetermined card object is moved.

In the present embodiment, the application menu is provided through a third party and may include an icon of an application item downloaded to and installed in the image display apparatus by the user of the image display apparatus. The application provided through a third party includes an application developed to be executed in the image display apparatus according to the embodiment of the present invention. The user of the image display apparatus may download the application provided through the network server or the like to the image display apparatus.

Figure 41:
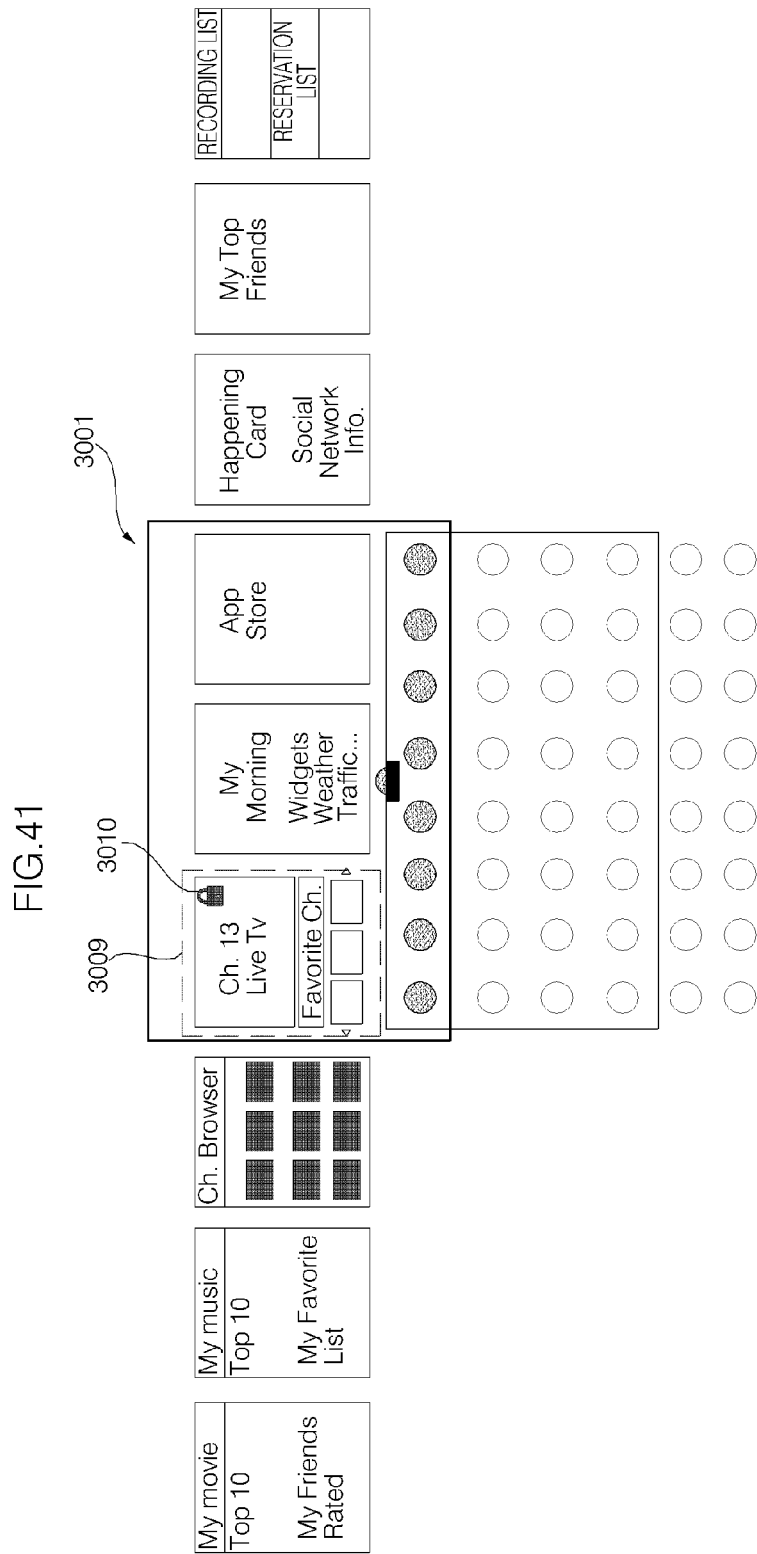

FIG. 41 is a view referred to for describing the composition of the screen 3001 of the image display apparatus according to an embodiment of the present invention.

The image display apparatus according to an embodiment of the present invention may set a portion of the screen 3001 as a lock area. The lock area may be an area in which at least one of a plurality of card objects displayed on the screen 3001 is displayed or an application menu is displayed. In addition, the lock area may be an area in which a predetermined graphic combination composed of at least one of the card objects displayed on the screen 3001 and an application menu is displayed.

An object or card displayed in the lock area is set so as not to be moved even when an object or a card displayed in another area is moved. The screen 3001 of the image display apparatus of the present embodiment is a screen in which a first card object 3009 is set as a lock area. The image display apparatus displays a lock icon 3010 in the first card object 3009 set as the lock area. The user can identify that the area is set as the lock area through the lock icon 3010 displayed on the screen 3001.

The image display apparatus of the present embodiment may delete the lock icon 3010 from the screen 3001 if the lock icon 3010 is displayed on the screen 3001 for a predetermined time. That is, the image display apparatus may adjust the transparency of the lock icon 3010 so as not to disturb the user's viewing experience and change the screen 3001 such that the user cannot view the lock icon 3010.

The image display apparatus may display a pointer corresponding to a signal transmitted from the remote controller on the display screen 3001. The pointer may identify the motion of the user and transmit a signal including information about the identified motion to the image display apparatus, as described above. The image display apparatus may change a display area of the pointer displayed on the display screen 3001 so as to correspond to the motion of the user.

In the present embodiment, the user may move the remote controller such that the pointer is moved to the area, in which the lock icon 3010 is displayed, after the lock icon 3010 disappears from the display screen 3001. The image display apparatus may adjust the transparency of the lock icon 3010 again so as to display the lock icon 3010 on the display screen 3001, if the pointer is moved to the area in which the lock icon 301 is displayed before deletion.

An area excluding the area which is set as the lock area in the screen 3001 of the image display apparatus of the present invention is referred to as a change area. The user moves an object included in the change area to the left/right. Hereinafter, an example in which objects included in the change area are moved while maintaining the arrangement order of the objects will be described.

Figure 42:
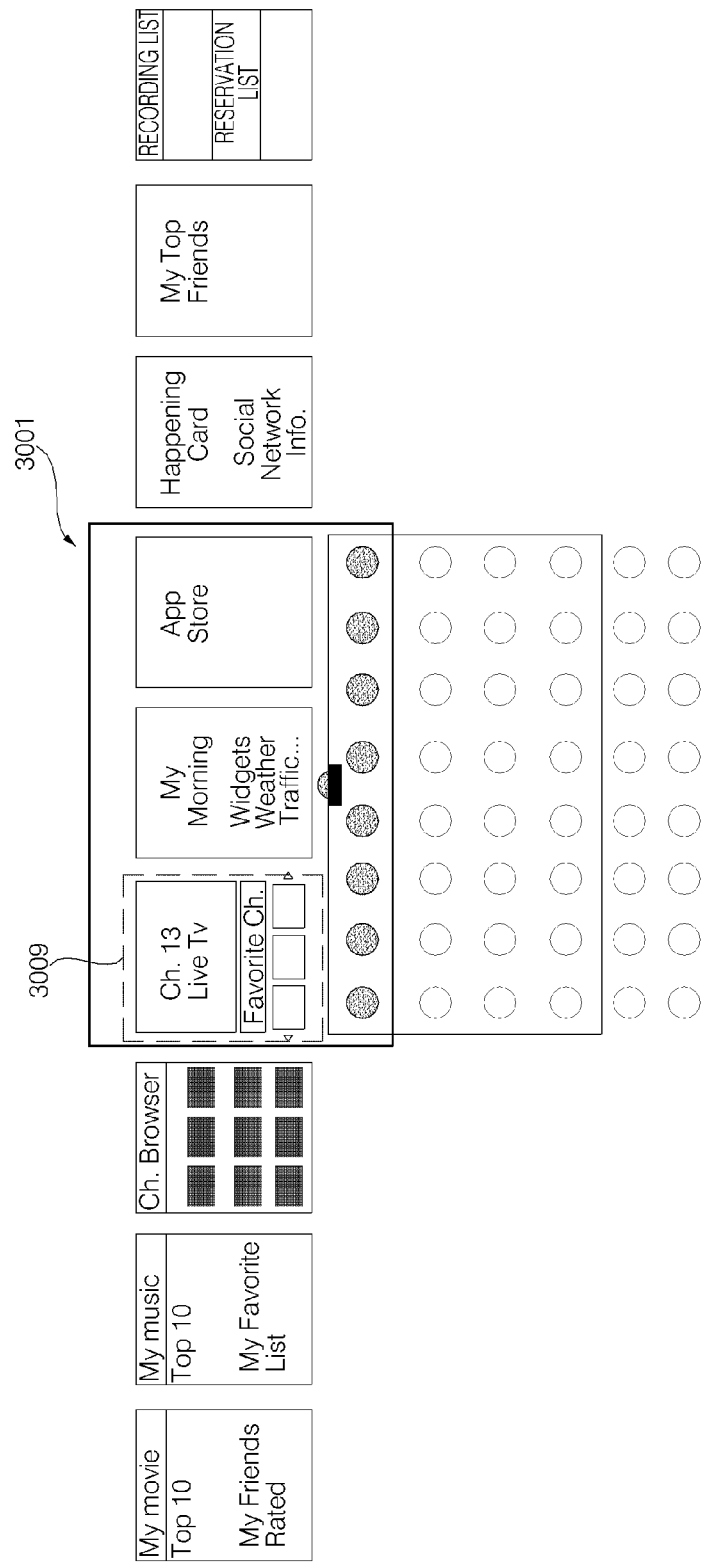

The image display apparatus according to an embodiment of the present invention may not set the screen 3001 as a lock area as shown in FIG. 42. That is, a lock setting function may be released according to user convenience.

FIGS. 43 to 46 are views referred to for describing the example in which the objects included in the change area are moved in the screen 3001 of the image display apparatus according to an embodiment of the present invention.

The user may input a card object movement command of card objects included in the change area to the image display apparatus. The image display apparatus moves the card objects included in the screen 3001 in correspondence with the card object movement command input by the user. In more detail, the image display apparatus may display the object included in the second hidden area 3012 or the third hidden area 3013 in correspondence with the object movement command input by the user.

In the present embodiment, the arrangement order of objects included in the second hidden area 3012 or the third hidden area 3013 may be set by the user. That is, the user may set the arrangement order of card objects to be displayed on the screen 3001 in correspondence with the card object left/right movement command input by the user. The image display apparatus may arrange the card objects as shown in the second hidden area 3012 and the third hidden area 3013 of FIGS. 40 to 46 so as to correspond to the arrangement order of stored objects.

Figure 43:
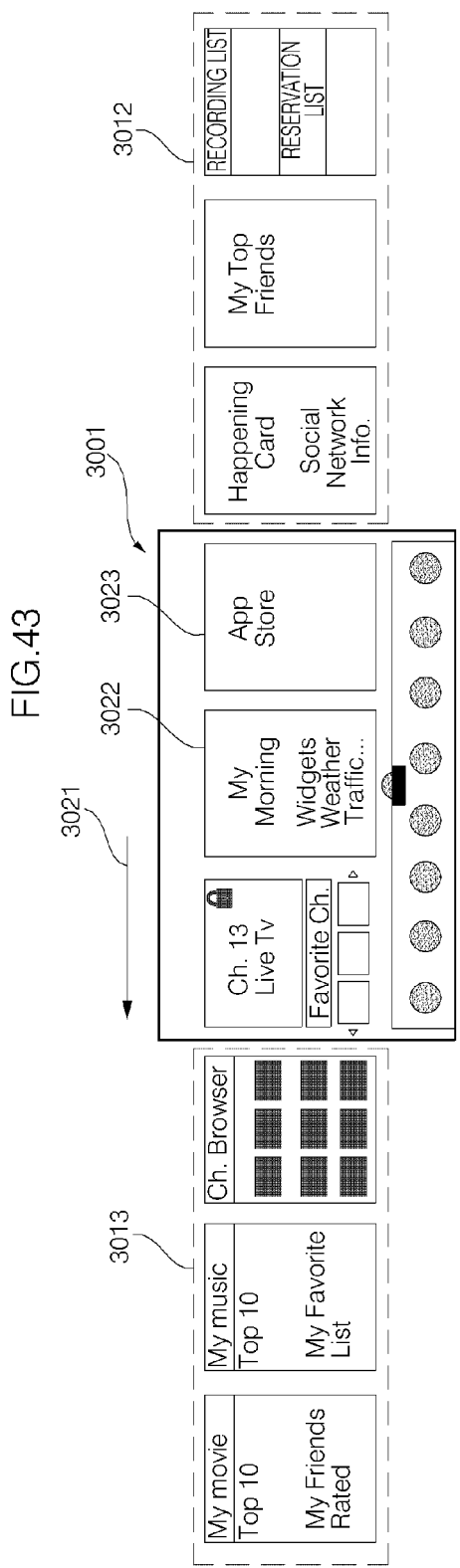

FIG. 43 is a view referred to for describing an example in which a command for moving objects included in the change area in a direction of a third arrow 3021 is input to the image display apparatus. The image display apparatus moves the objects included in the screen 3001 in correspondence with the input movement command.

Figure 44:
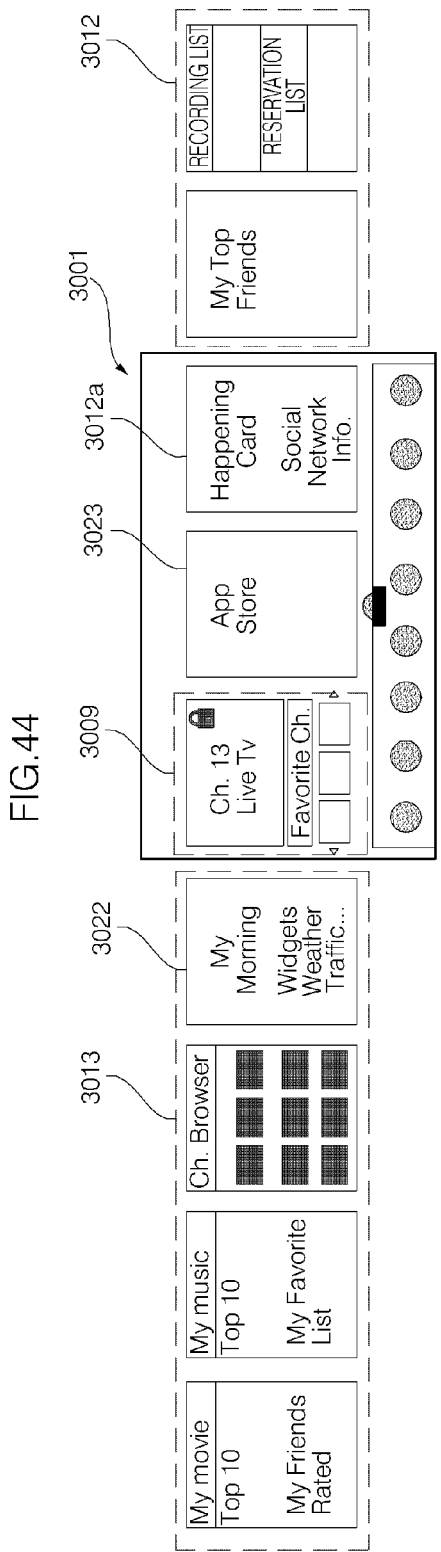

FIG. 44 is a view referred to for describing the screen 3001 of the image display apparatus which is changed in correspondence with the movement command. In the present embodiment, the area in which the first card object 3009 is displayed is a lock area. The first card object 3009 included in the lock area is not moved. Accordingly, the image display apparatus moves the card objects 3022 and 3023 included in the change area to the left in the direction of the third arrow 3021.

In more detail, the card object 3022 is moved to the third hidden area 3013 located on the left side of the screen 3001. The card object 3023 is moved to the right side of the first card object 3009 and the card object 3012 included in the second hidden area 3012 is moved to the right side of the card object 3023.

In the image display apparatus of the present embodiment, the objects included in the second hidden area 3012, the screen 3001 and the third hidden area 3013 are arranged as set by the user. Accordingly, the image display apparatus changes the screen 3001 by moving the objects included in the second hidden area 3012, the screen 3001 and the third hidden area 3013 to the left one by one, except for the first card object 3009 displayed in the lock area. After movement, the arrangement order of objects is maintained.

Figure 45:
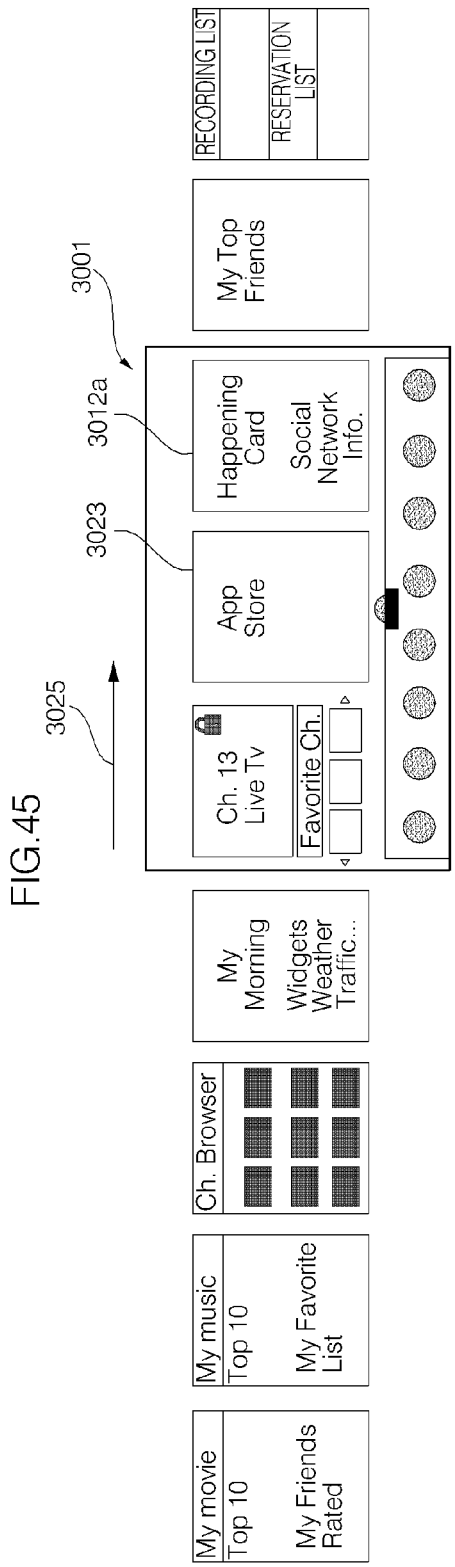

FIG. 45 is a view referred to for describing an example in which a command for moving objects included in the change area in a direction of a fourth arrow 3025 is input to the image display apparatus. The image display apparatus moves the objects included in the screen 3001 in correspondence with the input movement command. In more detail, the image display apparatus moves the card objects 3023 and 3012a included in the change area to the right in the direction of the fourth arrow 3025.

As described above, in the image display apparatus of the present embodiment, the objects included in the second hidden area 3012, the screen 3001 and the third hidden area 3013 are arranged as set by the user. Accordingly, as shown in FIG. 46, the image display apparatus changes the screen 3001 by moving the objects included in the second hidden area 3012, the screen 3001 and the third hidden area 3013 to the right one by one.

Figure 46:
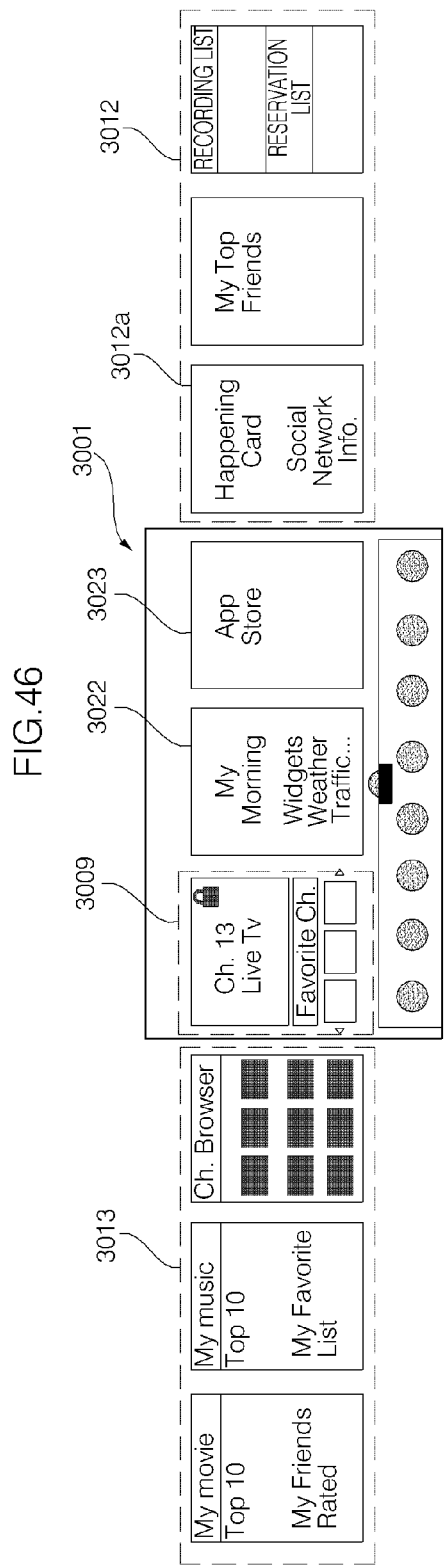

If the command for moving the objects in the direction of the fourth arrow is input to the image display apparatus having the screen 3001 shown FIG. 45, the screen 3001 of the image display apparatus is changed to the screen shown in FIG. 46. That is, the changed screen 3001 of the image display apparatus includes the card object 3022 and 3023. As described above, the first card object 3009 set as the lock area is not moved.

Figure 47:
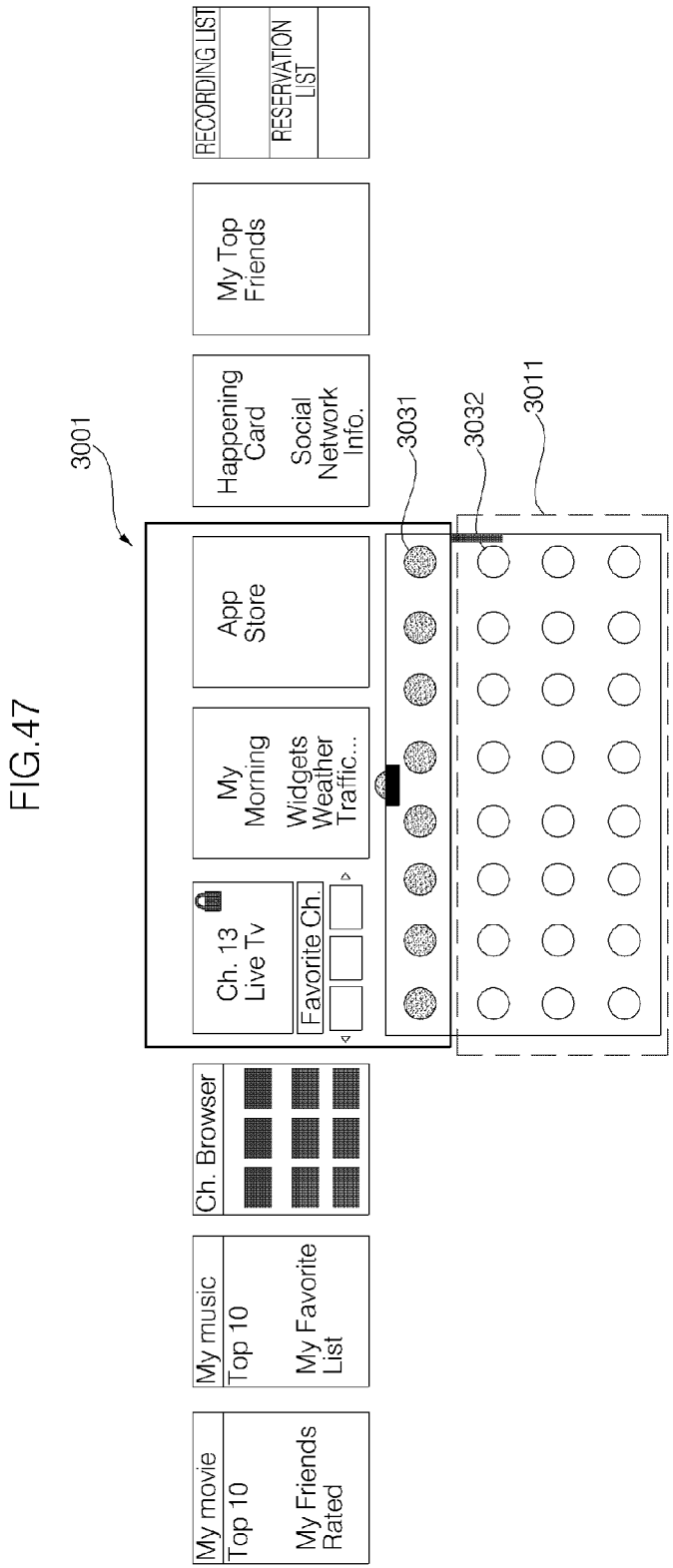
Figure 48:
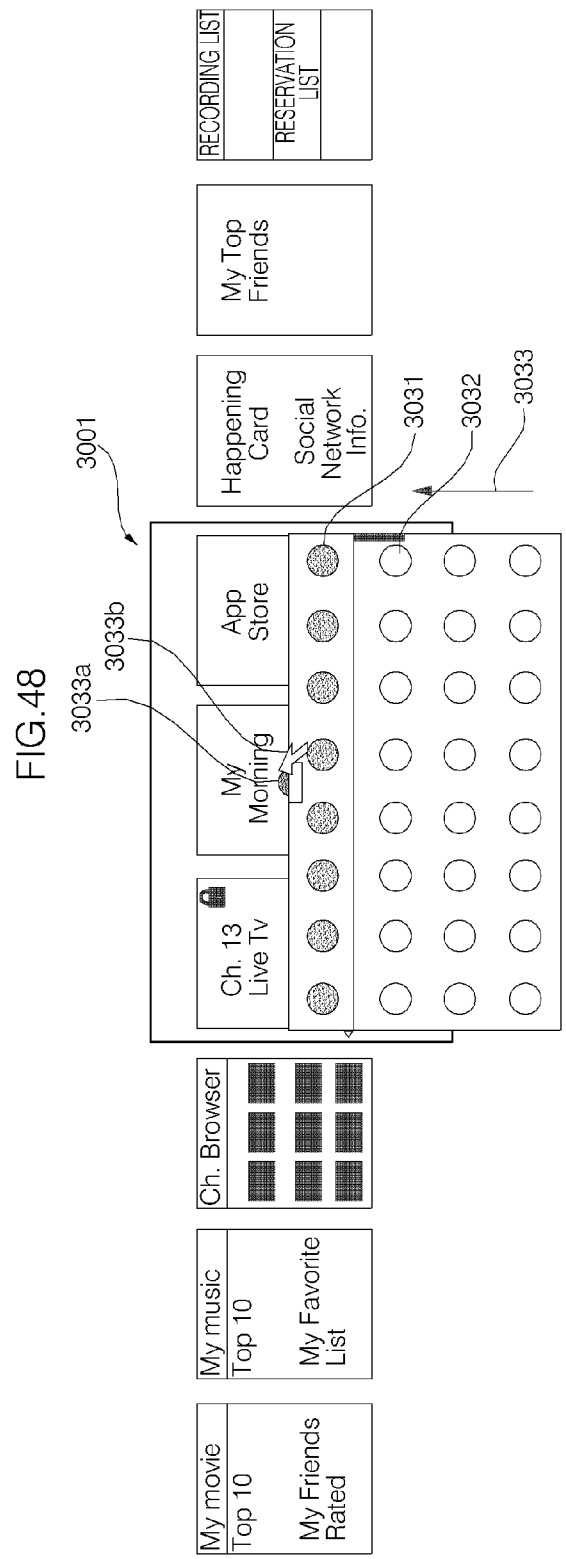
Figure 49:
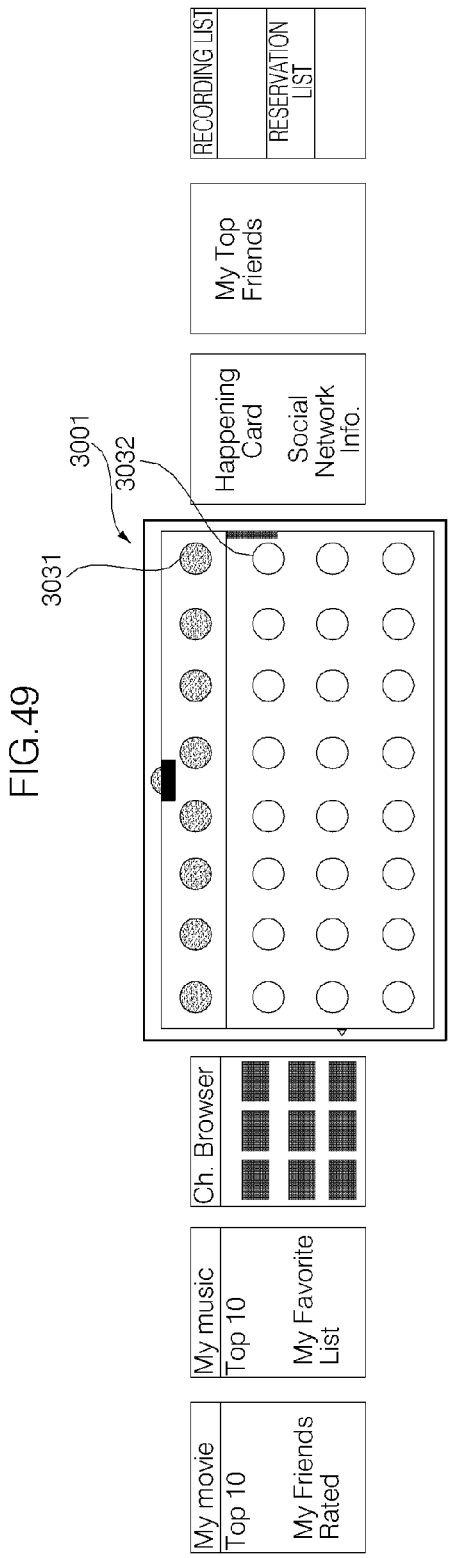

FIGS. 47 to 49 are views referred to for describing the display screen of the image display apparatus if a command for moving the application menu is input to the image display apparatus according to an embodiment of the present invention.

In the present embodiment, the user may input an up/down movement command of the application menu displayed on the lower side of the screen 3001. The application menu displayed on the lower side of the screen 3001 may include application items, which may be executed by the image display apparatus, in the form of icons. The image display apparatus may arrange the application items in arrangement order set by the user. The application items included in the first hidden area 3011 may be arranged as set by the user.

In another example, the image display apparatus may arrange the application menu such that application items corresponding to applications which are frequently used by the user, applications which are recently downloaded, or applications belonging to a predetermined category are displayed on the lower side of the screen 3001.

The application menu items displayed on the lower side of the screen 3001 and the application menu items included in the first hidden area 3011 may be set to be arranged in predetermined order. Accordingly, when the user inputs the command for moving the application menu displayed on the lower side of the screen 3001 upward to the image display apparatus, the image display apparatus moves the application menu displayed on the lower side of the screen 3001 upward. In addition, the image display apparatus displays the application items included in the first hidden area 3011 on the screen.

FIG. 47 shows the application menu included in the lower side of the screen 3001 and the first hidden area 3011 in predetermined arrangement order. In the present embodiment, the image display apparatus displays the application menu including a first application item 3031 on the lower side of the screen 3001. In addition, the image display apparatus sets the application menu including a second application item 3032 in the first hidden area 3011.

As shown in FIG. 48, the user may input an application menu up/down movement command to the image display apparatus. In more detail, FIG. 48 shows an example in which a command for moving the application menu upward in a direction of a fifth arrow 3033 is input to the image display apparatus.

The image display apparatus moves the application menu in correspondence with the input up/down movement command. In more detail, the image display apparatus displays the application menu included in the first hidden area including the second application item 3032 on the screen 3001. Accordingly, the user sees the application items included in the first hidden area that appear to be moved to the screen 3001 in correspondence with the up/down movement command.

In the present embodiment, the application menu has higher priority than the plurality of card objects. Accordingly, the user sees the application menu that appears to be located in front of the plurality of card objects. That is, the application menu is overlaid upon the card objects displayed on the screen 3001.

In the present embodiment, the user controls the image display apparatus using the remote controller. As described above, the image display apparatus may display a pointer 3033b corresponding to a signal transmitted from the remote controller on the screen 3001. The user may manipulate the remote controller such that the pointer 3033b is located on a control object 3033a displayed on the screen 3001. The control object 3033a on which the pointer 3033b is located is an object corresponding to a command for enlarging or reducing the area in which the application menu is displayed.

In the present embodiment, the user may manipulate the remote controller such that the pointer 3033b is dragged upward or downward in a state of being located on the control object 3033a corresponding to the enlargement or reduction command. As shown in FIG. 48, the image display apparatus may enlarge or reduce the area in which the application items are displayed in the direction of the fifth arrow 3033 according to the user manipulation of the remote controller.

In another embodiment, the control object 3033a may not be displayed and the area in which the application menu is displayed may be dragged or may be enlarged or reduced by the key operation of the remote controller.

In another embodiment, an enlargement or reduction operation may be performed by an operation for clicking the control object 3033a or an object corresponding to area enlargement or reduction, instead of the dragging operation.

In another embodiment, the user of the image display apparatus may manipulate a button or a key included in the remote controller so as to enlarge or reduce the area, in which the application item is displayed, in the direction of the fifth arrow 3033. In more detail, the user of the image display apparatus may input an enlargement or reduction command of an application menu display area to the image display apparatus using a directional key, a channel adjustment key, a volume key, or a separate hot key included in the remote controller or a key input combination thereof. In this case, the image display apparatus can enlarge or reduce the area, in which the application items are displayed, without separately displaying the pointer on the screen.

FIG. 49 shows an example in which application items cover the entire screen 3001 of the image display apparatus according to an application menu movement command.

The user may input a command for moving the application menu displayed on the screen 3001 downward to the image display apparatus. The image display apparatus may move the application menu including the first application item 3031 and the second application item 3032 displayed on the screen 3001 in correspondence with the application menu movement command. Accordingly, the user sees the application items arranged in predetermined order that appear to be displayed on the screen 3001 of the image display apparatus while being moved upward or downward.

Figure 50:
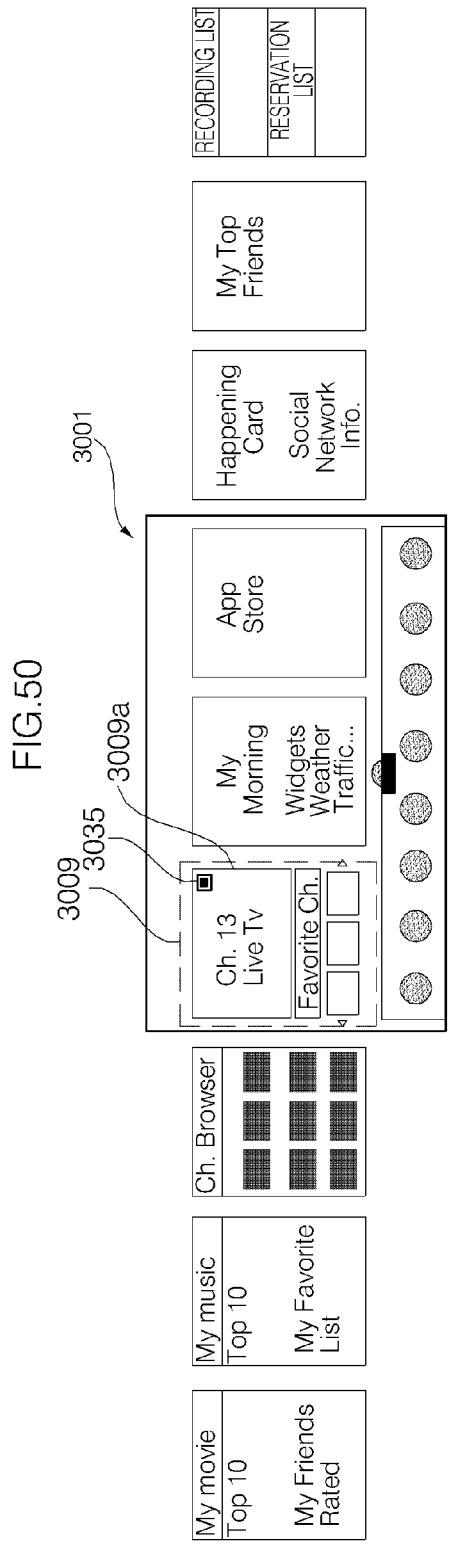
Figure 51:
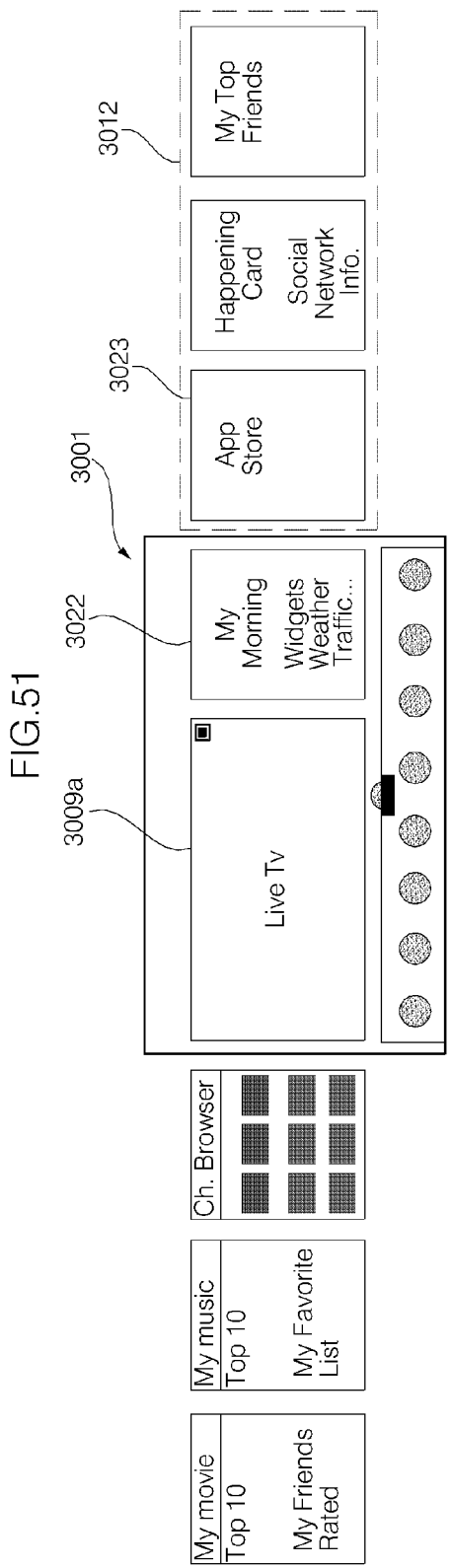

FIGS. 50 and 51 are views referred to for describing the case where the lock area is enlarged or reduced in the image display apparatus according to an embodiment of the present invention.

As described above, the lock area is an area in which an object which is not moved according to the object or card movement command input by the user is displayed. The user may set an area for displaying a moving image, which is being viewed by the user, as a lock area. For example, if the user views a moving image provided by a broadcast station, an area for displaying the moving image provided by the broadcast station may be set as the lock area. As another example, if the user views a content moving image provided by an external device connected to the image display apparatus, an area for displaying the content moving image ma be set as a lock area.

The user may input a lock area enlargement or reduction command to the image display apparatus. The image display apparatus may enlarge or reduce the lock area displayed on the screen 3001 according to the command input by the user. The user may drag the boundary of the lock area so as to input the lock area enlargement or reduction command to the image display apparatus. As another example, the user may input an icon selection command corresponding to the lock area enlargement or reduction command to the image display apparatus so as to input the lock area enlargement or reduction command to the image display apparatus.

FIG. 50 is a view showing an example in which a first icon 3053 corresponding to a lock area enlargement or reduction command is displayed in a predetermined area of the first card object 3009 set as the lock area in the screen 3001 of the image display apparatus according to an embodiment of the present invention. The user may input a command for selecting the first icon 3035 to the image display apparatus. The image display apparatus determines that the lock area enlargement command is input to the image display apparatus, if the command for selecting the first icon 3035 is input.

FIG. 51 is a view showing an example in which a first detail view object 3009a of the first card object 3009 which is set as the lock area is enlarged on the screen 3001 of the image display apparatus according to an embodiment of the present invention. In the present embodiment, the image display apparatus enlarges the first detail view object 3009a such that the first card object 3009 occupies ⅔ of the screen 3001. In another embodiment, the image display apparatus may enlarge the first detail view object 3009 to the size of the screen 3001.

In addition, the image display apparatus of the present embodiment changes the screen 3001 so as to move the card objects 3022 and 3023 to the right while enlarging the first detail view object 3009a. In more detail, the image display apparatus displays the card object 3022 on the right side of the first detail view object 3009a. In addition, the image display apparatus moves the card object 3023 from the screen 3001 to the second hidden area 3012. Accordingly, the user sees the objects located on the left and right side of the lock area of the image display apparatus that appear to be moved to the left and right, while the lock area is enlarged.

Figure 52:
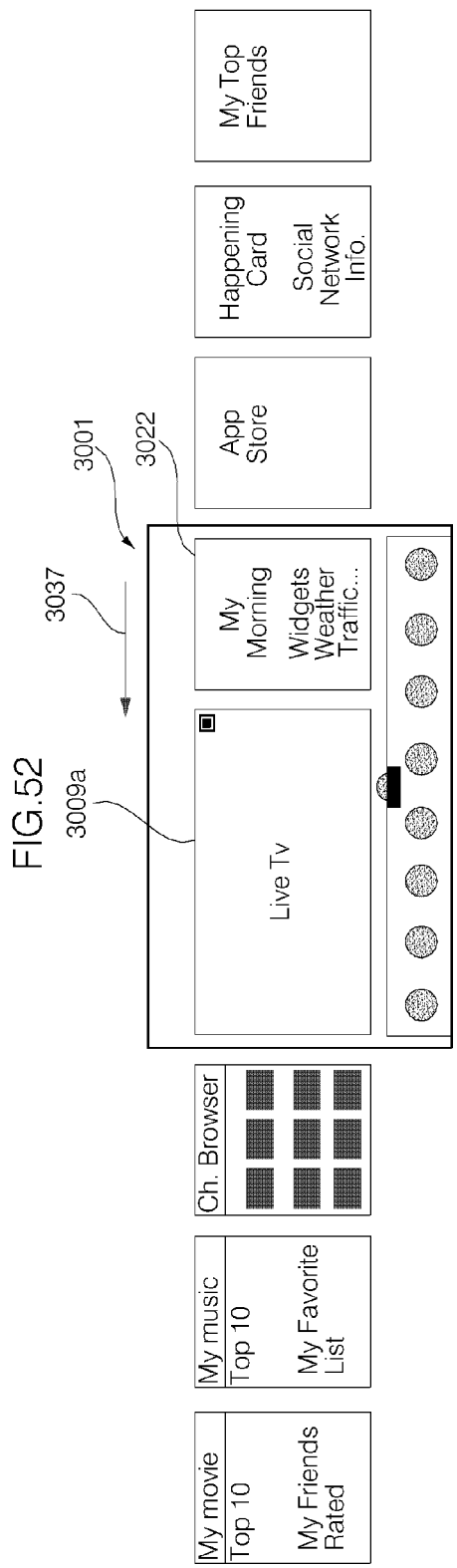
Figure 53:
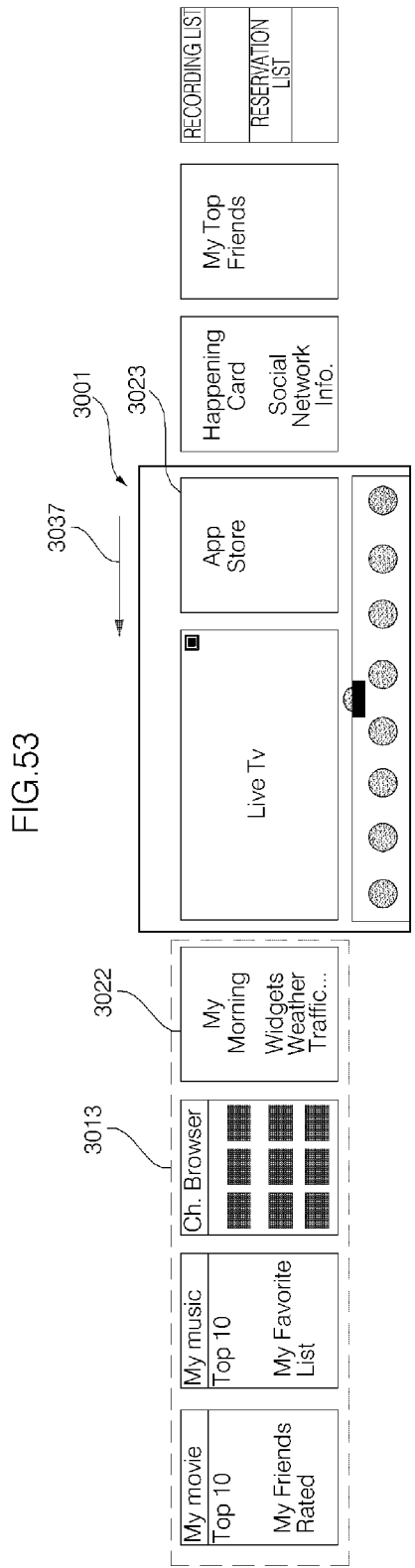
Figure 54:
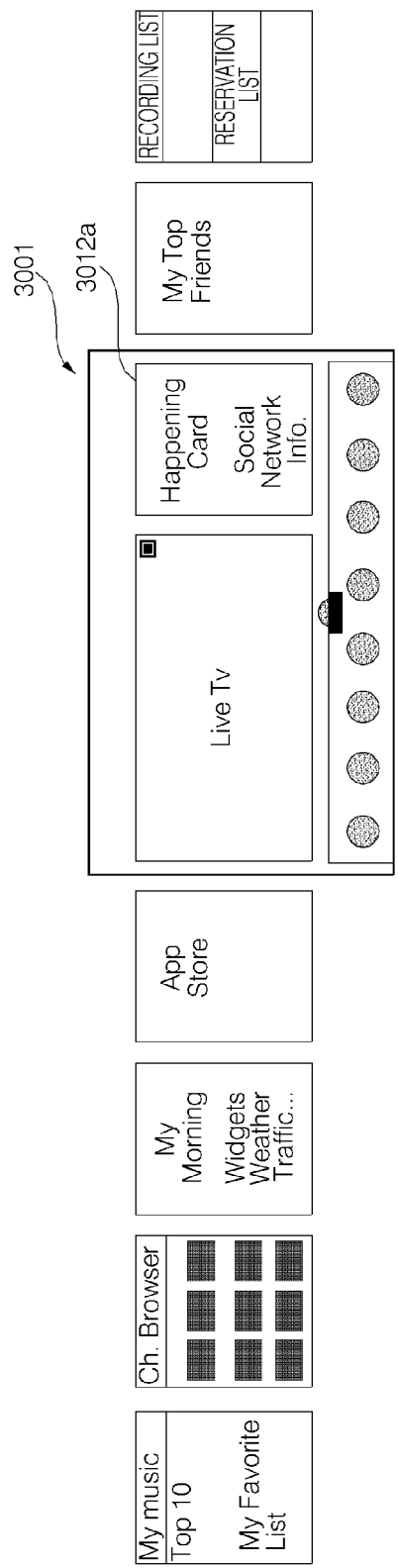

FIGS. 52 to 54 are views referred to for describing an example in which the objects included in the screen 3001 are moved to the left and right when the lock area included in the screen 3001 of the image display apparatus according to an embodiment of the present invention is enlarged.

The user of the image display apparatus of the present embodiment may input a left/right movement command of objects included in the screen 3001 to the image display apparatus. Even when the objects included in the screen 3001 are moved as the lock area is enlarged or reduced; the arrangement order of card objects may be maintained. Accordingly, if the object left/right movement command is input to the image display apparatus, the image display apparatus moves the objects displayed on the screen 3001 in stored arrangement order.

As shown in FIG. 52, the object movement command may be input to the image display apparatus in which the first detail view object 3009a and the card object 3022 are included in the screen 3001. In more detail, the user may input a command for moving a summary view object in a direction of a sixth arrow 3037 to the image input apparatus.

FIG. 53 is a view showing an example in which the screen 3001 of the image display apparatus is changed according to the input summary view object movement command. As shown, the image display apparatus displays the card object 3023 located on the right side of the card object 3022 on the screen 3001. In addition, the image display apparatus moves the card object 3022 to the third hidden area 3013. The user may input the card object movement command in the direction of the sixth arrow 3037 to the image display apparatus again.

FIG. 54 is a view showing an example in which the screen 3001 of the image display apparatus is changed according to the input summary view object movement command. As shown, the image display apparatus displays the card object 3012a located on the right side of the fourth summary view object 3023 on the screen 3001. That is, the image display apparatus displays the objects arranged in predetermined order on the screen 3001 according to the left/right movement command input to the image display apparatus, even when the lock area is enlarged and displayed on the screen 3001.

Figure 55:
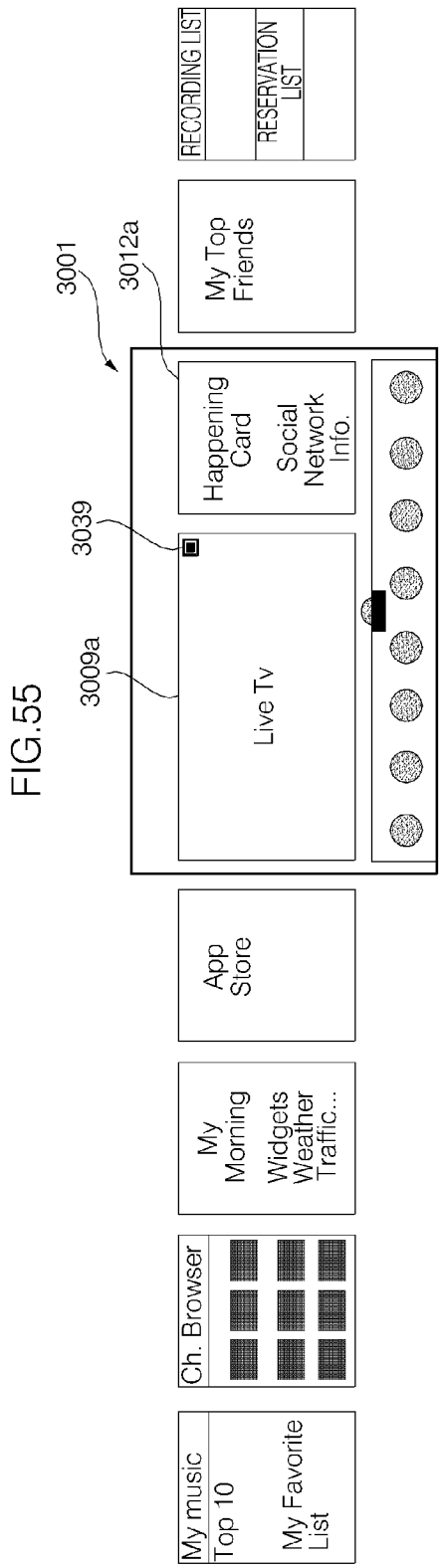
Figure 56:
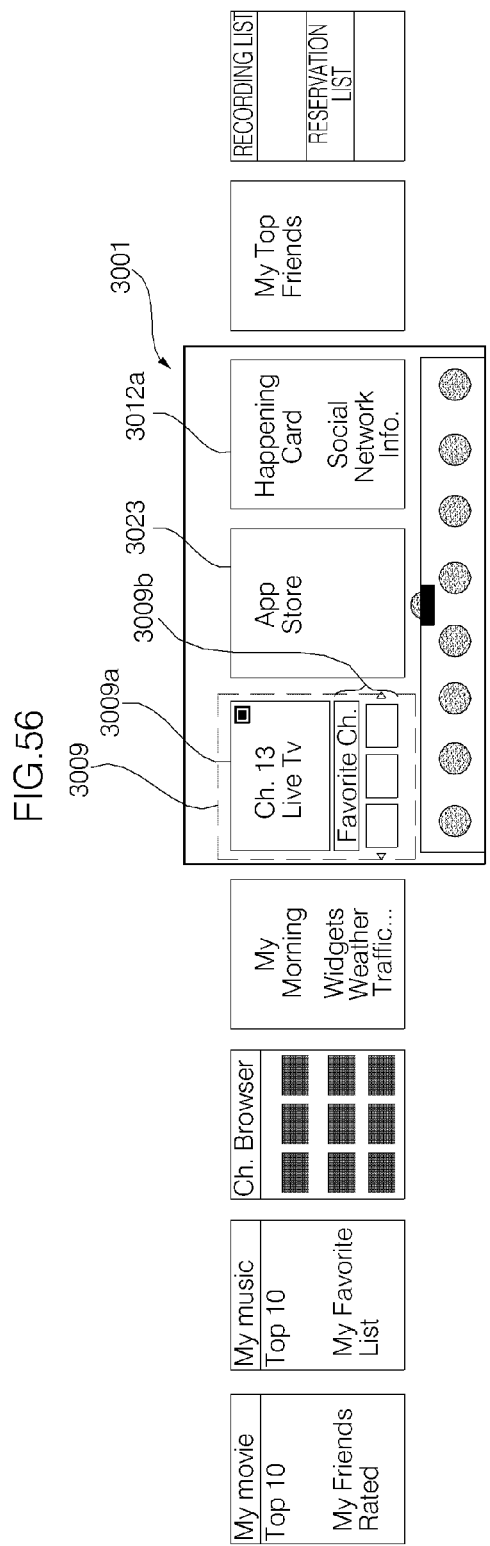

FIGS. 55 to 56 are views referred to for describing the screen 3001 of the image display apparatus according to an embodiment of the present invention, if the lock area reduction command is input to the image display apparatus.

The user may drag the boundary of the lock area displayed on the screen 3001 so as to reduce the size of the lock area. In addition, the user may input an icon selection command corresponding to the lock area reduction command displayed on the screen 3001 to the image display apparatus so as to reduce the size of the lock area.

As shown in FIG. 55, the image display apparatus according to the present embodiment displays a second icon 3039 corresponding to the lock area reduction command on the screen 3001. The screen 3001 of the image display apparatus according to the present embodiment includes the first detail view object 3009a, which is set as the lock area, and the card object 3012a.

The user may input a command to select the second icon 3039 to the image display apparatus. The image display apparatus which determines that the command to select the second icon 3039 is input reduces the size of the first detail view object 3009 as shown in FIG. 56. In addition, the image display apparatus displays the first summary view object 3009b. That is, the image display apparatus displays the first card object 3009 which is a graphic combination of the first detail view object 3009a and the first summary view object 3009b on the screen 3001, when a command to reduce the first detail view object 3009a is input to the image display apparatus.

In FIG. 56, the lock area is the first card object 3009. In addition, as the lock area is reduced, the summary view object included in the screen 3001 includes the card objects 3023 and 3012a. As described above, the arrangement order of objects included in the screen 3001 of the image display apparatus according to the present invention is maintained regardless of the enlargement or reduction of the lock area.

Figure 57:
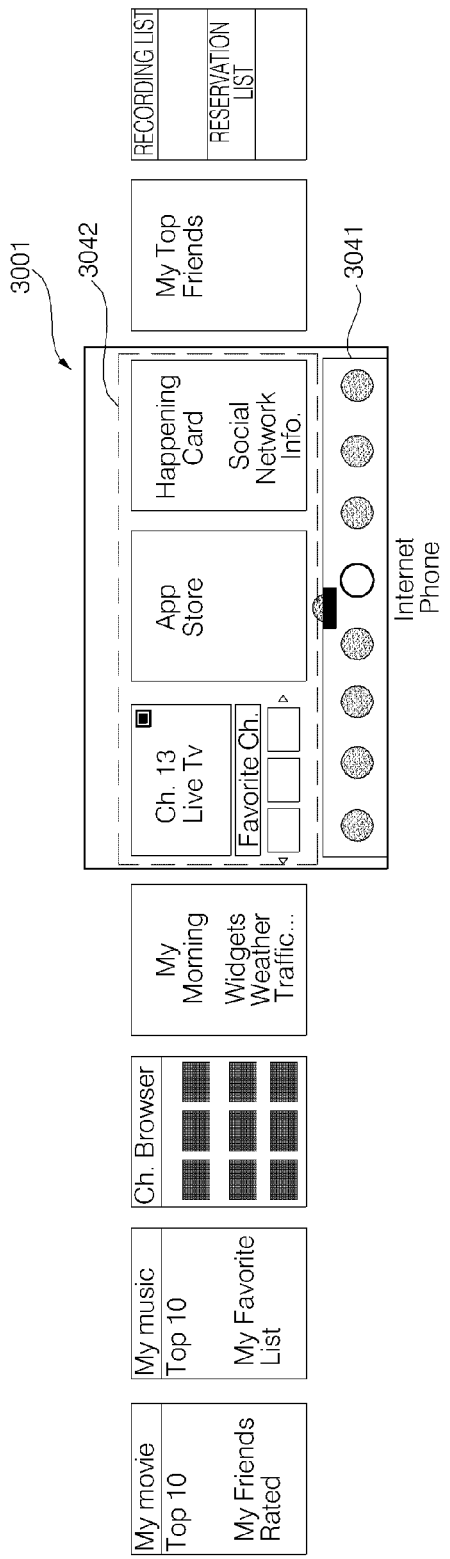
Figure 58:
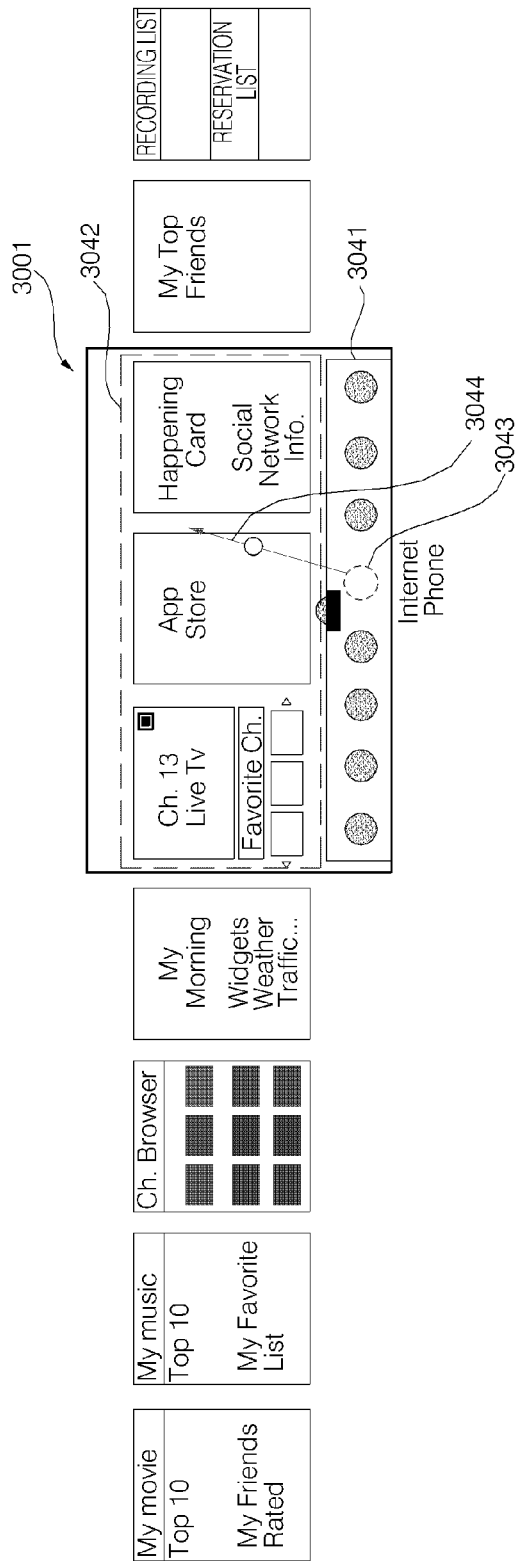
Figure 59:
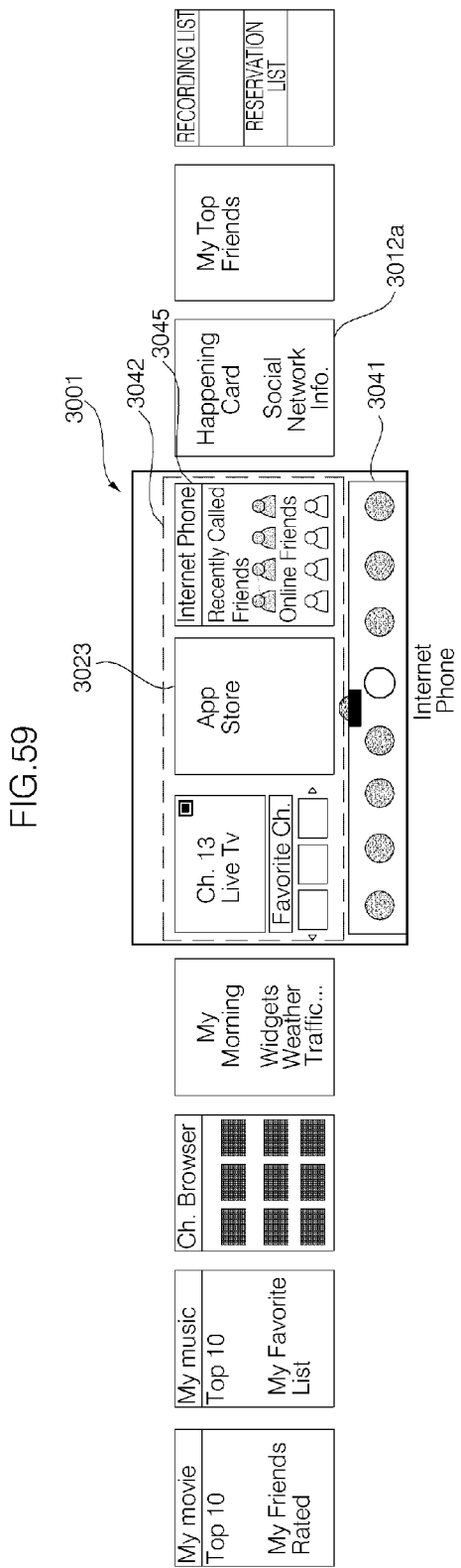

FIGS. 57 to 59 are views referred to for describing an example in which at least one application item of the application menu expands to an area in which a card object is displayed or a card object, in the image display apparatus according to an embodiment of the present invention.

The image display apparatus according to an embodiment of the present invention may display a content reproduction image, an application execution image, an image associated therewith, information associated therewith or information capable of provided using the image display apparatus on the screen through various card objects such as a summary view object and a detail view object. As described above, the amount of information provided through each object is increased as the size of the object is increased. For example, the amount of information capable of being provided through the summary view object is greater than the amount of information capable of being provided through the application item. In addition, the amount of information capable of being provided through the detail view object is greater than the amount of information capable of being provided through the summary view object.

The screen 3001 of the image display apparatus according to an embodiment of the present invention may be divided into a first display area in which the application menu is displayed and a second display area in which the card object is displayed. The user may input a command for moving the application menu included in the first display area or one application item to the second display area to the image display apparatus. The image display apparatus to which a movement command between the display areas is input may expand the application item corresponding to the movement command to the card object such as the summary view object or the detail view object and display the expanded application item in the second display area.

FIG. 57 is a view showing the screen 3001 including the first display area 3041 including the application items and the second display area 3042 including the card objects such as the summary view object or the detail view object according to an embodiment of the present invention.

As shown in FIG. 58, the user may input a command for moving the application item 3043 included in the first display area 3041 to the second display area 3042 to the image display apparatus. The user may move the application item 3043 included in the first display area 3041 to the second display area 3042 in a direction of a seventh arrow 3044 using the remote controller.

As shown in FIG. 59, the image display apparatus expands and displays the application item 3043 in the second display area 3042. In the present embodiment, the application corresponding to the application item 3043 enables the user to send or receive an Internet phone call. The card object 3045 displayed in the second display area includes an Internet phone application-associated image or associated information. In more detail, the card object 3045 may include information about friends recently called through the Internet phone application and information about online friends currently capable of being called.

In addition, as shown in FIG. 58, in the present embodiment, the user drags the application item 3043 and drops the application item 3043 between two card objects 3023 and 3012*a*. Accordingly, the image display apparatus sets the arrangement order such that the card object 3045 is located between the two card objects 3023 and 3012*a* in correspondence with the movement of the application item 3043. In addition, as shown in FIG. 59, the image display apparatus configures the screen 3001 such that the card object 3045 appears to be located between the two card objects 3023 and 3012*a* in correspondence with the movement of the application item 3043.

Further, the user may input a command for moving the card objects 3023 and 3045 to the left to the image display apparatus having the screen 3001 shown in FIG. 59. In this case, the image display apparatus changes the display state of the screen 3001 such that the card object 3012*a* located on the right side is included in the screen 3001.

Figure 60:
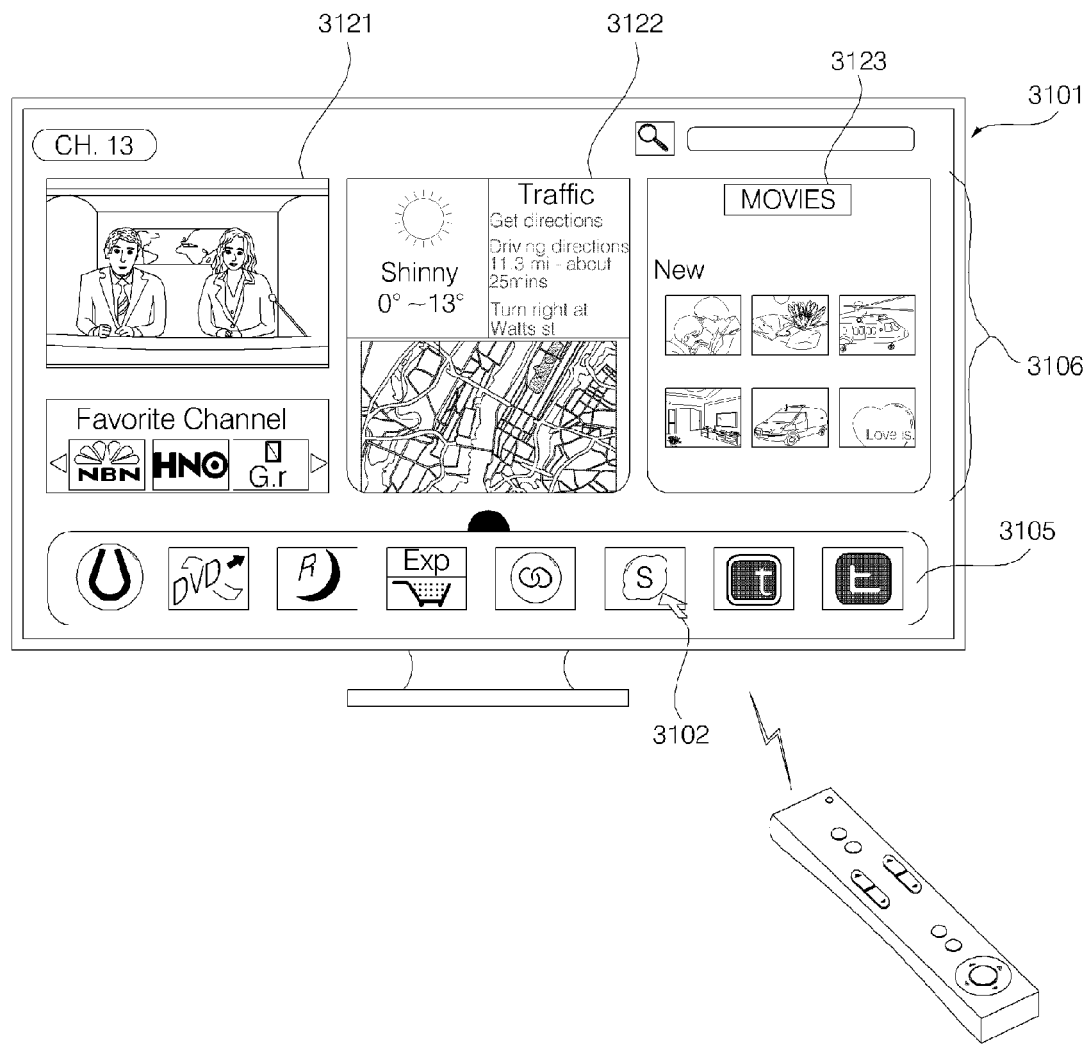

FIG. 60 is a view showing the appearance of the image display apparatus and the remote controller which can control the image display apparatus according to an embodiment of the present invention. The user may input a command to the image display apparatus using the remote controller. The image display apparatus may display a pointer 3102 corresponding to a signal transmitted from the remote controller on a screen 3101.

The screen 3101 according to an embodiment of the present invention is divided into a first display area 3105 and a second display area 3106. The first display area 3105 is an area in which an application menu including application items is displayed. The second display area 3106 is an area including a plurality of card objects. In the present embodiment, the card objects 3121, 3122 and 3123 included in the second display area 3106 include the object 3121 for displaying broadcast content, which is currently being viewed by the user, as a detail view, the object 3122 for displaying information, which is periodically provided to the image display apparatus through a network server, as a summary view, and the object 3123 for displaying movie-associated information, which may be downloaded through an application for purchasing movie content, as a summary view.

The image display apparatus according to the present embodiment displays a content reproduction image or an application execution image, which may be mainly viewed by the user, on the left side of the second display area 3106 of the screen 3101 through the detail view object. In addition, predetermined information which the user wishes to receive or information about an application installed in the image display apparatus is displayed on the right side of the second display area 3106 through the summary view object. Like the above-described embodiment, the user of the image display apparatus may move the summary view object displayed on the right side of the second display area 3106 to the left or right while viewing content through the detail view object displayed on the left side of the second display area 3106.

In addition, the user may manipulate the remote controller to locate the pointer 3102 on a predetermined object. If the pointer 3102 is located on the predetermined object for a predetermined time or more, the image display apparatus according to the present embodiment determines that a command to select the object is input to the image display apparatus. In this case, the image display apparatus changes the color, brightness or the like of the selected object such that the user recognizes that the object is selected.

The user may input a drag-and-drop command of the selected object to the image display apparatus using the remote controller. If the user drags and drops an application item included in the first display area 3105 into the second display area 3106, the image display apparatus expands the application item to the summary view object and displays the application item in the second display area 3106. In addition, if the user drags the summary view object included in the second display area 3106 to the left or right, the image display apparatus moves the summary view object to the left or right. In addition, the summary view object located on the left or right side of the summary view object may be displayed in the second display area 3106 in arrangement order.

In an embodiment different from the embodiment of FIG. 60, the user may manipulate a button or a key included in the remote controller and input a predetermined object movement command to the image display apparatus. As described above, the image display apparatus may move an object included in the screen 3101 according to the input object movement command or expand and display an image and information corresponding to an application item to the summary view object or the detail view object.

Figure 61:
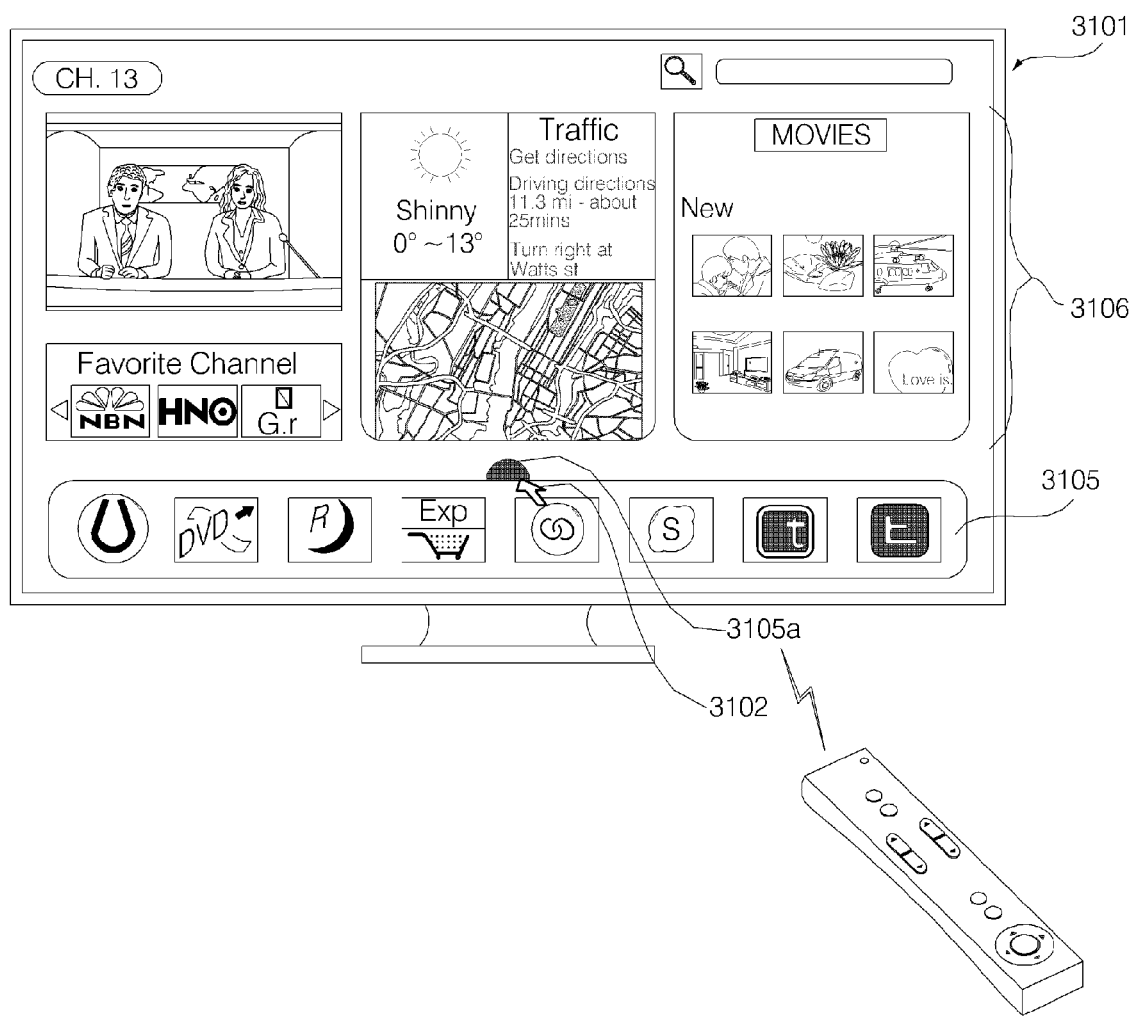
Figure 62:
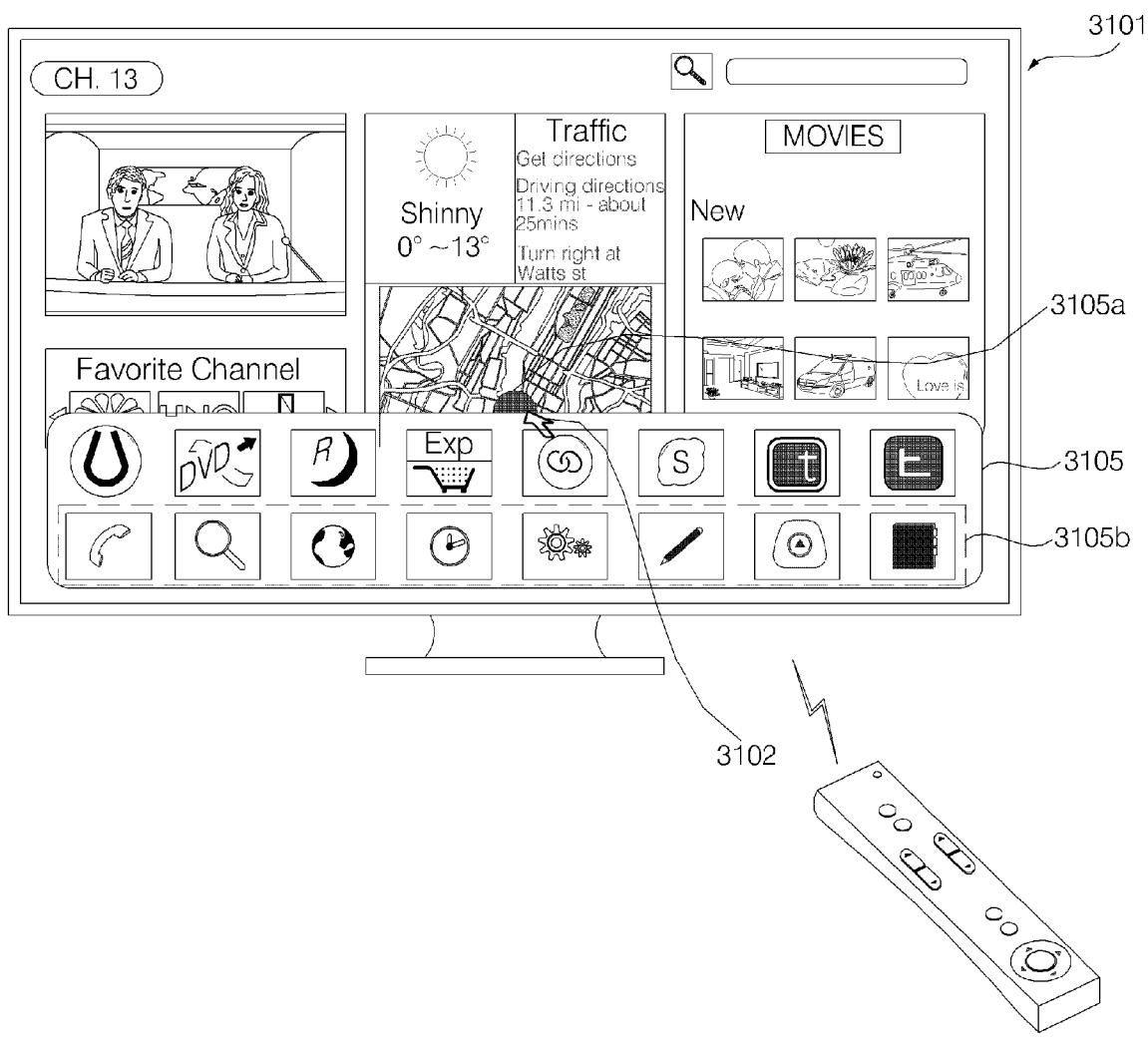

FIGS. 61 to 62 are views referred to for describing an example of controlling the image display apparatus according to an embodiment of the present invention using the remote controller.

As shown in FIG. 61, the first display area 3105 displayed on the display screen 3101 of the image display apparatus of the present invention includes an object 3105*a* corresponding to a command to enlarge and reduce the first display area. The user may manipulate the remote controller such that the pointer 3102 displayed on the display screen 3101 is located on the object 3105*a* corresponding to the enlargement or reduction command in correspondence with a signal transmitted from the remote controller.

In more detail, the user may move the remote controller such that the pointer 3102 is located on the object 3105*a* corresponding to the enlargement or reduction command. The image display apparatus may determine the motion of the user based on the signal transmitted by the remote controller. The image display apparatus may change the area in which the pointer 3102 is displayed on the display screen in correspondence with the determined motion of the user. In the present embodiment, the image display apparatus locates the pointer 3102 on the enlargement or reduction command object 3105*a*.

If the pointer 3102 is located on the object 3105*a* corresponding to the enlargement or reduction command, the image display apparatus determines that the command to select the object 3105*a* corresponding to the enlargement or reduction command is input. In addition, if the object corresponding to the enlargement or reduction command is determined to be selected according to the selection command, the image display apparatus may change the object 3105*a* corresponding to the enlargement or reduction command and the first display area 3105 according to the location of the pointer 3102. That is, when the object 3105*a* corresponding to the enlargement or reduction object is dragged through the pointer 3102, the image display apparatus may enlarge or reduce the first display area 3105.

FIG. 62 is a view referred to for describing an image displayed on the display screen 3010 if the user drags the object 3105*a* corresponding to the enlargement or reduction command upward using the pointer 3102.

As shown, if the object 3105a corresponding to the enlargement or reduction command is dragged upward, the image display apparatus enlarges the first display area 3105 and displays the enlarged first display area. The first display area 3105 includes the application menu. If the first display area 3105 is enlarged, application items included in the first hidden area may be further included. That is, if the first display area 3105 is enlarged, the image display apparatus may further display the application items included in the first hidden area in the enlarged area 3105b of the first display area 3105. The application items included in the first display area 3105 are arranged in order of application items stored in the image display apparatus.

In the present embodiment, the object 3105a corresponding to the enlargement or reduction command is an extension area of the first display area 3105. In addition, the user may input the enlargement or reduction command of the first display area to the image display apparatus by selecting and dragging the first display area 3105 other than the object 3105a corresponding to the enlargement or reduction command.

Figure 63:
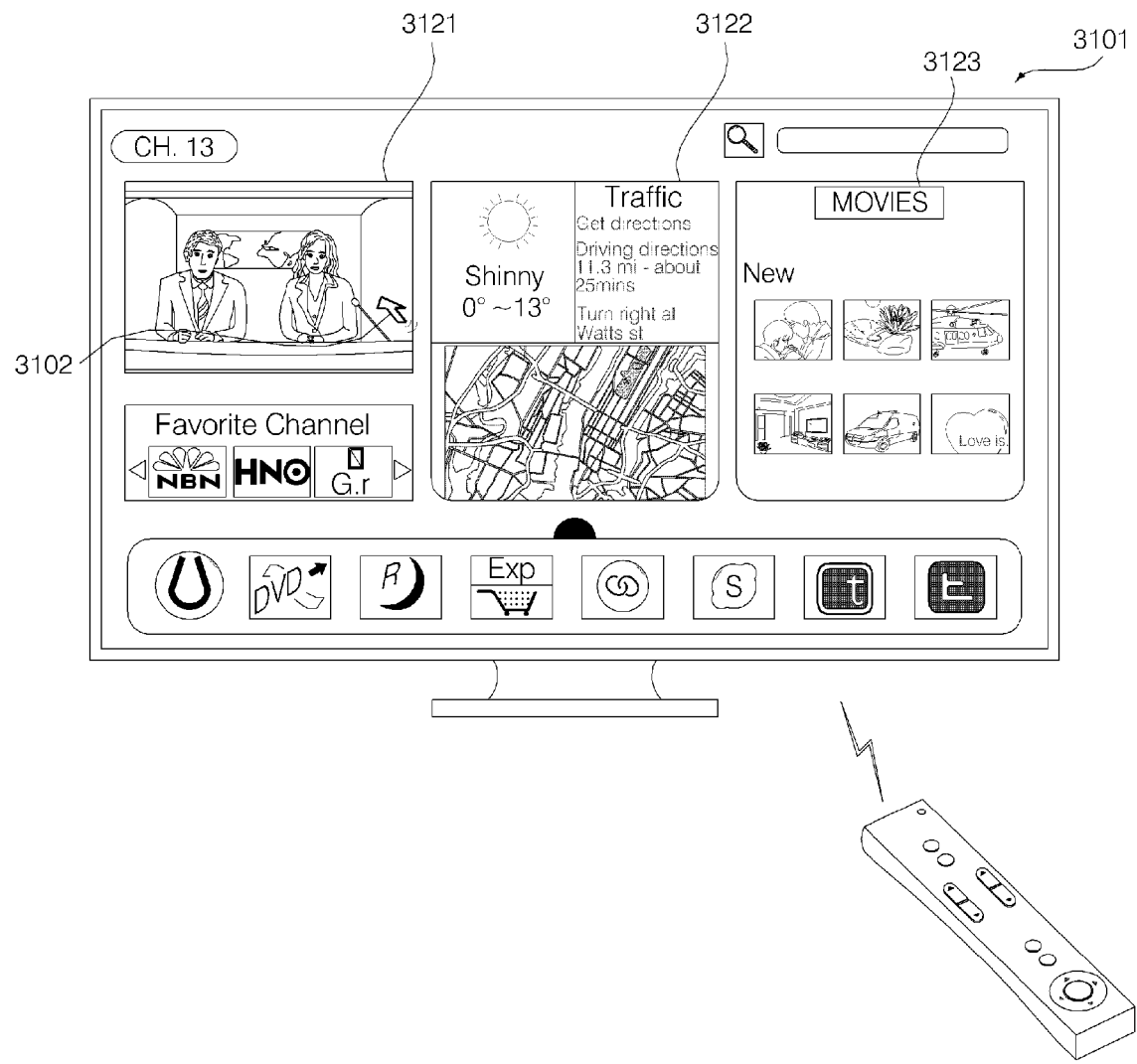
Figure 64:
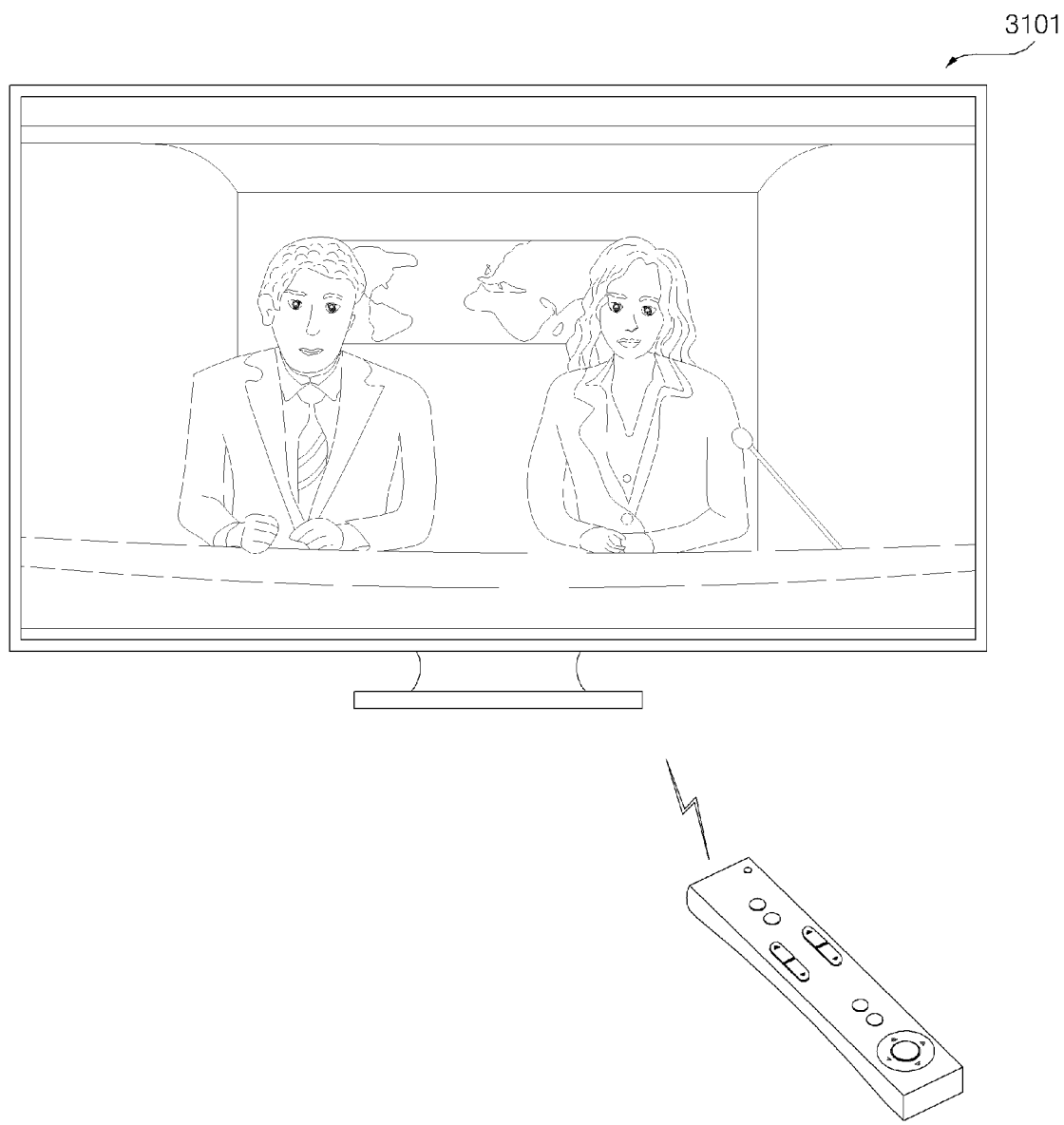

FIGS. 63 and 64 are views referred to for describing an example in which an image displayed on a card object according to an embodiment of the present invention is enlarged to fill the display screen 3101.

As described above, the card object may be an object for displaying a content reproduction image, a content-associated image, an application execution image, an application-associated image, etc. The user may select any one of the objects such that an image displayed on the selected object fills the entire display screen 3101.

FIG. 63 is a view showing an example in which the user inputs a command to select the card object 3121 for displaying broadcast content to the image display apparatus using the pointer 3102. In the present embodiment, the user may manipulate the remote controller such that the pointer 3102 is located on the card object 3121 for displaying the broadcast content. Thereafter, the user may manipulate a predetermined button or key included in the remote controller. In this case, the image display apparatus determines that a command to enlarge and display the card object 3121 for displaying the broadcast content is input to the image display apparatus.

As shown in FIG. 64, the image display apparatus enlarges a broadcast content image displayed through the broadcast content detail view object to the size of the display screen 3101 and displays the enlarged image. Accordingly, the user may view the broadcast content image provided through the card object on the display screen 3101.

If a predetermined button or key included in the remote controller is manipulated after the pointer is located on a predetermined object, the image display apparatus according to the present embodiment determines that a command to enlarge an image included in the object is input to the image display apparatus.

The user of the image display apparatus may input commands to enlarge and display various application execution images, which are desired to be identified by the user in addition to the broadcast content, to the input display apparatus using the remote controller. The image display apparatus may enlarge an application execution image (for example, a game application execution image, an Internet phone application execution image, an application execution image for providing a variety of information identified through the image display apparatus, such as weather information, traffic information, etc.) and display the enlarged image in full-screen according to the enlargement command input by the user.

Figure 65:
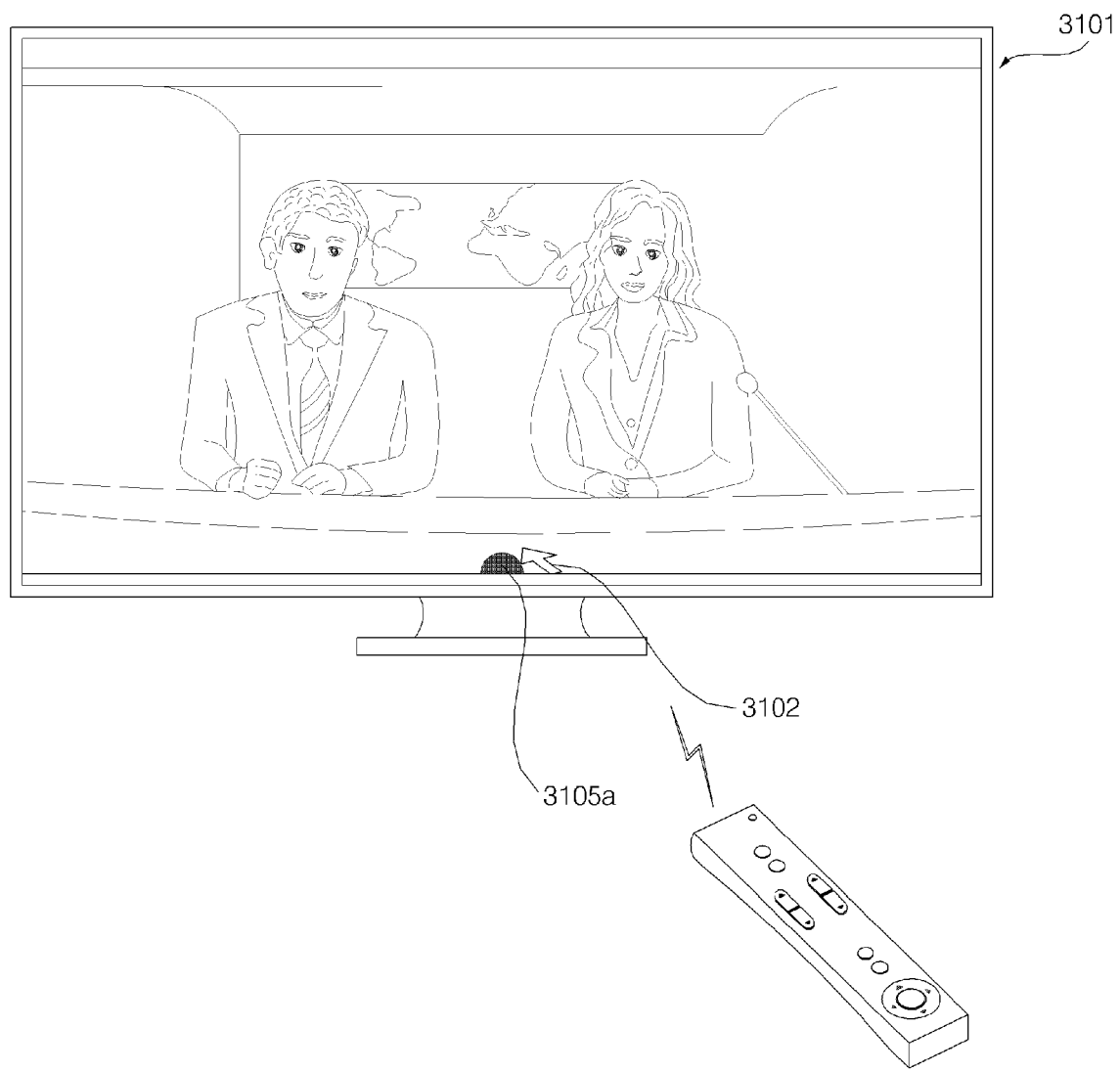
Figure 66:
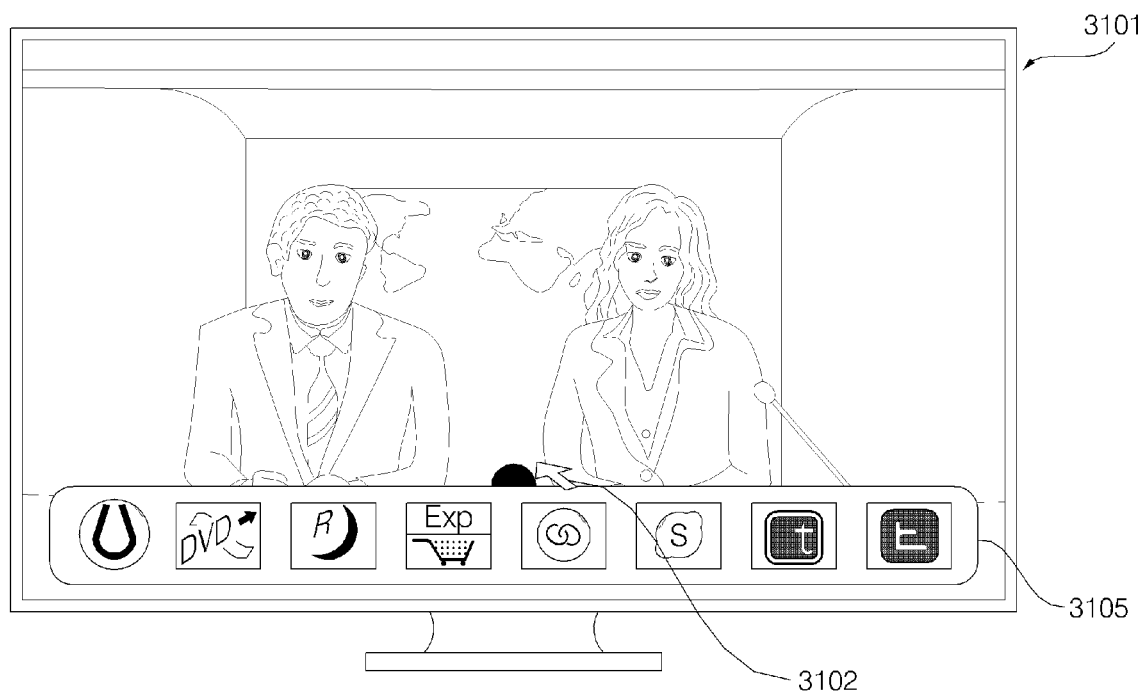

FIGS. 65 and 66 are views referred to for describing an example in which the image display apparatus according to an embodiment of the present invention displays the application menu on the screen 3101 in correspondence with a command input through the remote controller. Although FIGS. 65 and 66 show the embodiment using the pointer, the application menu may be displayed using the hot key of the remote controller or another input method in another embodiment.

In the present embodiment, the user may input a command to the image display apparatus using the remote controller. The image display apparatus may display the pointer 3102 corresponding to a signal transmitted from the remote controller on the screen 3101. The user may manipulate the remote controller such that the pointer 3102 is moved. If the remote controller senses user motion, the remote controller transmits a signal corresponding to the motion of the user to the image display apparatus. In addition, the remote controller transmits a signal corresponding to a button or key manipulated by the user to the image display apparatus. The image display apparatus may move the pointer 3102 displayed on the screen 3101 in correspondence with the signal transmitted from the remote controller.

As shown in FIG. 65, the image display apparatus according to an embodiment of the present invention displays the pointer 3102 on the display screen 3101 in correspondence with the signal transmitted from the remote controller. FIG. 65 is a view referred to for describing an example in which the pointer 3102 corresponding to the signal transmitted from the remote controller is displayed on the screen 3101 when the image display apparatus displays an image based on a broadcast signal as shown in FIG. 64.

The user may manipulate the remote controller such that the pointer 3102 is moved on the screen 3101. In the present embodiment, the user manipulates the remote controller such that the pointer 3102 is moved to the lower side of the screen 3101. The image display apparatus displays the object 3105a corresponding to the first display area enlargement or reduction command when the pointer 3102 is moved to the lower side of the screen 3101. The user may manipulate the remote controller such that the pointer 3102 is located on the object 3105a for a predetermined time.

Thereafter, as shown in FIG. 66, the user may manipulate the remote controller such that the pointer 3102 and the object 3105a corresponding to the enlargement or reduction command are moved upward. When the object 3105a corresponding to the enlargement or reduction command is moved upward, the image display apparatus displays the first display area 3015 including the application menu on the screen 3101. The user may vertically drag the object 3105a corresponding to the enlargement or reduction command using the pointer 3102 so as to enlarge or reduce the first display area 3105.

In addition, the user may manipulate a button or key included in the remote controller after manipulating the remote controller such that the pointer 3102 is located on the object 3105a. The user may vertically drag the object 3105a while vertically moving the remote controller in a state in which the button or key is manipulated. When the object 3105a is vertically dragged, the image display apparatus enlarges or reduces the first display area 3105 including the application menu in the screen 3101.

In the present embodiment, the user may display the application menu on the screen 3101 using the remote controller, even when a content reproduction image or a predetermined application execution image other than broadcast content is displayed in full-screen 3101.

The image display apparatus and the method for operating the same according to the foregoing exemplary embodiments are not restricted to the configuration and the method of the exemplary embodiments set forth herein. Therefore, variations and combinations of all or some of the exemplary embodiments set forth herein may fall within the scope of the present invention.

The method for operating an image display apparatus according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner.

While the present invention has been particularly shown and described with reference to exemplary embodiments thereof, those of ordinary skill in the art will understand that various changes in form and details may be made therein without departing from the spirit and scope of the present invention as defined by the following claims.

What is claimed is:

1. A method for operating an image display apparatus configured to receive a television broadcast, the method comprising:
    displaying a home screen, the home screen simultaneously displaying, on the display unit, a plurality of application items in an application menu area, at least one object in a lock area, and a plurality of objects in a change area, the plurality of application items including at least one mandatory application item which cannot be edited by a user and at least one application item which can be edited by the user,
    wherein one object of the at least one object displayed in the lock area is a live broadcast image;
    while the live broadcast image is being displayed in the lock area, scrolling through the plurality of the objects displayed in the change area so that at least one of the objects displayed on the display unit is removed from the display unit, and a corresponding at least one undisplayed object is added to the display unit;
    periodically updating the plurality of objects displayed in the change area through a network server;
    displaying, on the display unit of the image display apparatus, at least one of a login item that is used upon accessing an application store object or upon logging into a network connected to the image display apparatus, a help item that is used to perform a help function upon the operation of the display apparatus, and an exit item that is used to exit the home screen and display the live broadcast image in a full-screen mode;
    displaying a graphic object representing a total number of objects including the at least one object displayed in the lock area and the plurality of objects displayed in the change area; and
    expanding a size of the application menu area to overlap at least a portion of at least one of the lock area and the change area,
    wherein the plurality of objects displayed in the change area includes an application store,
    wherein the scrolling step scrolls through the plurality of objects displayed in the change area in response to a direction key of a remote controller, and
    wherein the application menu area including the plurality of application items is displayed on a lower portion of the display unit.

2. The method of claim 1, further comprising:
reducing a size of the lock area and the change area so as to correspond to an enlarged size of the application menu area.

3. The method of claim 1, further comprising:
overlaying at least a portion of the application menu area upon at least a portion of the lock area and the change area.

4. The method of claim 1, further comprising:
changing the live broadcast image in response to a user input to one object of the plurality of objects displayed in the change area.

5. An image display apparatus configured to receive a television broadcast, comprising:
    a display unit;
    a user input interface;
    a memory; and
    a controller operatively connected to the display unit, the user input interface and the memory, the controller programmed to:
    display a home screen, the home screen simultaneously displaying, on the display unit, a plurality of application items in an application menu area, at least one object in a lock area, and a plurality of objects in a change area, the plurality of application items including at least one mandatory application item which cannot be edited by a user and at least one application item which can be edited by the user,
    wherein one object of the at least one object displayed in the lock area is a live broadcast image;
    while the live broadcast image is being displayed in the lock area, scroll through the plurality of the objects displayed in the change area so that at least one of the objects displayed on the display unit is removed from the display unit, and a corresponding at least one undisplayed object is added to the display unit;
    periodically update the plurality of objects displayed in the change area through a network server;
    display, on the display unit, at least one of a login item that is used upon accessing an application store object or upon logging into a network connected to the image display apparatus, a help item that is used to perform a help function upon the operation of the image display apparatus, and an exit item that is used to exit the home screen and display the live broadcast image in a full-screen mode; and
    scroll through the plurality of objects displayed in the change area in response to a direction key of a remote controller,
    wherein the plurality of objects displayed in the change area includes an application store object,
    wherein the application menu area including the plurality of application items is displayed on a lower portion of the display unit,
    wherein the controller is further configured to display a graphic object representing a total number of objects including the at least one object displayed in the lock area and the plurality of objects displayed in the change area, and
    wherein the controller is further configured to overlay at least a portion of an enlarged application menu area upon at least a portion of the lock area and the change area.

6. The image display apparatus of claim 5, wherein the controller is further configured to reduce a size of the lock area and the change area so as to correspond to an enlarged size of the application menu area.

7. The method of claim 1,
wherein the at least one editable application item is classified and aligned according to categories of applications in the application store object.

8. The image display apparatus of claim 5,
wherein the at least one editable application item is classified and aligned according to categories of applications in the application store object.

9. The method of claim 1, wherein the scrolling step scrolls through the plurality of objects displayed in the change area in response to a movement input signal from the remote controller or a flicking input signal from the remote controller, and
wherein the amount of scrolling is controlled by a level of the movement input signal or the flicking input signal.

10. The image display apparatus of claim 5, wherein the controller is further programmed to:
scroll through the plurality of objects displayed in the change area in response to a movement input signal from the remote controller or a flicking input signal from the remote controller, and
wherein the amount of scrolling is controlled by a level of the movement input signal or the flicking input signal.

11. The method of claim 1, further comprising:
displaying, on the display unit of the image display apparatus, a home screen in response to an operation of a home key included on the remote controller.

12. The method of claim 11, wherein the home screen includes the application menu area, the lock area, and the change area.

13. The image display apparatus of claim 5, wherein the controller is further programmed to:
display, on the display unit of the image display apparatus, a home screen in response to an operation of a home key included on the remote controller.

14. The image display apparatus of claim 13, wherein the home screen includes the application menu area, the lock area, and the change area.

* * * * *